(12) United States Patent
Lopez-Barron et al.

(10) Patent No.: US 12,195,563 B2
(45) Date of Patent: Jan. 14, 2025

(54) POLYOLEFIN-BASED IONOMERS AND PRODUCTION THEREOF

(71) Applicant: ExxonMobil Chemical Patents Inc., Baytown, TX (US)

(72) Inventors: Carlos R. Lopez-Barron, Houston, TX (US); Tzu-Pin Lin, Seabrook, TX (US); Avery R. Smith, Houston, TX (US); Nikola S Lambic, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 454 days.

(21) Appl. No.: 17/555,890

(22) Filed: Dec. 20, 2021

(65) Prior Publication Data

US 2022/0213241 A1    Jul. 7, 2022

Related U.S. Application Data

(60) Provisional application No. 63/131,488, filed on Dec. 29, 2020.

(51) Int. Cl.
| *C08F 10/06* | (2006.01) |
| *C08F 210/06* | (2006.01) |
| *C08F 210/16* | (2006.01) |

(52) U.S. Cl.
CPC ............ *C08F 210/06* (2013.01); *C08F 10/06* (2013.01); *C08F 210/16* (2013.01); *C08F 2810/00* (2013.01)

(58) Field of Classification Search
CPC ...... C08F 10/02; C08F 210/02; C08F 210/16; C08F 4/52; C08F 4/64; C08F 4/76; C08F 10/06; C08F 210/06; C08F 2810/00
See application file for complete search history.

(56) References Cited

U.S. PATENT DOCUMENTS

| 3,248,179 A | 4/1966 | Norwood ........................ 23/285 |
| 4,543,399 A | 9/1985 | Jenkins et al. .................. 526/70 |
| 4,588,790 A | 5/1986 | Jenkins et al. .................. 526/70 |
| 4,613,484 A | 9/1986 | Ayers et al. .................... 422/132 |

(Continued)

FOREIGN PATENT DOCUMENTS

| EP | 0 573 120 | 11/1998 | ............ B01J 37/00 |
| JP | 2003/246820 | 9/2003 | ............ C08F 210/06 |

(Continued)

OTHER PUBLICATIONS

U.S. Appl. No. 63/117,295, filed Nov. 23, 2020, Francis C. Rix et al.

(Continued)

*Primary Examiner* — Rip A Lee

(57) ABSTRACT

This invention relates to a process to produce an ionomer comprising: 1) contacting, in a reactor, one or more $C_2$-$C_{60}$ α-olefins, an optional diene, and a metal alkenyl with a catalyst system comprising an activator, a catalyst compound, and a support; 2) forming a copolymer comprising one or more $C_2$-$C_{60}$ α-olefin monomers and about 0.01 wt % to about 20 wt %, based on the weight of the copolymer, of metal alkenyl; 3) functionalizing and quenching the polymerization reaction with one or more electrophilic groups; and 4) obtaining ionomer.

17 Claims, 9 Drawing Sheets

(56) References Cited

U.S. PATENT DOCUMENTS

| | | | |
|---|---|---|---|
| 5,028,670 A | 7/1991 | Chinh et al. | 526/73 |
| 5,041,584 A | 8/1991 | Crapo et al. | 556/179 |
| 5,153,157 A | 10/1992 | Hlatky et al. | 502/117 |
| 5,317,036 A | 5/1994 | Brady, III et al. | 523/223 |
| 5,352,749 A | 10/1994 | DeChellis et al. | 526/68 |
| 5,405,922 A | 4/1995 | DeChellis et al. | 526/68 |
| 5,427,991 A | 6/1995 | Turner | 502/103 |
| 5,436,304 A | 7/1995 | Griffin et al. | 526/68 |
| 5,447,895 A | 9/1995 | Marks et al. | 502/117 |
| 5,453,410 A | 9/1995 | Kolthammer et al. | 502/155 |
| 5,453,471 A | 9/1995 | Bernier et al. | 526/68 |
| 5,462,999 A | 10/1995 | Griffin et al. | 526/68 |
| 5,616,661 A | 4/1997 | Eisinger et al. | 526/88 |
| 5,668,228 A | 9/1997 | Chinh et al. | 526/67 |
| 6,211,105 B1 | 4/2001 | Holtcamp | 502/103 |
| 7,247,687 B2 | 7/2007 | Cherkasov et al. | 526/161 |
| 8,329,848 B2 | 12/2012 | Kajihara et al. | 526/348.6 |
| 8,658,556 B2 | 2/2014 | Stewart | 502/202 |
| 10,457,801 B2 | 10/2019 | Canich et al. | C08L 23/16 |
| 10,465,018 B2 * | 11/2019 | Duchateau | C08F 8/00 |
| 10,562,987 B2 | 2/2020 | Canich et al. | C08F 4/6495 |
| 10,618,988 B2 | 4/2020 | Hagadorn et al. | C08F 210/06 |
| 10,626,200 B2 | 4/2020 | Hagadorn et al. | C08F 210/02 |
| 10,640,583 B2 | 5/2020 | Ye et al. | C08F 10/02 |
| 10,676,547 B2 * | 6/2020 | Holtcamp | C08F 4/65912 |
| 10,676,551 B2 * | 6/2020 | Canich | C08F 210/16 |
| 10,829,569 B2 * | 11/2020 | Hagadorn | C08F 4/65927 |
| 11,041,029 B2 * | 6/2021 | Holtcamp | C08F 8/06 |
| 11,041,031 B2 | 6/2021 | Faler et al. | C08F 10/02 |
| 11,117,908 B2 | 9/2021 | Faler et al. | C07F 5/027 |
| 11,396,565 B2 * | 7/2022 | Jasinska-Walc | C08F 210/16 |
| 11,401,360 B2 * | 8/2022 | Jasinska-Walc | C08F 8/44 |
| 2015/0307639 A1 * | 10/2015 | Li | C08F 10/06 264/537 |
| 2018/0002352 A1 | 1/2018 | Hagadorn et al. | C07F 7/00 |
| 2018/0194872 A1 | 7/2018 | Holtcamp et al. | C08F 4/65912 |
| 2018/0201698 A1 | 7/2018 | Hagadorn et al. | C08F 4/65927 |
| 2018/0251585 A1 * | 9/2018 | Bouyahyi | C08F 2/38 |
| 2018/0251586 A1 * | 9/2018 | Canich | C08F 210/16 |
| 2018/0319907 A1 | 11/2018 | Hagadorn et al. | C08F 4/6495 |
| 2019/0330139 A1 | 10/2019 | Faler et al. | C07C 211/64 |
| 2019/0330392 A1 | 10/2019 | Faler et al. | C08F 10/02 |
| 2020/0254431 A1 | 8/2020 | Goryunov et al. | B01J 31/2295 |
| 2020/0255553 A1 | 8/2020 | Goryunov et al. | C08F 10/02 |
| 2020/0255555 A1 | 8/2020 | Goryunov et al. | C08F 10/14 |
| 2020/0255556 A1 | 8/2020 | Goryunov et al. | C08F 10/14 |
| 2020/0255561 A1 | 8/2020 | Harlan et al. | C08F 210/16 |

FOREIGN PATENT DOCUMENTS

| | | | |
|---|---|---|---|
| JP | 2005/320420 | 11/2005 | C08F 232/00 |
| JP | 2006/089542 | 4/2006 | C08F 210/06 |
| JP | 2007/254575 | 10/2007 | C08F 210/06 |
| JP | 2007/261211 | 10/2007 | B32B 27/32 |
| JP | 2007/262330 | 10/2007 | B32B 27/32 |
| JP | 2007/262335 | 10/2007 | C08F 10/06 |
| JP | 2007/262336 | 10/2007 | C08F 210/06 |
| JP | 2007/262338 | 10/2007 | C08F 210/06 |
| JP | 2007/262631 | 10/2007 | C08F 210/06 |
| JP | 2011/256256 | 12/2011 | C08F 210/06 |
| WO | WO1994/007928 | 4/1994 | C08F 10/02 |
| WO | WO1995/014044 | 5/1995 | C08F 4/02 |
| WO | WO1995/015815 | 6/1995 | B01J 31/22 |
| WO | WO2004/026921 | 4/2004 | C08F 10/06 |
| WO | WO2004/046214 | 6/2004 | C08F 210/06 |
| WO | WO2010/050437 | 5/2010 | C08F 230/04 |
| WO | WO2017/013246 | 1/2017 | C08F 210/16 |
| WO | WO2019/122457 | 6/2019 | C08F 220/04 |
| WO | WO 2019122453 A1 * | 6/2019 | C08F 210/06 |
| WO | WO2020/167819 | 8/2020 | C08F 10/06 |
| WO | WO2020/167821 | 8/2020 | C08F 10/00 |
| WO | WO2020/167838 | 8/2020 | C08F 210/06 |
| WO | WO2021/045884 | 3/2021 | C10L 1/02 |

OTHER PUBLICATIONS

U.S. Appl. No. 63/117,303, filed Nov. 23, 2020, Francis C. Rix et al.

U.S. Appl. No. 63/117,312, filed Nov. 23, 2020, Francis C. Rix et al.

U.S. Appl. No. 63/117,328, filed Nov. 23, 2020, Francis C. Rix et al.

U.S. Appl. No. 63/117,333, filed Nov. 23, 2020, Nikola S. Lambic et al.

U.S. Appl. No. 63/131,505, filed Dec. 29, 2020, Tzu-Pin Lin et al.

*Chemical and Engineering News*, v.63(5), p. 27 (1985).

Girolami, G. (1994) "A Simple 'Back of the Envelope' Method for Estimating the Densities and Molecular vols. of Liquids and Solids," *Journal of Chemical Education*, v.71(11), Nov. 1994, pp. 962-964.

Kang, K. K. et al (1998) "Preparations of Propylene and Ethylene Ionomers with Solvay-Type TiCl3 Catalyst," *J.M.S.—Pure Appl. Chem.*, v.A35(6), pp. 1003-1016.

Landoll, L. M. et al. (1989) "Polypropylene Ionomers," *Journal of Polymer Science: Part A: Polymer Chemistry*, v.27(7), pp. 2189-2201.

Lee, J.-W. et al. (2013) "Copolymerization of norbornene with ω-alkenylaluminum as a precursor comonomer for introduction of carbonyl moieties," *Journal of Polymer Science, Part A: Polymer Chemistry*, v.51(23), pp. 5085-5090.

Nam, Y.-G. et al. (2002) "Propene Polymerization with Sterospecific Metallocene Dichloride-[Ph3C][B(C6F5)4] Using ω-Alkenylaluminum as an Alkylation Reagent and as a Functional Comonomer," *Macromolecules*, v.35(18), pp. 6760-6762.

Shiono, T. et al. (2013) "Facile Synthesis of Hydroxy-Functionalized Cycloolefin Copolymer Using ω-Alkenylaluminium as a Comonomer," *Macromol. Chem. Phys.*, v.214(19), pp. 2239-2244.

* cited by examiner

Complex 1

Complex 2

Complex 3

Complex 4

Complex 5

Complex 6

Complex 7

Complex 8

Complex 9

Complex 10

Complex 11

Complex 12

Complex 13

Complex 14

Complex 15

Complex 16

Complex 17

Complex 18

Complex 19

Complex 20

Complex 21

Complex 22

Complex 23

Complex 24

Complex 25

Complex 26

Complex 27

Complex 28

Complex 29

Complex 30

Complex 31

POLYOLEFIN-BASED IONOMERS AND PRODUCTION THEREOF

CROSS REFERENCE TO RELATED APPLICATIONS

This application claims the benefit of and priority to U.S. Provisional Application No. 63/131,488 filed Dec. 29, 2020, the disclosure of which is incorporated herein by reference.

FIELD

The present disclosure relates to a process to produce polyolefin-based ionomers by quenching a polymerization reaction with a functionalizing agent.

BACKGROUND

Cross-linked rubbers are used in numerous industrial and consumer applications, such as for coatings, seals, tires, tubing, and roofing, among many others. Cross-linked rubbers can be composed of vulcanized natural rubbers, polybutadiene, styrene-butadiene copolymers, acrylonitrile-butadiene copolymers, polyisoprene, isoprene-isobutylene copolymers, ethylene-propylene rubber, ethylene propylene diene monomer (EPDM) rubber, silicone elastomers, fluoroelastomers, polyurethane elastomers, and nitrile rubbers, among others. Cross-linked rubbers can be advantageous for combining toughness, elasticity, and resistance to heat, chemicals, and other environmental factors. However, cross-linked rubbers also have important disadvantages. For instance, cross-linked rubbers cannot flow, even at elevated temperature, due to their relatively high cross-linking density. Furthermore, cross-linked rubbers cannot be reprocessed because their cross-linking is irreversible.

Thus, there is a need to develop alternatives to cross-linked rubbers that can flow and be reprocessed while also retaining other properties of cross-linked rubbers, such as toughness, elasticity, and resistance to heat, chemicals, and other environmental exposure.

In addition, while cross-linked rubbers do have advantageous mechanical properties, such as the ability to elastically deform, these mechanical properties are dependent on their underlying polymer composition. For example, in the case of styrene-butadiene copolymers, elastic properties thereof worsen with increasing styrene content. Moreover, various properties of cross-linked rubbers can depend heavily on their specific degree of cross-linking. However, cross-linking can be problematic because cross-linked rubbers tend to allow only limited tuning of their degree of cross-linking, for example, in the case of EPDM rubber.

US 2018/0194872 and U.S. Pat. No. 10,676,547 disclose aluminum vinyl transfer agents and their use a monomers in olefin polymerization.

Thus, there is a need for polymer alternatives to cross-linked rubbers that can retain the mechanical properties of cross-linked rubbers, such as their ability to elastically deform, without the need to cross-link the polymer.

References of interest include: U.S. Pat. No. 8,329,848; WO 2017/013246; WO 2010/050437; WO 2019/122457; US 2018/0201698; U.S. Pat. Nos. 10,562,987; 10,626,200; 10,676,551; WO 2020/167838, WO 2020/167819, US 2020/0254431, US 2020/0255556, US 2020/0255553; US 2020/0255555, WO 2020/167821; US 2020/0255561; US2018/0194872, U.S. Pat. Nos. 10,676,547, 10,562,987, 10,618,988, 10,676,551, and US 2018/0319907.

JP 2011/256256; JP 2007/262335; JP 2007/262631; JP 2007/262336; JP 2007/262330; JP 2007/262338; JP 2007/261211; JP 2007/254575; JP 2006/089542; JP 2003/246820; and JP 2005/320420.

Nam, Y.-G. et al. (2002) "Propene Polymerization with Sterospecific Metallocene Dichloride-[Ph$_3$C][B(C$_6$F$_5$)$_4$] Using ω-Alkenylaluminum as an Alkylation Reagent and as a Functional Comonomer," *Macromolecules*, v. 35(18), pp. 6760-6762; Lee, J.-W. et al. (2013) "Copolymerization of norbornene with ω-alkenylaluminum as a precursor comonomer for introduction of carbonyl moieties," *Journal of Polymer Science, Part A: Polymer Chemistry*, v. 51(23), pp. 5085-5090; Shiono, T. et al. (2013) "Facile Synthesis of Hydroxy-Functionalized Cycloolefin Copolymer Using ω-Alkenylaluminium as a Comonomer," *Macromol. Chem. Phys.*, v. 214(19), pp. 2239-2244; Kang, K. K. et al (1998) "Preparations of Propylene and Ethylene Ionomers with Solvay-Type TiCl$_3$ Catalyst," *J.M.S.—Pure Appl. Chem.*, v. A35(6), pp. 1003-1016; and Landoll, L. M. et al. (1989) "Polypropylene Ionomers," *Journal of Polymer Science: Part A: Polymer Chemistry*, v. 27(7), pp. 2189-2201.

SUMMARY

This invention relates to a process to produce an ionomer comprising:

1) contacting, in a reactor, one or more $C_2$-$C_{60}$ α-olefins, an optional diene, and a metal alkenyl represented by the formula: $Q(R')_{z-v}(R)_v$
where Q is a group 1, 2, 12 or 13 metal,
R is a hydrocarbenyl group containing 4 to 20 carbon atoms having an allyl chain end,
R' is a hydrocarbyl group containing 1 to 30 carbon atoms,
z is 1, 2, or 3, and
v is 1, 2 or 3, where z-v is 0, 1 or 2,
with a catalyst system comprising an activator, a catalyst compound, and a support;

2) forming a copolymer comprising one or more $C_2$-$C_{60}$ α-olefin monomers and about 0.01 wt % to about 20 wt %, based on the weight of the copolymer, of metal alkenyl, where the copolymer optionally has a melting point of 100° C. or more and an Mw of 100,000 g/mol or more;

3) functionalizing and quenching the polymerization reaction with one or more electrophilic groups; and 4) obtaining ionomer comprising an ionic group.

DETAILED DESCRIPTION

Figure 1A:
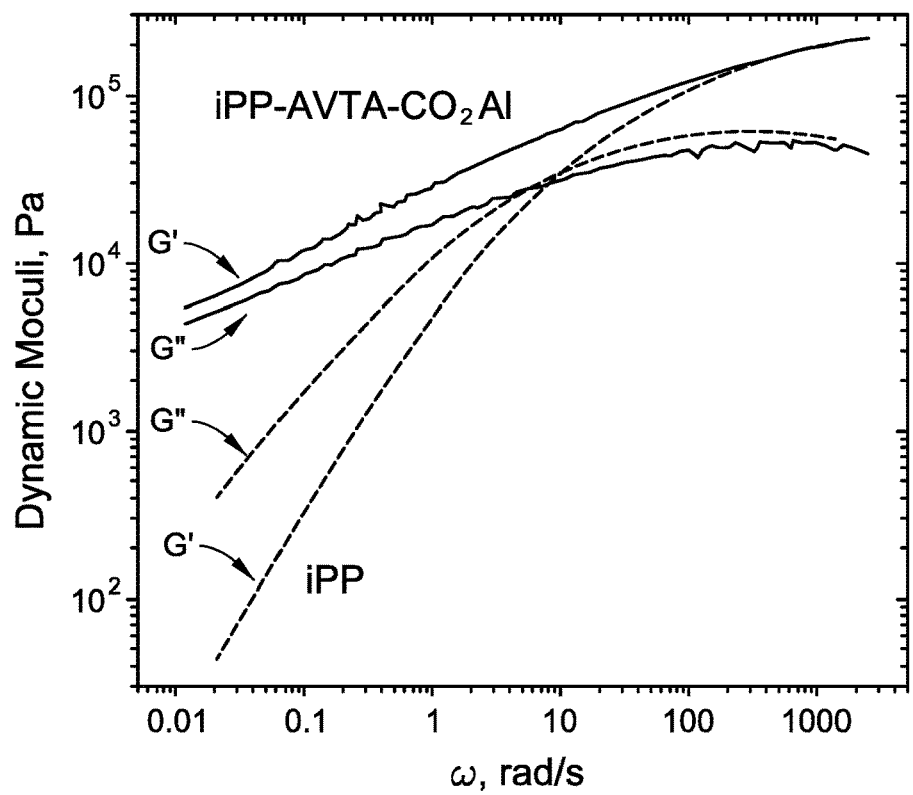
FIGS. 1A and 1B are a set of graphs of SAOS measurements of iPP and iPP ionomer measured at 190° C. Left: dynamic moduli as a function of frequency. Right: complex viscosity as a function of frequency.

The present disclosure generally relates to functionalized polyolefin-based ionomers and production thereof. It has been discovered that compared to nonpolar polyolefins, polyolefins featuring polar ionic groups can have unique and improved properties, such as improved adhesion to metals and glass, as well as improved printability. Some types of polar polyolefins can also provide advanced functionality including for use in fuels, batteries, and sensor materials. Polyolefin-based ionomers (ionomeric polyolefins) are produced from polymers or copolymers (polymer precursors) including, for example, polyethylene, polypropylene, or copolymers of ethylene and propylene.

Further this invention relates to the synthesis of polypropylene based ionomers by vinyl-addition copolymerization of olefins with an aluminum vinyl transfer agent, which can be followed by reactions with $CO_2$, affording thermoplastic that can undergo ion-exchange reactions with various metal ions. The resulting polypropylene ionomers show improved properties, such as melt flow characteristics (compared to conventional, non-ionomer, polypropylene) including superior melt strength, strong shear-thinning, and strong extensional strain hardening. The polypropylene ionomers also show improved mechanical properties, due to additional physically crosslink provided by ion-clusters. The PP-ionomers melts behave as crosslinked materials at low temperatures and can be re-processed into new products at high temperatures.

Polyolefin-based ionomers can be difficult to produce because heteroatom-containing ionic groups, such as hydroxyl or carboxylic acid groups, can inhibit catalyst(s) used to form the polymer precursors (of the ionomers). In that regard, transition metal catalysts (e.g., titanium and zirconium metallocenes) may be used for polymerizing nonpolar olefins because of their propensity for forming polyolefins having high molecular weight and high functional monomer content. However, transition metal catalysts are often readily poisoned by heteroatoms. Some polyolefin catalysts are deactivated by nucleophilic heteroatoms, making ionomeric polyolefin synthesis challenging. Thus, there is a need for producing polyolefin-based ionomers by a method that avoids interaction between heteroatom-containing ionic groups and metal catalysts.

In that regard, a suitable vinyl-addition copolymerization method has been developed. Polyolefin-based polymer precursors of the present disclosure can include olefin comonomer units and metal alkenyl comonomer units, such as aluminum vinyl. In some aspects, the metal alkenyl units can include an aluminum vinyl units (AV), such as di(isobutyl)(7-octen-1-yl)aluminum (AV-1/8). In at least some aspects, the metal alkenyl units can be used to produce polyolefins having pendant metal groups, such as pendant aluminum groups. Thereafter, the pendant metal groups can be converted to ionic groups via oxidation. Thereafter, the polyolefin precursors can undergo ion exchange with metal ions to form polyolefin-based ionomers.

It has been discovered that polyolefin-based ionomers can have improved mechanical properties, such as toughness and elasticity, compared with their precursor copolymers without ionic groups. It has been further discovered that polyolefin-based ionomers can flow and can be reprocessed while also retaining one or more properties of cross-linked rubbers, such as toughness, elasticity, and resistance to heat, chemicals, and other environmental exposure. In some embodiments, the polyolefin-based ionomers, in contrast to their precursor polymers, can behave similarly to physically cross-linked materials, such as cross-linked rubbers, at room temperature and can be reprocessed into new products at relatively higher temperatures. In some embodiments, the polyolefin-based ionomers can perform as well or better than soft grade ethylene propylene rubbers.

Definitions

As used herein, the new notation for the Periodic Table Groups is used as described in *Chemical and Engineering News*, v. 63(5), pg. 27 (1985), e.g., a "group 4 metal" is an element from group 4 of the Periodic Table, e.g. Hf, Ti, or Zr.

A "heteroatom" is an atom other than carbon or hydrogen.

An "olefin," alternatively referred to as "alkene," is a linear, branched, or cyclic compound of carbon and hydrogen having at least one carbon-carbon double bond. For purposes of this specification and the claims appended thereto, when a polymer or copolymer is referred to as comprising an olefin, the olefin present in such polymer or copolymer is the polymerized form of the olefin.

For purposes herein a "polymer" refers to a compound having two or more "mer" units, that is, a degree of polymerization of two or more, where the mer units can be of the same or different species. A "homopolymer" is a polymer having mer units that are the same species. A "copolymer" is a polymer having two or more different species of mer units. A "terpolymer" is a polymer having three different species of mer units. "Different" in reference to mer units indicates that the mer units differ from each other by at least one atom or are different isomerically. Unless otherwise indicated, reference to a polymer herein includes a homopolymer, copolymer, a terpolymer, or any polymer comprising a plurality of the same or different species of repeating units. Likewise, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

The term "residue" or "unit", as used herein, means the organic structure of the monomer in its as-polymerized form as incorporated into a polymer, e.g., through polymerization of the corresponding monomer. Throughout the specification and claims, reference to the monomer(s) and/or the metal alkenyl in the polymer is understood to mean the corresponding as-polymerized form or residue of the respective monomer and/or the metal alkenyl. For example, when a copolymer is said to have an "ethylene" content of 35 wt % to 55 wt % and a "metal alkenyl" content of 5 to 10 wt %, it is understood that the "ethylene" mer unit in the copolymer is derived from ethylene in the polymerization reaction and said derived units are present at 35 wt % to 55 wt %, based upon the weight of the copolymer and that the "metal alkenyl" mer unit in the copolymer is derived from metal alkenyl in the polymerization reaction and said derived units are present at 5 wt % to 10 wt %, based upon the weight of the copolymer.

Unless otherwise indicated, (e.g., the definition of "substituted hydrocarbyl", "substituted silylcarbyl," etc.), the term "substituted" means that at least one hydrogen atom has been replaced with at least one non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, —(CH$_2$)q-SiR*$_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

For purposes of the present disclosure, ethylene shall be considered an α-olefin.

The terms "hydrocarbyl radical," "hydrocarbyl" and "hydrocarbyl group" are used interchangeably throughout this document. Likewise the terms "group," "radical," and "substituent" are also used interchangeably in this document. For purposes of this disclosure, "hydrocarbyl radical" is defined to be a radical, which contains carbon and hydrogen which may be linear, branched, or cyclic, and when cyclic, aromatic or non-aromatic.

Substituted hydrocarbyl radicals are hydrocarbyl radicals in which at least one hydrogen atom has been substituted with at least one functional group such as NR$^x$$_2$, OR$^x$, SeR$^x$, TeR$^x$, PR$^x$$_2$, AsR$^x$$_2$, SbR$^x$$_2$, SR$^x$, BR$^x$ and the like or where at least one non-hydrocarbon atom or group has been inserted within the hydrocarbyl radical, such as —O—, —S—, —Se—, —Te—, —N(R$^x$)—, =N—, —P(R$^x$)—, =P—, —As(R$^x$)—, =As—, —Sb(R$^x$)—, =Sb—, —B(R$^x$)—, =B— and the like, where R$^x$ is independently a hydrocarbyl or halocarbyl radical, and two or more R$^x$ may join together to form a substituted or unsubstituted saturated, partially unsaturated or aromatic cyclic or polycyclic ring structure. Examples of a substituted hydrocarbyls would include —CH$_2$CH$_2$—O—CH$_3$ and —CH$_2$—NMe$_2$ where the radical is bonded via the carbon atom, but would not include groups where the radical is bonded through the heteroatom such as —OCH$_2$CH$_3$ or —NMe$_2$.

The term "alpha-olefin" refers to an olefin having a terminal carbon-to-carbon double bond in the structure thereof ((R$^1$R$^2$)—C=CH$_2$, where R$^1$ and R$^2$ can be independently hydrogen or any hydrocarbyl group; preferably R$^1$ is hydrogen and R$^2$ is an alkyl group). A "linear alpha-olefin" is an alpha-olefin defined in this paragraph wherein R$^1$ is hydrogen, and R$^2$ is hydrogen or a linear alkyl group. A substituted alpha olefin is an alpha olefin where at least one hydrogen atom has been substituted with at least one functional group such as NR*$_2$, OR*, SeR*, TeR*, PR*$_2$, AsR*$_2$, SbR*$_2$, SR*, BR*$_2$, GeR*$_3$, SnR*$_3$, PbR*$_3$ and the like or where at least one non-hydrocarbon atom has been inserted within the olefin structure.

Silylcarbyl radicals are radicals in which one or more hydrocarbyl hydrogen atoms have been substituted with at least one SiR*$_3$ containing group or where at least one —Si(R*)$_2$— has been inserted within the hydrocarbyl radical where R* is independently a hydrocarbyl or halocarbyl radical, and two or more R* may join together to form a substituted or unsubstituted saturated, partially unsaturated or aromatic cyclic or polycyclic ring structure.

Substituted silylcarbyl radicals are silylcarbyl-radicals in which at least one hydrogen atom has been substituted with at least one functional group such as NR*$_2$, OR*, SeR*, TeR*, PR*$_2$, AsR*$_2$, SbR*$_2$, SR*, BR*$_2$, GeR*$_3$, SnR*$_3$, PbR*$_3$ and the like or where at least one non-hydrocarbon atom or group has been inserted within the silylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated, or aromatic cyclic or polycyclic ring structure. Substituted silylcarbyl radicals are only bonded via a carbon or silicon atom.

Germylcarbyl radicals are radicals in which one or more hydrocarbyl hydrogen atoms have been substituted with at least one GeR*$_3$ containing group or where at least one —Ge(R*)$_2$— has been inserted within the hydrocarbyl radical where R* independently a hydrocarbyl or halocarbyl radical, and two or more R* may join together to form a substituted or unsubstituted saturated, partially unsaturated or aromatic cyclic or polycyclic ring structure. Substituted germylcarbyl radicals are only bonded via a carbon or germanium atom.

Substituted germylcarbyl radicals are germylcarbyl radicals in which at least one hydrogen atom has been substituted with at least one functional group such as NR*$_2$, OR*, SeR*, TeR*, PR*$_2$, AsR*$_2$, SbR*$_2$, SR*, BR*$_2$, SiR*$_3$, SnR*$_3$, PbR*$_3$ and the like or where at least one non-hydrocarbon atom or group has been inserted within the germylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

Halocarbyl radicals are radicals in which one or more hydrocarbyl hydrogen atoms have been substituted with at least one halogen (e.g. F, Cl, Br, I) or halogen-containing group (e.g. CF$_3$).

Substituted halocarbyl radicals are halocarbyl radicals in which at least one halocarbyl hydrogen or halogen atom has been substituted with at least one functional group such as NR*$_2$, OR*, SeR*, TeR*, PR*$_2$, AsR*$_2$, SbR*$_2$, SR*, BR*$_2$ and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B— and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure. Substituted halocarbyl radicals are only bonded via a carbon atom.

For purposes of the present disclosure, "alkoxides" include those where the alkyl group is a C$_1$ to C$_{10}$ hydrocarbyl. The alkyl group may be straight chain, branched, or cyclic. The alkyl group may be saturated or unsaturated. In some embodiments, the alkyl group may comprise at least one aromatic group.

The term "aryl" or "aryl group" means a monocyclic or polycyclic aromatic ring and the substituted variants thereof, including but not limited to, phenyl, naphthyl, 2-methylphenyl, xylyl, 4-bromo-xylyl. Likewise "heteroaryl" means an aryl group where a ring carbon atom (or two or three ring carbon atoms) has been replaced with a heteroatom, such as N, O, or S. The term "substituted aryl" means: 1) an aryl group where a hydrogen has been replaced by a substituted or unsubstituted hydrocarbyl group, a substituted or unsubstituted halocarbyl group, a substituted or unsubstituted silylcarbyl group, or a substituted or unsubstituted germylcarbyl group. The term "substituted heteroaryl" means: 1) a heteroaryl group where a hydrogen has been replaced by a substituted or unsubstituted hydrocarbyl group, a substituted or unsubstituted halocarbyl group, a substituted or unsubstituted silylcarbyl group, or a substituted or unsubstituted germylcarbyl group.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are reported in units of g/mol. The following abbreviations may be used herein: ENB is 5-ethylidene-2-norbornene, Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, Cp is cyclopentadienyl, Ind is indenyl, RT is room temperature and is 23° C. (unless otherwise indicated), and MAO is methylalumoxane.

For purposes herein, a "catalyst system" is the combination of at least one catalyst compound, at least one activator, an optional co-activator, and an optional support material. For purposes of the present disclosure and the claims thereto, when catalyst systems are described as comprising neutral stable forms of the components, it is well understood by one of ordinary skill in the art, that the ionic form of the component is the form that reacts with the monomers to produce polymers.

In the description herein, the metallocene catalyst may be described as a catalyst precursor, a pre-catalyst compound, metallocene catalyst compound or a transition metal compound, and these terms are used interchangeably.

For purposes of the present disclosure in relation to catalyst compounds, such as metallocene compounds, the term "substituted" means that one or more hydrogen atoms have been replaced with a hydrocarbyl, heteroatom (such as a halide), or a heteroatom containing group, (such as silylcarbyl, germylcarbyl, halocarbyl, etc.). For example, methyl cyclopentadiene (Cp) is a Cp group substituted with a methyl group.

A "metallocene" catalyst compound is an organometallic transition metal catalyst compound having one, two or three, typically one or two, substituted or unsubstituted cyclopentadienyl ligands bound to the transition metal, typically a metallocene catalyst is an organometallic compound containing at least one π-bound cyclopentadienyl moiety (or substituted cyclopentadienyl moiety). Substituted or unsubstituted cyclopentadienyl ligands include substituted or unsubstituted indenyl, fluorenyl, tetrahydro-s-indacenyl, tetrahydro-as-indacenyl, benz[f]indenyl, benz[e]indenyl, tetrahydrocyclopenta[b]naphthalene, tetrahydrocyclopenta[a]naphthalene, and the like.

The following numbering schemes are used herein for cyclopentadienyl, indenyl, fluorenyl, and cyclopentanaphthyl (also termed benzindenyl). It should be noted that indenyl can be considered a cyclopentadienyl fused with a benzene ring. Analogously, fluorenyl can be considered a cyclopentadienyl with two phenyl rings fused onto the cyclopentadienyl ring. Each structure below is drawn and named as an anion.

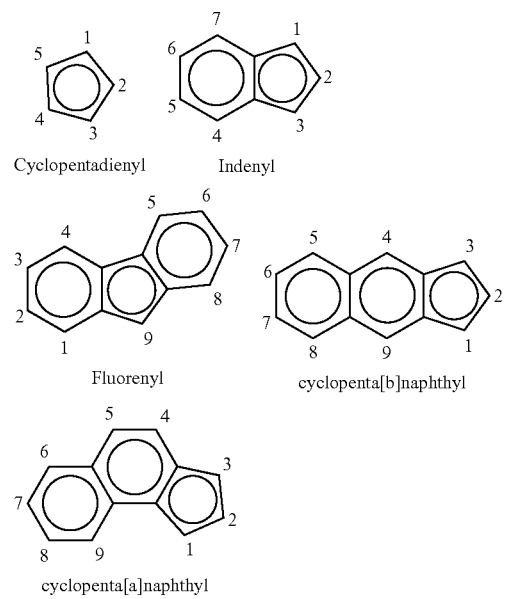

The following numbering schemes are used herein for indenyl, tetrahydro-s-indacenyl and tetrahydro-as-indacenyl ligands.

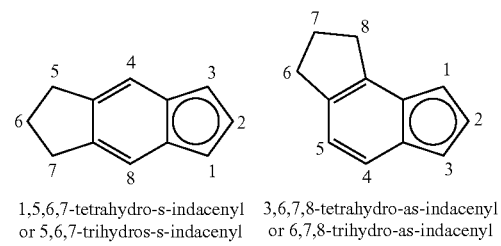

The term "post-metallocene" also referred to as "post-metallocene catalyst" or "post-metallocene compound" describes transition metal complexes that contain a transition metal, at least one anionic donor ligand, and at least one leaving group with a non-carbon atom directly linking to the metal (such as halogen leaving group(s)), but do not contain any π-coordinated cyclopentadienyl anion donors (e.g., π-bound cyclopentadienyl moiety or substituted cyclopentadienyl moiety), where the complexes are useful for the polymerization of olefins, typically when combined with activator(s). Post-metallocene catalysts include those first disclosed after 1980, typically after 1990.

The term "single site coordination polymerization catalyst" means metallocene or post metallocene catalyst compounds, including but not limited to bis(phenolate) heterocyclic Lewis base complexes, that are capable of copolymerizing olefin and metal alkenyl, as opposed to, or in addition to, the metal alkenyl acting as a terminating or transfer agent.

The term "bis(phenolate) heterocyclic Lewis base complex" refers to a class of metal complexes described in WO 2020/167838; WO 2020/167819; US 2020/0254431; US 2020/0255556; US 2020/0255553; US 2020/0255555; WO 2020/167821; and US 2020/0255561 which feature complexes of a tridentate dianionic ligand that features a central heterocyclic Lewis base and a pair of phenolate donors.

The term "quinolinyldiamido complex" or "quinolinyldiamido catalyst" or "quinolinyldiamide complex" or "quinolinyldiamide catalyst" refers to a related class of pyridyldiamido complex/catalyst described in US 2018/0002352 where a quinolinyl moiety is present instead of a pyridyl moiety. In embodiments herein, the catalyst does not comprise a quinolinyldiamido complex.

Description

This invention relates to a process to produce an ionomer comprising:
1) contacting, in a reactor, one or more $C_2$-$C_{60}$ α-olefins (such as ethylene and/or propylene), an optional diene, and a metal alkenyl, represented by the formula: $Q(R')_{z-v}(R)_v$
where Q is a group 1, 2, 12 or 13 metal, such as Al, B Ga, Mg, Li, or Zn,
R is a hydrocarbenyl group containing 4 to 20 carbon atoms having an allyl chain end,
R' is a hydrocarbyl group containing 1 to 30 carbon atoms,
z is 1, 2, or 3 (such as where z is 3 for group 13 metals, z is 2 for group 2 and 12 metals, and z is 1 for group 1 metals); and
v is 1, 2 or 3, where z-v is 0, 1 or 2;
with a catalyst system comprising an activator (such as an alumoxane or a non-coordinating anion), a catalyst compound (such as a single site coordination polymerization catalyst), and a support (such as silica);
2) forming a copolymer comprising one or more $C_2$-$C_{60}$ α-olefin monomers (such as ethylene and/or propylene) and about 0.01 wt % to about 20 wt %, based on the weight of the copolymer, of metal alkenyl, wherein the copolymer optionally has a melting point of 100° C. or more and or an Mw of 100,000 g/mol; and
3) functionalizing and quenching the polymerization reaction with one or more electrophilic groups, such as $CO_2$, $CS_2$, COS, $O_2$, $H_2O$ $SO_2$, $SO_3$, $P_2O_5$, $NO_2$, epoxides, cyclic anhydrides (such as maleic anhydride), methyl methacrylate, styrenics (such as styrene), and air; and
4) obtaining ionomer comprising an ionic group, such as a sulfonate, a phosphonate, alkoxy, carboxlate (such as thiocarboxlate), phosphate, epoxide, or styrenic (such as styrene, para methylstyrene);
where the ionomer optionally has a shear thinning index of 500 or more and/or a strain hardening ratio of 5 or more, when measured at Hencky strain rate of 10 $sec^{-1}$.

Copolymers

Copolymers of the present disclosure comprise an α-olefin monomer, an optional comonomer, an optional diene, and a metal alkenyl, such as an aluminum vinyl. For example, the copolymer can have about 50 wt % to about 99.9 wt % $C_2$-$C_{60}$ α-olefin monomer and optional comonomer; about 0.1 wt % to about 20 wt % diene units; and about 0.1 wt % to about 10 wt % aluminum vinyl units, based on the total weight of the copolymer.

In at least one embodiment, copolymer comprises:
1) an α-olefin monomer content of 50 wt % to about 99.99 wt % (such as from about 70 wt % to about 99.90 wt %, such as from about 90 wt % to about 98.88 wt %, based on the weight of the copolymer);
2) an optional α-olefin comonomer content of 0.1 wt % to about 50 wt % (such as from about 1 wt % to about 30 wt %, such as from about 3 wt % to about 20 wt %, based on the weight of the copolymer);
3) an optional diene content of 0.01 wt % to about 20 wt % (such as from about 0.1 wt % to about 10 wt %, such as from about 0.5 wt % to about 5 wt %, such as from about 1 wt % to about 3 wt %, such as from about 1.5 wt % to about 3 wt %, based on the weight of the copolymer); and
4) a metal alkenyl content of about 0.01 wt % to about 20 wt % (such as from about 0.1 wt % to about 10 wt %, such as from about 0.1 wt % to about 5 wt %, such as from about 0.3 wt % to about 3 wt %, such as from about 0.5 wt % to about 1.5 wt %, based on the weight of the copolymer); and
5) wherein the copolymer has an melting point of 80° C. or more, such as 100° C. or more and/or an Mw of 100,000 g/mol or more, such as an Mw of 150,000 g/mol or more.

In at least one embodiment, copolymer comprises:
1) ethylene present at 50 wt % to about 99.89 wt % (such as from about 70 wt % to about 99.5 wt %, such as from about 80 wt % to about 99 wt %, such as from about 90 wt % to about 99 wt %,based on the weight of the copolymer) of ethylene;
2) an α-olefin comonomer, such as propylene, present at 0.1 wt % to about 50 wt % (such as from about 1 wt % to about 30 wt %, such as from about 3 wt % to about 20 wt %, based on the weight of the copolymer);
3) optional diene present at 0.01 wt % to about 20 wt % (such as from about 0.1 wt % to about 10 wt %, such as from about 0.5 wt % to about 5 wt %, such as from about 1 wt % to about 3 wt %, such as from about 1.5 wt % to about 3 wt %, based on the weight of the copolymer); and
4) metal alkenyl present at about 0.01 wt % to about 20 wt % (such as from about 0.1 wt % to about 10 wt %, such as from about 0.1 wt % to about 5 wt %, such as from about 0.3 wt % to about 3 wt %, such as from about 0.5 wt % to about 1.5 wt %, based on the weight of the copolymer); and
5) wherein the copolymer has an melting point of 80° C. or more, such as 100° C. or more and/or an Mw of 100,000 g/mol or more, such as as an Mw of 150,000 g/mol or more.

In at least one embodiment, copolymer comprises:
1) propylene present at 50 wt % to about 99.89 wt % (such as from about 70 wt % to about 99.5 wt %, such as from about 80 wt % to about 99 wt %, such as from about 90 wt % to about 99 wt %, based on the weight of the copolymer) of ethylene;
2) ethylene present at 0.1 wt % to about 50 wt % (such as from about 1 wt % to about 30 wt %, such as from about 3 wt % to about 20 wt %, based on the weight of the copolymer);
3) optional diene present at 0.01 wt % to about 20 wt % (such as from about 0.1 wt % to about 10 wt %, such as from about 0.5 wt % to about 5 wt %, such as from about 1 wt % to about 3 wt %, such as from about 1.5 wt % to about 3 wt %, based on the weight of the copolymer); and
4) metal alkenyl present at about 0.01 wt % to about 20 wt % (such as from about 0.1 wt % to about 10 wt %, such as from about 0.1 wt % to about 5 wt %, such as from about 0.3 wt % to about 3 wt %, such as from about 0.5 wt % to about 2.0, such as from about 0.5 wt % to about 1.5 wt %, based on the weight of the copolymer); and
5) wherein the copolymer has an melting point of 80° C. or more, such as 100° C. or more and/or an Mw of 100,000 g/mol or more, such as an Mw of 150,000 g/mol or more.

Olefin Monomers and Comonomers

Monomers and optional comonomers independently include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomer is ethylene and the optional comonomer comprises one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups. In another embodiment, the monomer is propylene and the optional comonomer comprises one or more ethylene or $C_4$ to $C_{40}$ olefins, such as $C_4$ to $C_{20}$ olefins, such as $C_6$ to $C_{12}$ olefins (such as butene, pentene, hexene, heptene, octene, nonene, decene, undecene, dodecene and isomers thereof). The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers may include ethylene, propylene, butene, pentene, hexene, heptene, octene, nonene, decene, undecene, dodecene, norbornene, dicyclopentadiene, cyclopentene, cycloheptene, cyclooctene, cyclododecene, 7-oxanorbornene, substituted derivatives thereof, and isomers thereof, such as hexene, heptene, octene, nonene, decene, dodecene, cyclooctene, 1-hydroxy-4-cyclooctene, 1-acetoxy-4-cyclooctene, 5-methylcyclopentene, cyclopentene, norbornene, and their respective homologs and derivatives, such as norbornene.

In at least one embodiment, an α-olefin monomer or comonomer can be a linear α-olefin. Linear α-olefins (LAOs) can be substituted or unsubstituted $C_6$-$C_{60}$ LAOs, such as $C_6$-$C_{50}$ LAOs, such as $C_8$-$C_{40}$ LAOs, such as $C_{10}$-$C_{30}$ LAOs, such as $C_{10}$-$C_{20}$ LAOs, such as $C_{15}$-$C_{20}$ LAOs, alternatively $C_8$-$C_{16}$ LAOs, such as $C_8$-$C_{12}$ LAOs. In at least one embodiment, the copolymer comprises linear α-olefin units selected from 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-icosene, 1-henicosene, 1-docosene, 1-tricosene, 1-tetracosene, 1-pentacosene, and combination(s) thereof.

Diene

In at least one embodiment, the copolymers have a diene content of about 0.01 wt % to about 15 wt %, such as from about 0.05 wt % to about 10 wt %, such as from about 0.1 wt % to about 10 wt %, such as from about 0.5 wt % to about 8 wt %, such as from about 1 wt % to about 6 wt %, such as from about 2 wt % to about 5 wt %, based on the weight of the copolymer.

In at least one embodiment, dienes can be substituted or unsubstituted dienes selected from $C_4$-$C_{60}$ dienes, such as $C_5$-$C_{50}$ dienes, such as $C_5$-$C_{40}$ dienes, such as $C_5$-$C_{30}$ dienes, such as $C_5$-$C_{20}$ dienes, such as $C_6$-$C_{15}$ dienes, such as $C_6$-$C_{10}$ dienes, such as $C_7$-$C_9$ dienes, such as a substituted or unsubstituted $C_7$ diene, $C_8$ diene, or $C_9$ diene. In at least one embodiment, a copolymer has diene units of a $C_7$ diene. In at least one embodiment, a diene is a substituted or unsubstituted α,Ω-diene (e.g., the diene units of the copolymer are formed from di-vinyl monomers). The dienes can be linear di-vinyl monomers. In at least one embodiment, a diene is selected from butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and combination(s) thereof. In some embodiments, a diene is selected from 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and combination(s) thereof. In at least one embodiment, a diene is selected from cyclopentadiene, vinylnorbornene, norbornadiene, 5-ethylidene-2-norbornene, 5-vinyl-2-norbornene, divinylbenzene, dicyclopentadiene, and combination(s) thereof. In at least one embodiment, the copolymer has diene units of 5-ethylidene-2-norbornene.

Metal Alkenyl

The copolymers typically have a metal alkenyl content of about 0.01 wt % to about 20 wt %, such as from about 0.1 wt % to about 10 wt %, such as from about 0.1 wt % to about 5 wt %, such as from about 0.3 wt % to about 3 wt %, such as from about 0.5 wt % to about 2.0 wt %, such as from about 0.5 wt % to about 1.5, based on the weight of the copolymer.

In embodiments, the metal alkenyl is represented by the formula:

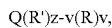

$$Q(R')_{z-v}(R)_v,$$

where:
Q is a group 1, 2, 12 or 13 metal, such as Al, B Ga, Mg, Li, or Zn,
R is a hydrocarbenyl group containing 4 to 20 carbon atoms having an allyl chain end,
R' is a hydrocarbyl group containing 1 to 30 carbon atoms,
z is 1, 2, or 3 (such as where z is 3 for group 13 metals, z is 2 for group 2 and 12 metals, and z is 1 for group 1 metals); and
v is 1, 2 or 3, where z-v is 0, 1 or 2.

In embodiments, the metal alkenyl is represented by the formula:

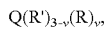

$$Q(R')_{3-v}(R)_v,$$

wherein:
Q is a group 13 metal, such as Al, B Ga, such as Al,
R is a hydrocarbenyl group containing 4 to 20 carbon atoms having an allyl chain end,
R' is a hydrocarbyl group containing 1 to 30 carbon atoms, and
v is 1, 2 or 3.

In embodiments, the metal alkenyl is represented by the formula:

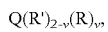

$$Q(R')_{2-v}(R)_v,$$

wherein:
Q is a group 2 or 12 metal, such as Be, Mg, Ca, Sr, Zn, Cd, or Hg, such as Mg or Zn,
R is a hydrocarbenyl group containing 4 to 20 carbon atoms having an allyl chain end,
R' is a hydrocarbyl group containing 1 to 30 carbon atoms, and
v is 1 or 2.

In embodiments, the metal alkenyl is represented by the formula:

$$QR$$

wherein:
Q is a group 1 metal, such as Li, Na, K, or Rb,
R is a hydrocarbenyl group containing 4 to 20 carbon atoms having an allyl chain end.

The metal alkenyl is typically represented by the formula:

$Q(R')_{3-v}(R'')_v$ (such as $Al(R')_{3-v}(R'')_v$ or $E[Al(R')_{2-y}(R'')_y]_2)$ wherein Q is a group 1, 2, 12 or 13 metal, such as Al, B Ga, Mg, Li, or Zn; each R', independently, is a $C_1$ to $C_{30}$ hydrocarbyl group; each R'', independently, is a $C_4$ to $C_{20}$ hydrocarbenyl group having an allyl chain end; E is a group 16 element (such as O or S); v is 1, 2 or 3; and y is 1 or 2. Preferably, the metal alkenyl is an aluminum alkenyl represented by the formula: $Al(R')_{3-v}(R)_v$ where R is a hydrocarbenyl group containing 4 to 20 carbon atoms having an allyl chain end, R' is a hydrocarbyl group containing 1 to 30 carbon atoms, and v is 1, 2 or 3.

The organoaluminum compounds described herein and referred to as aluminum alkenyls or aluminum vinyls (AV), are typically the reaction product(s) of alkyl dienes with aluminum reagent(s) selected from trialkyl aluminums, dialkylaluminumhydrides, alkylaluminumdihydrides, and/or aluminumtrihydride. The alkyl diene and the aluminum reagent are combined and heated to produce the organoaluminum compound(s), which is useful as monomer and/or scavenger when utilized with metallocene and other transition metal catalysts to prepare polymers, such as polyethylene, polypropylene, and copolymers of ethylene and/or propylene.

In at least one embodiment, the metal alkenyls can be aluminum vinyls (alkenylaluminum or aluminum alkenyls). In at least one embodiment, metal alkenyls can include a metal having a carbon chain with a vinyl end group and two additional bulky groups, such as $C_4$ to $C_{40}$ alkyl groups, such as isobutyl groups. The bulky groups can sterically hinder their respective Al—C bonds making $CO_2$ insertion difficult at those locations, thereby promoting selective insertion of $CO_2$ on the alkenyl side having the vinyl chain end. In at least one embodiment, the metal alkenyl units, such aluminum vinyl units, can be any metal, such as aluminum, agent that contains at least one end-vinyl group also referred to as an allyl chain end. An allyl chain end is represented by the formula $H_2C=CH—CH_2—$. "Allylic vinyl group," "allyl chain end," "vinyl chain end," "vinyl termination," "allylic vinyl group," "terminal vinyl group," and "vinyl terminated" are used interchangeably herein and refer to an allyl chain end. An allyl chain end is not a vinylidene chain end or a vinylene chain end. The number of allyl chain ends, vinylidene chain ends, vinylene chain ends, and other unsaturated chain ends is determined using $^1$H NMR as follows: $^1$H NMR spectroscopic data for aluminum vinyl units are obtained at room temperature using a Bruker 400 MHz NMR. Data are collected using samples prepared by dissolving 10-20 mg the compound in 1 mL of $C_6D_6$. Samples are then loaded into 5 mm NMR tubes for data collection. Data are recorded using a maximum pulse width of 45°, 8 seconds between pulses and signal averaging either 8 or 16 transients. The spectra are normalized to protonated tetrachloroethane in the $C_6D_6$. The chemical shifts (δ) are reported as relative to the residual protium in the deuterated solvent at 7.15 ppm.

Useful metal alkenyl groups, such as aluminum vinyl groups, contain a hydrocarbenyl group having an allyl chain end, typically represented by the formula $CH_2=CH—CH_2—R—$, where R represents a hydrocarbenyl group or a substituted hydrocarbenyl group, such as a $C_1$ to $C_{20}$ alkylene, preferably methylene ($CH_2$), ethylene [$(CH_2)_2$], propandiyl [$(CH_2)_3$], butandiyl [$(CH_2)_4$], pentandiyl [$(CH_2)_5$], hexandiyl [$(CH_2)_6$], heptandiyl [$(CH_2)_7$], octandiyl [$(CH_2)_8$], nonandiyl [$(CH_2)_9$], decandiyl [$(CH_2)_{10}$], undecandiyl [$(CH_2)_{11}$], dodecandiyl [$(CH_2)_{12}$], or an isomer thereof.

In some embodiments, the metal alkenyl group is an aluminum vinyl group represented by the Formula (II):

$Al(R')_{3-v}(R)_v$ (II)

where R is a hydrocarbenyl group containing 4 to 20 carbon atoms having an allyl chain end, R' is a hydrocarbyl group containing 1 to 30 carbon atoms, and v is 1, 2 or 3.

In at least one embodiment of Formula (II) for the aluminum vinyl unit described herein, each R' is independently chosen from $C_1$ to $C_{50}$ hydrocarbyl groups (such as a $C_1$ to $C_{20}$ alkyl groups, preferably methyl, ethyl, propyl, butyl, pentyl, hexyl, heptyl, octyl, nonyl, decyl, undecyl, dodecyl, or an isomer thereof), and R is represented by the formula:

—$(CH_2)_n$CH=$CH_2$ where n is an integer from 2 to 18, preferably between 5 to 18, preferably 5 to 12, preferably 5 to 6. In at least one embodiment, particularly useful AVs include isobutyl-di(oct-7-en-1-yl)-aluminum, isobutyl-di(dec-9-en-1-yl)-aluminum, isobutyl-di(non-8-en-1-yl)-aluminum, isobutyl-di(hept-6-en-1-yl)-aluminum, dimethyl(oct-7-en-1-yl)aluminum, diethyl(oct-7-en-1-yl)aluminum, dibutyl(oct-7-en-1-yl)aluminum, diisobutyl(oct-7-en-1-yl)aluminum, diisobutyl(non-8-en-1-yl)aluminum, diisobutyl(dec-9-en-1-yl)aluminum, diisobutyl(dodec-10-en-1-yl)aluminum, diisobutyl(hept-6-en-1-yl)aluminum, diethyl(hept-6-en-1-yl)aluminum, dimethyl(hept-6-en-1-yl)aluminum and the like. Mixtures of one or more AVs may also be used. In some embodiments, isobutyl-di(oct-7-en-1-yl)-aluminum, isobutyl-di(dec-9-en-1-yl)-aluminum, and/or isobutyl-di(non-8-en-1-yl)-aluminum, isobutyl-di(hept-6-en-1-yl)-aluminum are used.

Useful aluminum vinyl units include organoaluminum compound reaction products between an aluminum reagent ($AlR^a_3$) and an alkyl diene. Suitable alkyl dienes include those that have two "α-olefins" at two termini of the carbon chain. The alkyl diene can be a straight chain or branched alkyl chain and substituted or unsubstituted. Exemplary alkyl dienes include but are not limited to, for example, 1,3-butadiene, 1,4-pentadiene, 1,5-hexadiene 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, 1,14-pentadecadiene, 1,15-hexadecadiene, 1,16-heptadecadiene, 1,17-octadecadiene, 1,18-nonadecadiene, 1,19-eicosadiene, 1,20-heneicosadiene, etc. Exemplary aluminum reagents include triisobutylaluminum, diisobutylaluminumhydride, isobutylaluminumdihydride and aluminum hydride ($AlH_3$).

In at least one embodiment, particularly useful AVs isobutyl-di(oct-7-en-1-yl)-aluminum, isobutyl-di(dec-9-en-1-yl)-aluminum, isobutyl-di(non-8-en-1-yl)-aluminum, isobutyl-di(hept-6-en-1-yl)-aluminum, dimethyl(oct-7-en-1-yl)aluminum, diethyl(oct-7-en-1-yl)aluminum, dibutyl(oct-7-en-1-yl)aluminum, diisobutyl(oct-7-en-1-yl)aluminum, diisobutyl(non-8-en-1-yl)aluminum, diisobutyl(dec-9-en-1-yl)aluminum, diisobutyl(dodec-10-en-1-yl)aluminum, diisobutyl(hept-6-en-1-yl)aluminum, diethyl(hept-6-en-1- yl)aluminum, dimethyl(hept-6-en-1-yl)aluminum, di-n-octyl(7-octen-1-yl)aluminum, n-octyl(di-7-octen-1-yl)aluminum, and diisobutyl(6-hepten-1-yl)aluminum.

In any embodiment of the invention described herein, R is butenyl, pentenyl, heptenyl, or octenyl. In some embodiments, R is octenyl.

In any embodiment of the invention described herein, R' is methyl, ethyl, propyl, isobutyl, or butyl. In some embodiments, R' is isobutyl.

In any embodiment of the invention described herein, $R^a$ is methyl, ethyl, propyl, isobutyl, or butyl. In some embodiments, $R^a$ is isobutyl.

In any embodiment of the invention described herein, v is about 2, or v is 2.

Figure 4A:
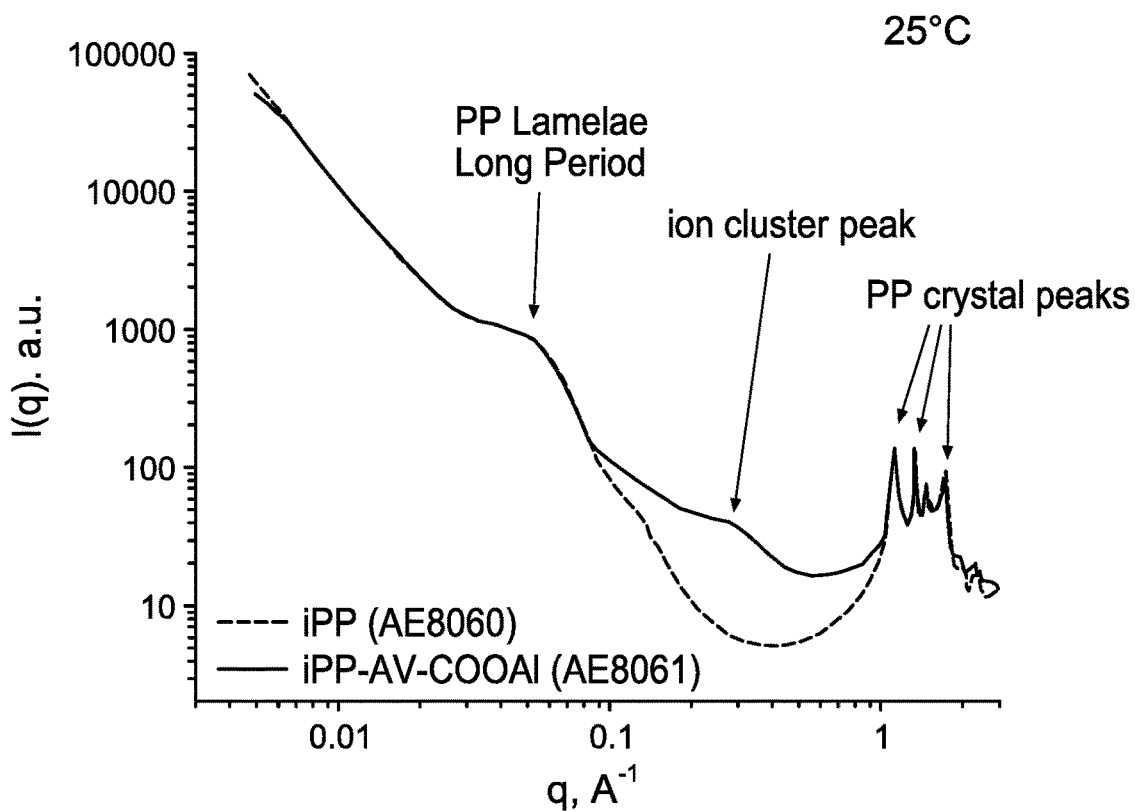
FIGS. 4A, 4B, and 4C show X-ray scattering measurements of iPP control and iPP ionomer measured at the indicated temperatures on the right is a schematic representation of the physical crosslink network connected by ion clusters in iPP ionomers.
Figure 4B:
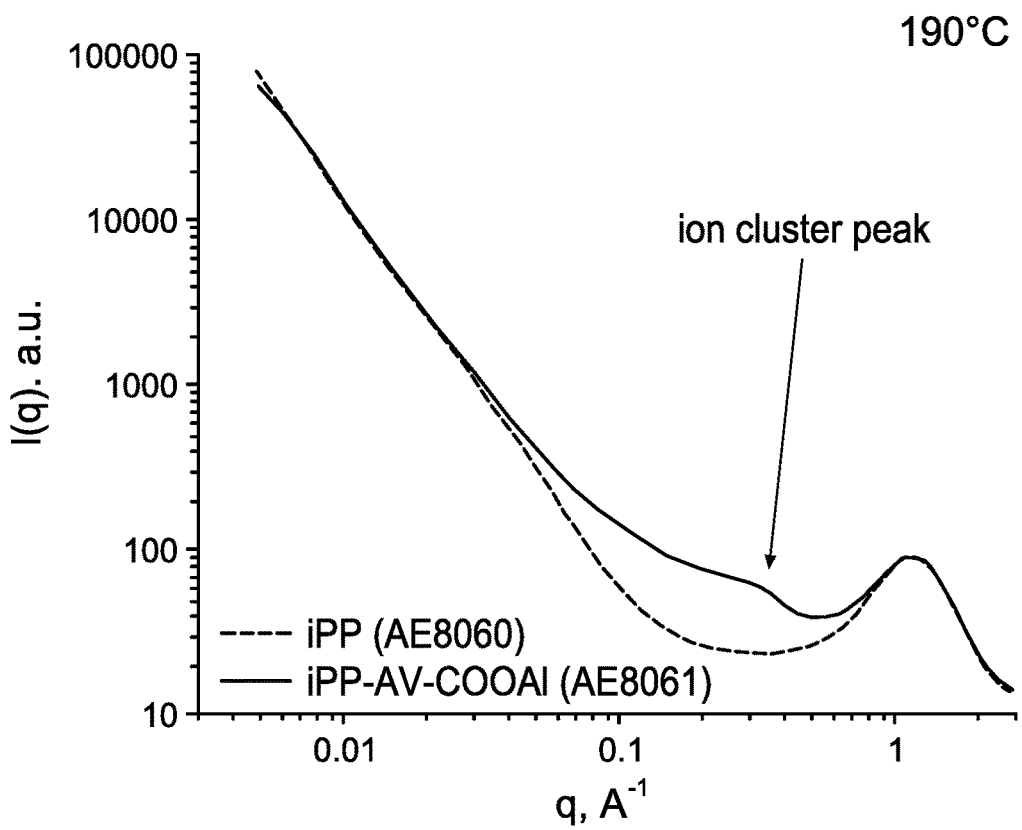
Figure 4C:
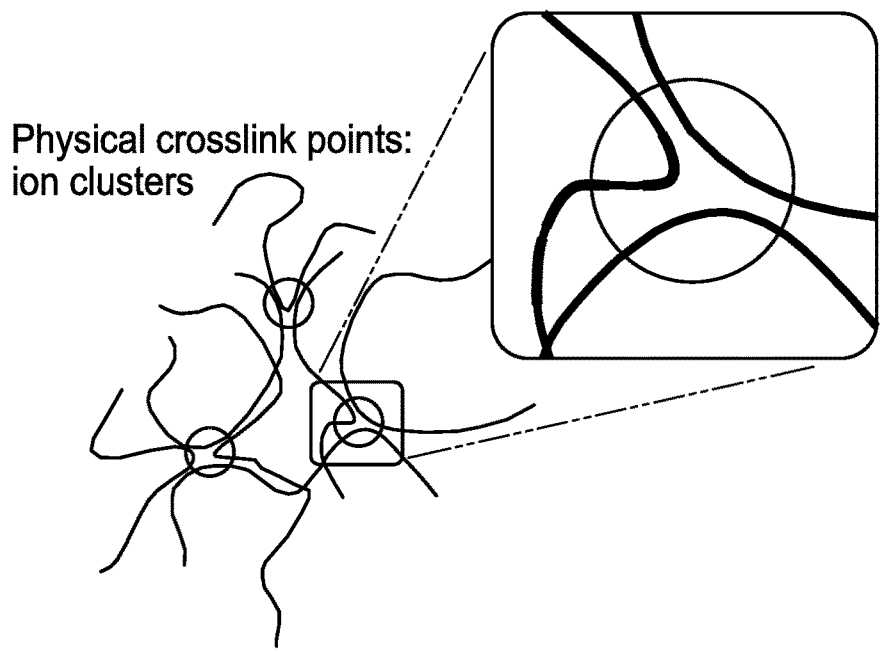
Figure 5A:
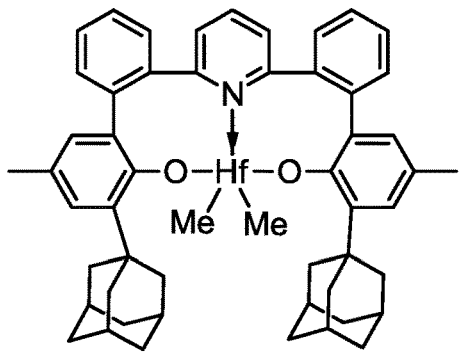
FIGS. 5A, 5B, 5C, 5D and 5E show catalyst compounds represented by Formula (A).
Figure 5A:
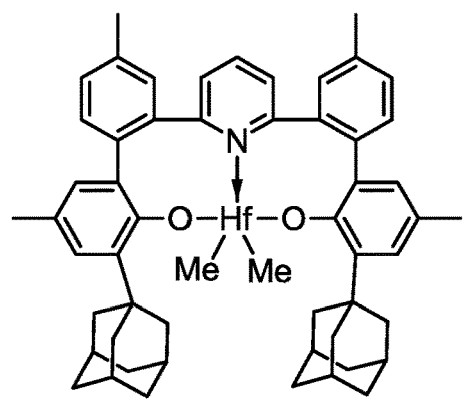
Figure 5A:
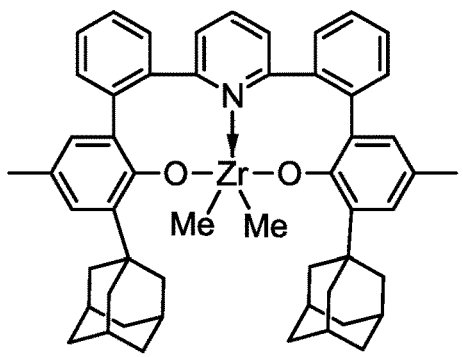
Figure 5A:
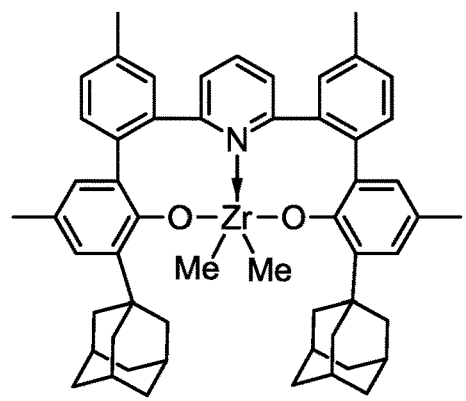
Figure 5A:
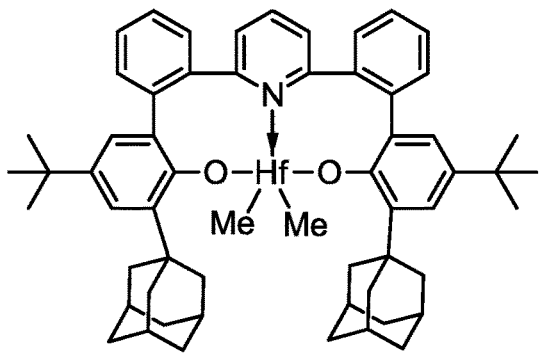
Figure 5A:
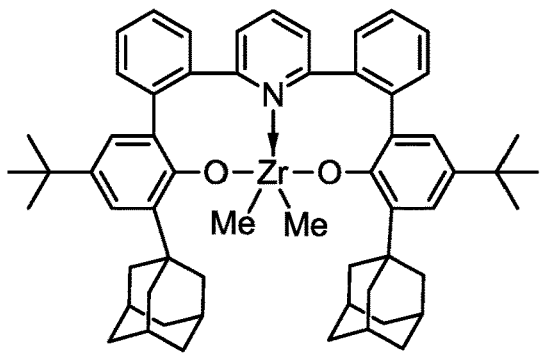
Figure 5B:
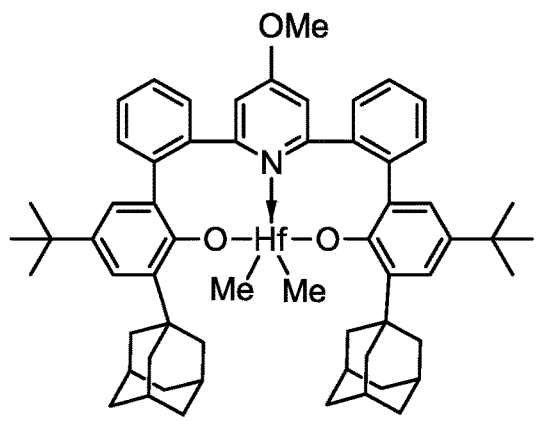
Figure 5B:
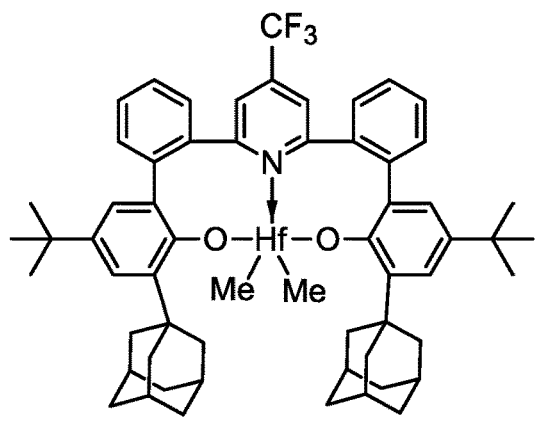
Figure 5B:
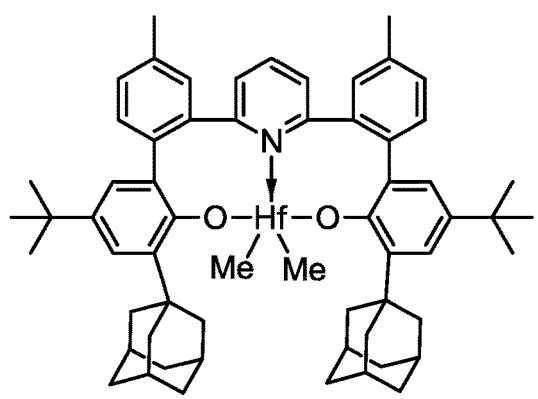
Figure 5B:
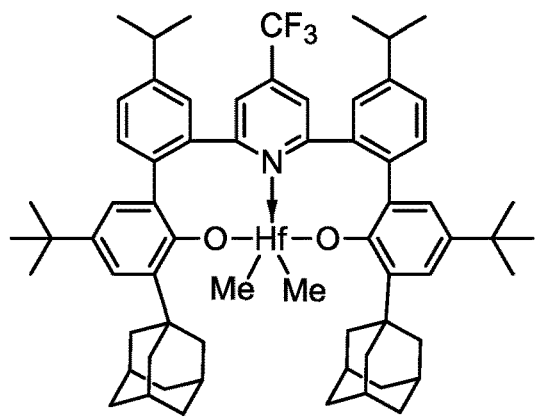
Figure 5B:
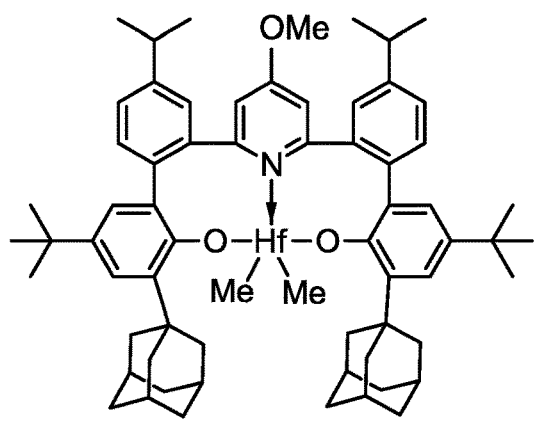
Figure 5B:
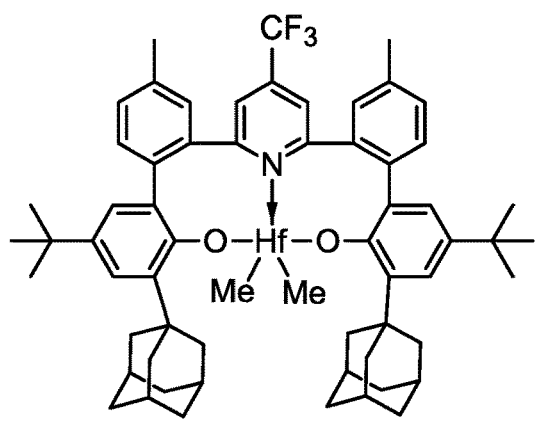
Figure 5C:
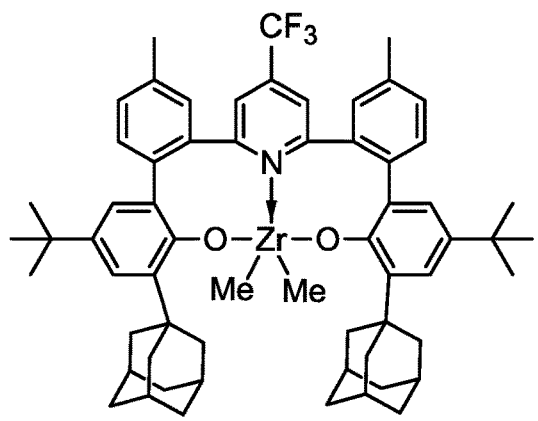
Figure 5C:
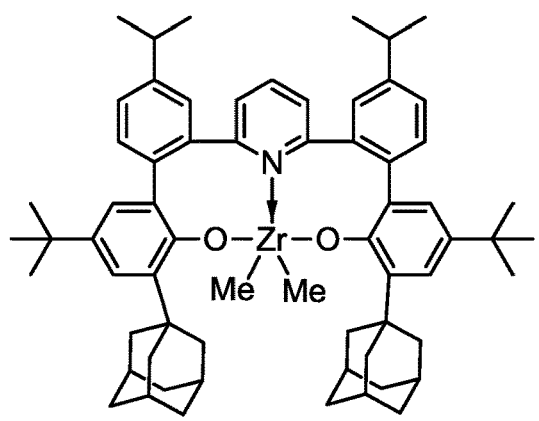
Figure 5C:
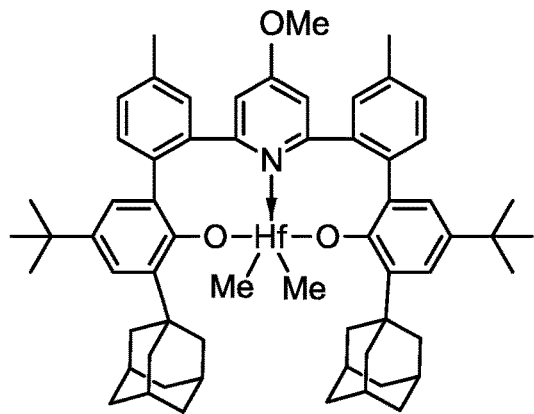
Figure 5C:
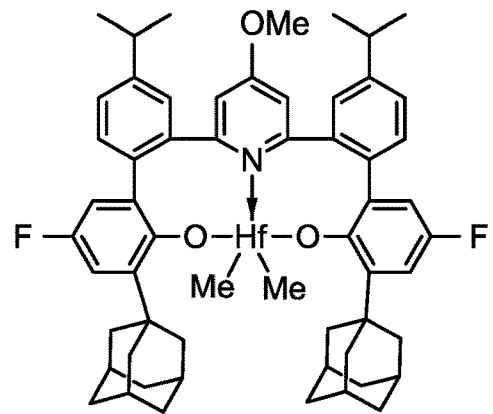
Figure 5C:
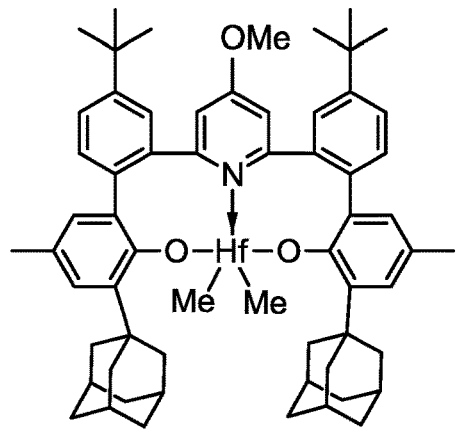
Figure 5C:
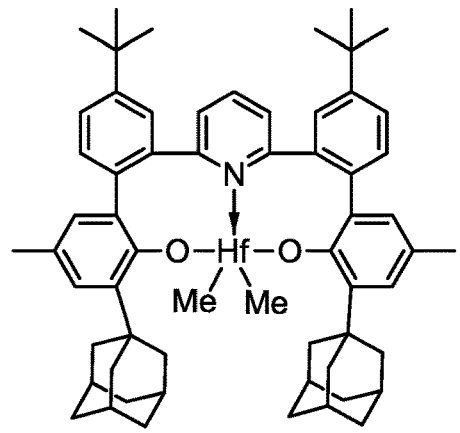
Figure 5D:
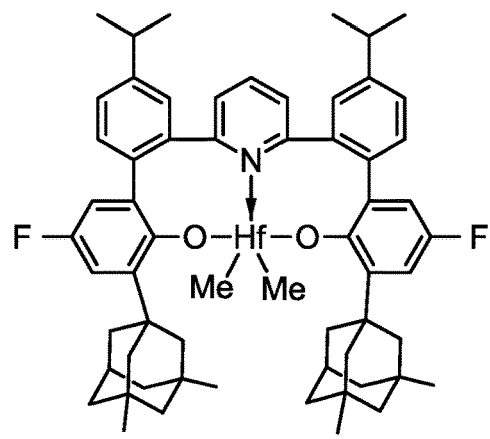
Figure 5D:
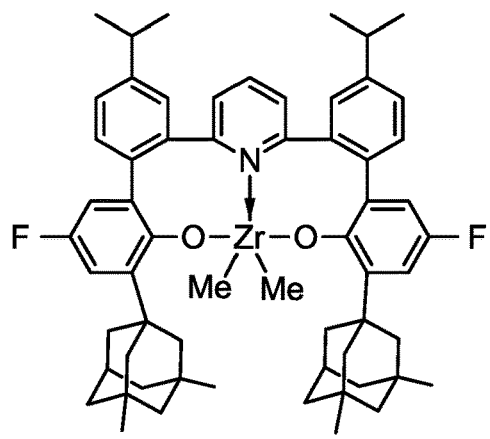
Figure 5D:
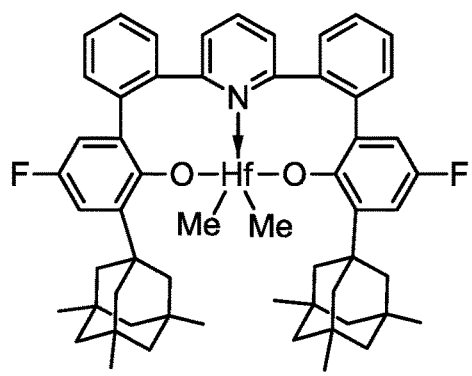
Figure 5D:
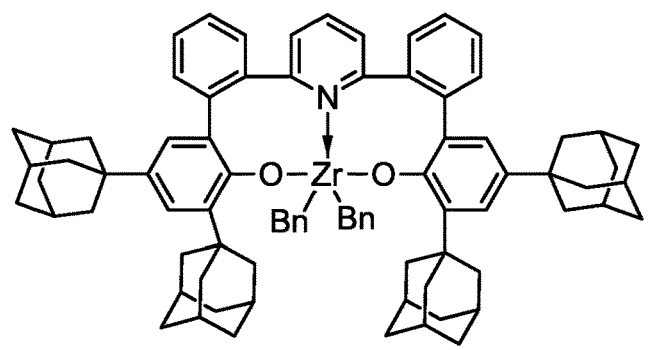
Figure 5D:
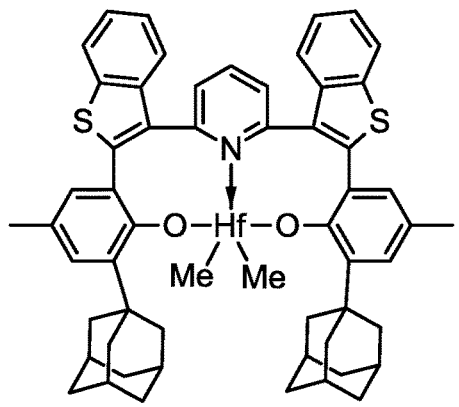
Figure 5D:
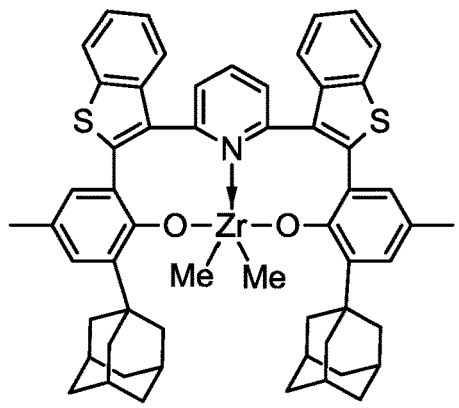
Figure 5E:
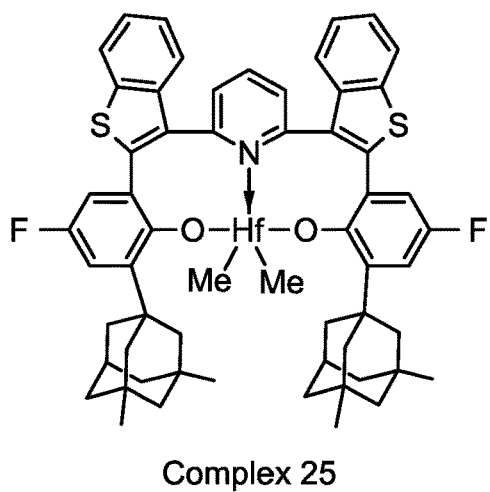
Figure 5E:
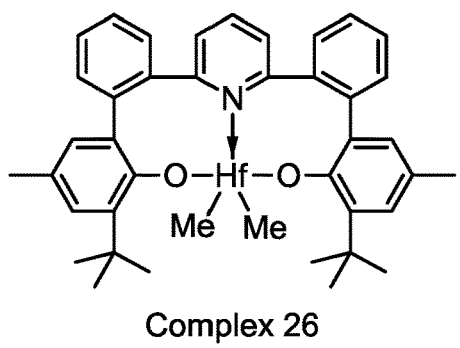
Figure 5E:
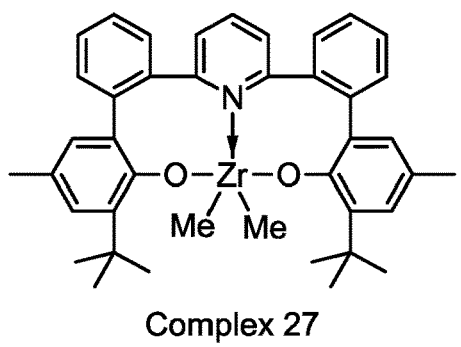
Figure 5E:
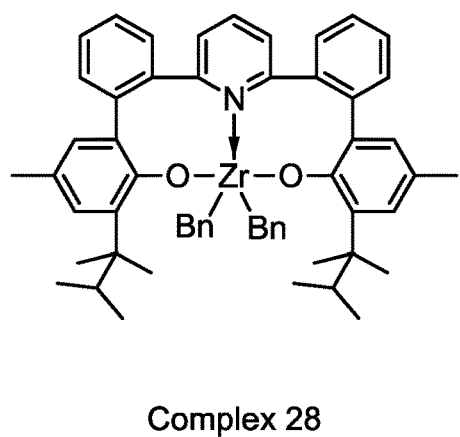
Figure 5E:
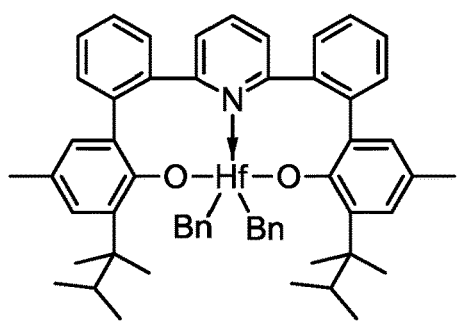
Figure 5E:
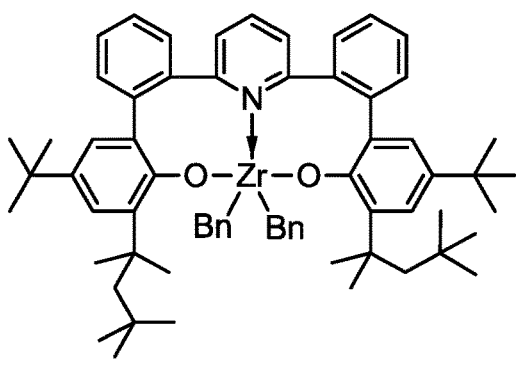
Figure 5E:
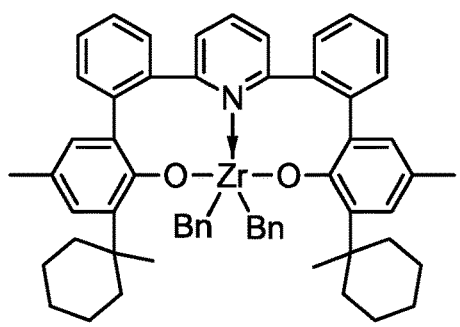

In still another aspect, the aluminum vinyl unit has less than 50 wt % dimer present, based upon the weight of the AV, such as less than 40 wt %, such as less than 30 wt %, such as less than 20 wt %, such as less than 15 wt %, such as less than 10 wt %, such as less than 5 wt %, such as less than 2 wt %, such as less than 1 wt %, such as 0 wt % dimer. Alternately dimer is present at from 0.1 to 50 wt %, alternately 1 to 20 wt %, alternately at from 2 to 10 wt %. Dimer is the dimeric product of the alkyl diene used in the preparation of the AV. The dimer can be formed under certain reaction conditions, and is formed from the insertion of a molecule of diene into the Al—R bond of the AV, followed by beta-hydride elimination (see FIG. 4 of US 2018/0194872). For example, if the alkyl diene used is 1,7-octadiene, the dimer is 7-methylenepentadeca-1,14-diene. Similarly, if the alkyl diene is 1,9-decadiene, the dimer is 9-methylenenonadeca-1,18-diene.

Useful AV compounds can be prepared by combining an alkyl aluminum (aluminum reagent) having at least one secondary alkyl moiety such as triisobutylaluminum and/or at least one hydride, such as a dialkylaluminum hydride, a monoalkylaluminum dihydride or aluminum trihydride (aluminum hydride, $AlH_3$) with an alkyl diene and heating to a temperature that causes release of an alkylene byproduct. The reaction can take place in the absence of solvent (neat) or in the presence of a non-polar non-coordinating solvent such as a $C_5$-$C_{10}$ alkane, or an aromatic solvent such as hexane, pentane, toluene, benzene, xylenes, and the like, or combinations thereof. The reaction preferably is heated from 60° C. to 110° C. Lower reaction temperatures from 60° C. to 80° C. are preferred if longer reaction times are used such as stirring with heat for 6-24 hours. Higher reaction temperatures from 90° C. to 110° C. are preferred if shorter reaction times are used such as stirring with heat for 1 to 2 hours. At a reaction temperature from 65° C. to 75° C., the reaction is preferably heated and stirred for 6-18 hours, preferably 8-12 hours. At a reaction temperature form 100° C. to 110° C., the reaction is preferably heated and stirred for 1 to 2 hours. Combinations of higher reaction temperature and lower reaction temperatures can be used, for example heating and stirring the reaction for 1 hour at 110° C. followed by heating and stirring at 65° C. to75° C. for 8-12 hours. Lower reaction temperatures for longer times or higher reaction temperatures for shorter times favor formation of the AV with v=2, and disfavors formation of dimer. The AV with v=3 typically occurs at higher reaction temperatures and longer times, and is accompanied with dimer formation.

After the reaction is complete, solvent, if present, can be removed and the product can be used directly without further purification.

In at least one embodiment, copolymers can have an aluminum vinyl content of about 0.01 wt % to about 20 wt %, such as from about 0.1 wt % to about 10 wt %, such as from about 0.1 wt % to about 5 wt %, such as from about 0.3 wt % to about 3 wt %, such as from about 0.5 wt % to about 1.5 wt %, based on the weight of the copolymer.

In at least one embodiment, metal alkenyls can be alkenylborane units. In at least one embodiment, alkenylborane units can be any aluminum vinyl unit listed herein having borane substituted in place of aluminum.

In at least one embodiment, copolymers can have an alkenylborane content of about 0.01 wt % to about 20 wt %, such as from about 0.1 wt % to about 10 wt %, such as from about 0.1 wt % to about 5 wt %, such as from about 0.3 wt % to about 3 wt %, such as from about 0.5 wt % to about 1.5 wt %, based on the weight of the copolymer.

In at least one embodiment, metal alkenyls can be alkenyl magnesium units. In at least one embodiment, alkenyl magnesium units can be any magnesium vinyl unit listed herein having magnesium substituted in place of aluminum.

In at least one embodiment, copolymers can have an alkenylmagnesium content of about 0.01 wt % to about 20 wt %, such as from about 0.1 wt % to about 10 wt %, such as from about 0.1 wt % to about 5 wt %, such as from about 0.3 wt % to about 3 wt %, such as from about 0.5 wt % to about 1.5 wt %, based on the weight of the copolymer.

In at least one embodiment, metal alkenyls can include any suitable compound having a metal and a vinyl end group. In at least one embodiment, metal alkenyls can include any group 13 metal, such as B, Al, Ga, In. In at least one embodiment, a metal alkenyl can include any aluminum vinyl unit listed herein having another group 13 metal substituted in place of aluminum.

In at least one embodiment, metal alkenyls can include any group 1, 2 or 12 metal, such as Li, Mg or Zn. In at least one embodiment, a metal alkenyl can include any aluminum vinyl unit listed herein having another group 1, 2 or 12 metal substituted in place of aluminum.

Once polymerization has been performed, copolymers can have pendant metal groups, such as pendant aluminum groups. In other embodiments, copolymers can have pendant groups of B, Ga, In, Li, Mg or Zn.

As described in more detail below, the copolymers can be treated with a suitable reagent such that pendant aluminum groups (or other pendant groups having Group 1, 2, 12 or 13 atoms) are modified to form copolymers having carboxylate or sulfonate pendant groups.

See US 2018/0194872 for synthesis methods for aluminum vinyl compounds.

Copolymer Properties

In at least one embodiment, the copolymers comprising comprise an α-olefin monomer, an optional comonomer, an optional diene, and a metal alkenyl, such as an aluminum vinyl, can have an Mw value of about 5,000 g/mol or greater, such as from about 10,000 g/mol to about 2,000,000 g/mol, such as from about 50,000 g/mol to about 1,000,000 g/mol, such as from about 100,000 g/mol to about 800,000 g/mol, such as from about 100,000 g/mol to about 500,000 g/mol.

Alternately, the copolymers comprising comprise an α-olefin monomer, an optional comonomer, an optional diene, and a metal alkenyl, such as an aluminum vinyl, can have an Mw value of about 20,000 g/mol to about 200,000 g/mol, such as from about 20,000 g/mol to about 100,000 g/mol, such as from about 30,000 g/mol to about 90,000 g/mol, such as from about 40,000 g/mol to about 80,000 g/mol, such as from about 50,000 g/mol to about 70,000 g/mol, such as from about 55,000 g/mol to about 65,000 g/mol, such as from about 60,000 g/mol to about 65,000 g/mol.

In at least one embodiment, the copolymers comprising comprise an α-olefin monomer, an optional comonomer, an optional diene, and a metal alkenyl, such as an aluminum vinyl, can have an Mn value of 1,000 g/mol or greater, such as from about 10,000 g/mol to about 2,000,000 g/mol, such as from about 100,000 g/mol to about 1,000,000 g/mol, such as from about 1,000 g/mol to about 400,000 g/mol, such as from about 10,000 g/mol to about 200,000 g/mol.

Alternately, the copolymers comprising comprise an α-olefin monomer, an optional comonomer, an optional diene, and a metal alkenyl, such as an aluminum vinyl, can have an Mn value of about 1,000 g/mol to about 100,000 g/mol, such as from about 1,000 g/mol to about 50,000 g/mol, such as from about 5,000 g/mol to about 40,000 g/mol, such as from about 10,000 g/mol to about 30,000 g/mol, such as from about 15,000 g/mol to about 25,000 g/mol, such as from about 18,000 g/mol to about 20,000 g/mol.

In at least one embodiment, copolymers having relatively low values (i.e., 50,000 g/mol or less) of Mw may be effective in coating applications. In at least one embodiment, copolymers having relatively high values of Mw may be effective for materials that experience many loading/unloading cycles, such as tires. In at least one embodiment, copolymers having values of Mw of about 400,000 g/mol or greater may make effective use in certain rubber applications.

In at least one embodiment, the copolymers comprising comprise an α-olefin monomer, an optional comonomer, an optional diene, and a metal alkenyl, such as an aluminum vinyl, can have an Mw/Mn (molecular weight distribution, also referred to as polydispersity index) value of about 1 to about 10, such as from about 1.5 to about 5, such as from about 2 to about 4.

Due to strong ion cluster formation, the ionomers are typically not soluble in any solvent. The moments of molecular weight of the metal alkenyl containing copolymer are determined by acidification of the ionomers to make them soluble in trichlorobenzene TCB. Thereafter, Gel Permeation Chromatography (GPC) is performed on the acidified copolymers to measure the moments of molecular weight. For purposes of this invention and the claims thereto, the moments of molecular weight of the acidified polymers shall be considered the moments of molecular weight of the polymer prior to be acidified.

In at least one embodiment, the copolymers comprising comprise an α-olefin monomer, an optional comonomer, an optional diene, and a metal alkenyl, such as an aluminum vinyl, can have a glass transition temperature ($T_g$), as determined by differential scanning calorimetry (DSC) as described below, of 10° C. or less, such as from about −30° C. to about −100° C., such as from about −5° C. to about −60° C., such as from about −2° C. to about −50° C., such as from about 0° C. to about −40° C.

In at least one embodiment, the copolymers comprising comprise an α-olefin monomer, an optional comonomer, an optional diene, and a metal alkenyl, such as an aluminum vinyl, can have a melting temperature ($T_m$), as determined by differential scanning calorimetry (DSC) as described below, of 80° C. or more, alternately 100° C. or more, alternately 120° C. or more, such as about 80° C. to about 170° C., such as about 80° C. to about 158° C., such as from about 90° C. to about 145° C., such as from about 100° C. to about 135° C., such as from about 110° C. to about 125° C.

Ionomers

The copolymers prepared herein can be used to make ionomers comprising the copolymer and a charge bearing group, such as a carboxylate. Typically, the copolymer is functionalized (such as oxidized) by introducing quenching agent into the reactor that also acts as a functionalizing agent (such as an oxidizing agent) to form an ionomer comprising the reaction product of the copolymer's metal alkenyl derived units and the quench/functionalizing agent (such as an oxidizing agent, such as carboxylate). (A functionalizing agent is defined to be an electrophile that contains one or more heteroatoms). In embodiments, the metal alkenyl moieties of the copolymer (which were incorporated into the polymer via the allyl chain end) are transformed by quenching with a functionalizing agent into functionalized alkenyl moieties (such as anion alkenyl moieties) to form an ionomer, where the copolymer can have any comonomer composition described herein.

In at least one embodiment, the ionomer can have from about 10 wt % to about 99.9 wt % $C_2$-$C_{60}$ α-olefin units (monomer and comonomer), 0.01 to 10 wt % optional diene units, and from about 0.1 wt % to about 10 wt % functionalized alkenyl moieties (such as anion alkenyl moieties), based on the weight of the ionomer. In at least one embodiment, the anion alkenyl units are represented by the formula —R(A$^-$)—, where R is an alkyl group containing 2 to 10 carbon atoms, and where A$^-$ is an anionic group. The above formula shows that the alkyl group, which is represented by R, is divalent with (i.e., incorporated into) the polymer backbone. In at least one embodiment, the anionic group is a carboxylate, and the anion alkenyl units have the formula —R(—R$^A_x$COOAl(OR$^B$)$_2$)—, where R is preferably a linear, branched or cyclic alkyl group containing 2 to 40 carbon atoms, R$^A$ is a hydrocarbyl group (typically an alkyl having 2 to 18 carbon atoms), R$^B$ is a hydrocarbyl group (typically an alkyl having 2 to 18 carbon atoms) or —O—R$^C$, where R$^C$ is H or a hydrocarbyl group (typically an alkyl having 2 to 18 carbon atoms), and X is 0 or 1, indicating the presence or absence of the hydrocarbyl group.

In embodiments, Al—OR$^B$ is made from exposure of Al—R$^B$ to air (oxygen and moisture).

In embodiments, R$^B$ can be OH.

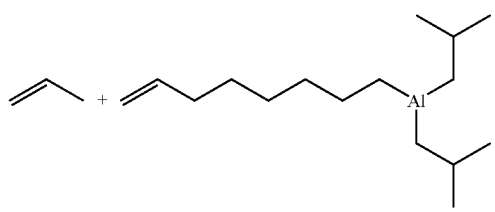

AV-1/8 vinyl-addition-polymerization | SiO2-supported catalyst slurry system

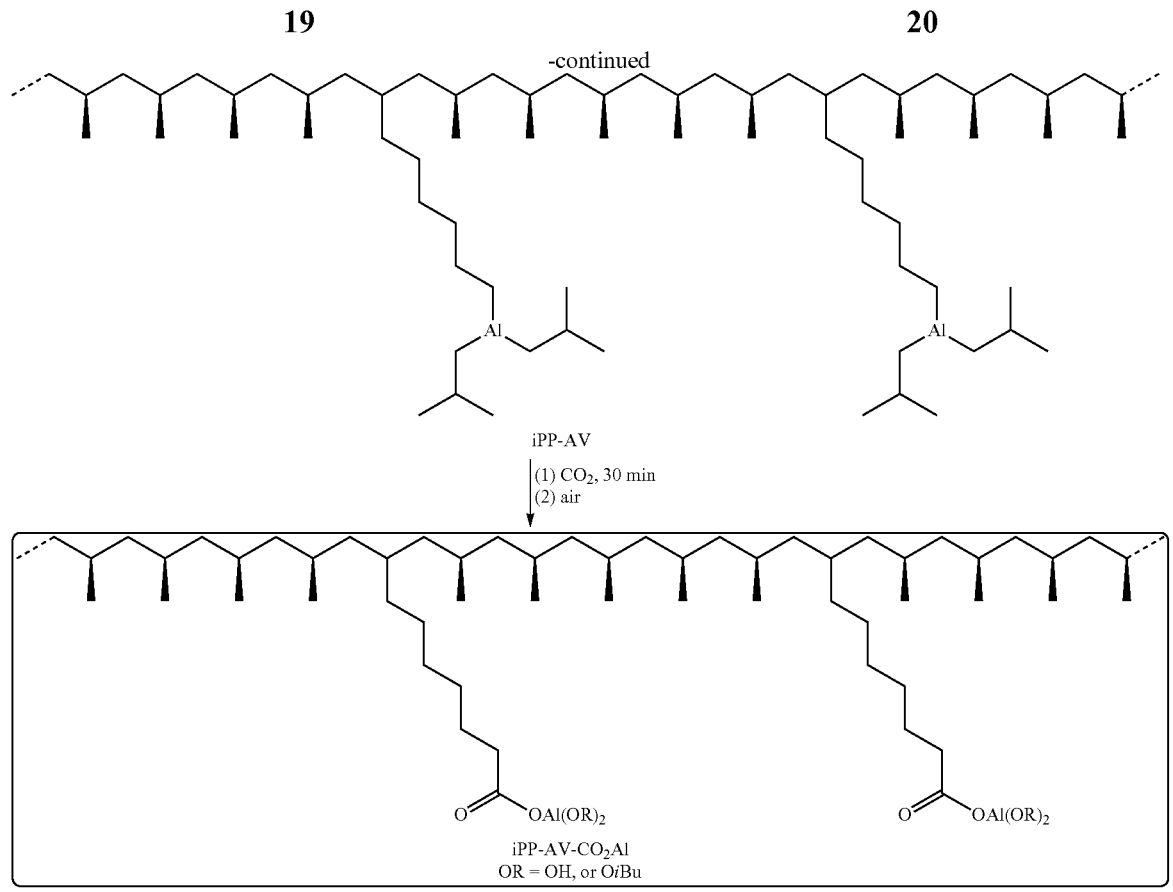

In at least one embodiment, copolymers have pendant carboxylate anion groups. In at least one embodiment, copolymers can have pendant carboxylic acid groups. In at least one embodiment, copolymers can have pendant carboxylaic acid group. In at least one embodiment, copolymers can have pendant sulfonate anion groups. In at least one embodiment, copolymers can have pendant sulfonic acid groups. In at least one embodiment, copolymers can have pendant phosphonate anion groups. In at least one embodiment, copolymers can have pendant phosphonic acid groups. In at least one embodiment, copolymers can include each acid group and its corresponding anion, depending on a dissociation constant of each pendant acid group in solution.

In at least one embodiment, anion alkenyl units can include carboxylate anions. In at least one embodiment, copolymers can have a carboxylate anion alkenyl unit content of about 0.01 wt % to about 20 wt %, such as from about 0.1 wt % to about 10 wt %, such as from about 0.1 wt % to about 5 wt %, such as from about 0.3 wt % to about 3 wt %, such as from about 0.5 wt % to about 1.5 wt %, based on the weight of the copolymer.

In at least one embodiment, the ionomers can comprise neutral or ionic metal atoms (typically as a result of combining the metal alkenyl unit in the copolymers described above with a quenching agent comprising a metal cation or anion). In at least one embodiment, the metal atoms can be selected from an alkali metals, an alkaline earth metals, group 3, 4, 5, 6, 7, 8, 9, 10, 11 and 12 metals, group 13, 14, 15 and 16 metals, and combination(s) thereof. In at least one embodiment, alkali metals can include Li, Na, K, Rb, Cs, Fr, or combination(s) thereof, such as Li, Na, and K; alkaline earth metals can include Be, Mg, Ca, Sr, Ba, Ra, or combination(s) thereof, such as Mg and Ca; and group 12 metals can include Zn, Cd, Hg, Cn, or combination(s) thereof, such as Zn. In at least one embodiment, the metal atoms can include Li, Mg, Sc, Y, Ti, Zr, Hf, Rf, V, Nb, Ta, Db, Cr, Mo, W, Sg, Mn, Tc, Re, Bh, Fe, Ru, Os, Hs, Co, Rh, Ir, Mt, Ni, Pd, Pt, Ds, Cu, Ag, Au, Rg, Al, Ga, In, Tl, Nh, Sn, Pb, Fl, Bi, Mc, Po, Lv, or combination(s) thereof.

Processes to Produce Ionomers

In at least one embodiment, a process to produce an ionomer can include introducing a metal cation to the copolymer having a pendant anion or acid group.

In at least one embodiment, the metal cation can be introduced to the copolymer by adding a solution containing the metal cation. In at least one embodiment, the metal cation is bound to a basic compound (e.g., an anion). In at least one embodiment, the base can include a tert-butoxide, a hydroxide, or any other suitable anions including halides, sulfate, nitrate, nitrite, sulfide, phosphates, borates, and aluminates. For example, an anion can be selected from sodium tert-butoxide, potassium tert-butoxide, sodium hydroxide, potassium hydroxide, or combination(s) thereof. In at least one embodiment, a suitable anion can be a bulky anion, such as a tert-butoxide or a borate.

In at least one embodiment, the base can be dissolved in alcohol, such as methanol, (e.g., in a mixed solvent such as 90:10 toluene/alcohol), or in any other suitable solvent.

In at least one embodiment, an ion exchange occurs between the metal cation and the pendant anion group to form an ionomer having a metal cation content.

In at least one embodiment, a concentration of the metal cation may be from about 0.05 wt % to about 30 wt %, based on the ionomer.

In at least one embodiment, ion exchange proceeds at a reactor temperature of about 23° C. or greater, such as 23° C. to about 150° C., such as from about 40° C. to about 100° C., such as from about 50° C. to about 90° C., such as from about 60° C. to about 80° C., such as from about 65° C. to about 75° C., such as about 70° C.

Ionomer Properties

In at least one embodiment, ionomers produced herein can have a weight average molecular weight (Mw) of at least 50,000 g/mol, such as from 50,000 to 1,000,000 g/mol, such as from 75,000 to 600,000 g/mol.

In at least one embodiment, ionomers produced herein can have a number average molecular weight (Mn) of at least 21,000 g/mol, such as from 50,000 to 2,500,000 g/mol, such as from 75,000 to 2,000,000 g/mol, such as from 250,000 to 1,500,000 g/mol.

In at least one embodiment, ionomers produced herein can have a molecular weight distribution (Mw/Mn) of from about 1 to 10, such as from 1.5 to 6 such as 2 to 4.

In at least one embodiment, ionomers produced herein have an Mw/Mn of from about 2 to about 4, and Mw of about 50,000 g/mol or more, and an Mn of about 21,000 g/mol or more.

In at least one embodiment, the ionomers can have a maximum elastic range (% strain at yield) of about 100% strain or greater, such as from about 300% or greater, such as from about 400% or greater, alternatively from about 100% strain to about 1,000% strain, such as from about 200% strain to about 800% strain, such as from about 300% strain to about 600% strain, such as from about 400% strain to about 500% strain, such as about 460% strain, as determined according to ISO 37.

In at least one embodiment, ionomers can have a strain to breakage of about 100% or greater, such as about 300% or greater, such as about 500% or greater, alternatively from about 100% to about 1,000%, such as about 200% to about 800%, such as from about 400% to about 700%, such as from about 500% to about 600%, such as about 570%, as determined according to ISO 37.

In at least one embodiment, ionomers can have a tensile set, at 200% strain, of about 100% or less, such as from about 0% to about 80%, such as from about 20% to about 60%, such as from about 40% to about 50%, such as about 45%, as determined according to ISO 37.

In at least one embodiment, the ionmers can have a glass transition temperature ($T_g$), as determined by differential scanning calorimetry (DSC) as described below, 10° C. or less, zero or less, of −30° C. or less, such as from about −30° C. to about −100° C., such as from about −40° C. to about −60° C., such as from about −45° C. to about −55° C., such as from about −48° C. to about −52° C., such as from about −49° C. to about −50° C., alternatively from about −51° C. to about −52° C.

In at least one embodiment, the ionmers can have a crystallization temperature ($T_c$), as determined by differential scanning calorimetry (DSC) as described below, of about 60° C. to about 125° C., such as from about 90° C. to about 115° C., such as from about 100° C. to about 105° C.

In at least one embodiment, the ionmers can have a melting temperature ($T_m$), as determined by differential scanning calorimetry (DSC) as described below, of about 80° C. to about 158° C., such as from about 90° C. to about 145° C., such as from about 100° C. to about 135° C., such as from about 110° C. to about 125° C.

In at least one embodiment, the ionmers can have a heat of fusion ($H_f$), as determined by differential scanning calorimetry (DSC) as described below, of about 30 J/g to about 150 J/g, such as from about 50 J/g to about 135 J/g, such as from about 70 J/g to about 120 J/g, such as from about 90 J/g to about 105 J/g.

In at least one embodiment, the ionmers can have a crystallinity ($X_c$), as determined according to ISO 37, of about 10% to about 55%, such as from about 20% to about 45%, such as from about 30% to about 35%.

In at least one embodiment, the ionmers can have a Youngs modulus (E), as determined according to ISO 37, of about 0.1 to about 1.6 GPa, such as from about 0.5 to about 1.4 GPa, such as from about 0.7 to about 1.2 GPa, such as from about 0.9 to about 1.0 GPa.

In at least one embodiment, the ionmers can have an ultimate tensile strength, as determined according to ISO 37, of about 5 to about 45 MPa, such as from about 10 to about 40 MPa, such as from about 15 to about 30 MPa, such as from about 20 to about 25 MPa.

In at least one embodiment, the ionmers can have an elongation at break, as determined according to ISO 37, of about 50 to about 1,500%, such as from about 100 to about 1,200%, such as from about 200 to about 800%, such as from about 400 to about 600%.

In at least one embodiment, the ionmers can have an elongation at yield, as determined according to ISO 37, of about 5 to about 25%, such as from about 7.5 to about 20%, such as from about 10 to about 17.5%, such as from about 12.5 to about 15%.

In at least one embodiment, the ionmers can have an tensile strength at yield, as determined according to ISO 37, of about 15 to about 45 MPa, such as from about 20 to about 40 MPa, such as from about 25 to about 35 MPa, such as from about 27.5 to about 30 MPa.

In at least one embodiment, the ionmers can have a shear thinning index of 500 or more, alternately 1,000 or more, alternately 1,000 to 5,000.

In at least one embodiment, the ionmers can have a strain hardening ratio of 5 or more, alternately of about 5 to about 15 when measured at Hencky strain rate of 10 sec$^{-1}$, alternately of about 10 to about 20 when measured at Hencky strain rate of 1.0 sec$^{-1}$, alternately of about 15 to about 30 when measured at Hencky strain rate of 0.1 sec$^{-1}$, alternately of about 30 to about 100 when measured at Hencky strain rate of 0.01 sec$^{-1}$, and alternately of about 100 to about 200 when measured at Hencky strain rate of 0.001 sec$^{-1}$.

In at least one embodiment, the ionmers can have an ion cluster formation, as determined by X-ray scattering measurements.

In at least one embodiment, the ionmers can have a shear thinning index of 500 or more, alternately 1,000 or more, alternately from 1,000 to 5,000 and have a strain hardening ratio of 5 or more, alternately of about 5 to about 15 when measured at Hencky strain rate of 10 sec$^{-1}$, alternately of about 10 to about 20 when measured at Hencky strain rate of 1.0 sec$^{-1}$, alternately of about 15 to about 30 when measured at Hencky strain rate of 0.1 sec$^{-1}$, alternately of about 30 to about 100 when measured at Hencky strain rate of 0.01 sec$^{-1}$, and alternately of about 100 to about 200 when measured at Hencky strain rate of 0.001 sec$^{-1}$.

In at least one embodiment, the ionmers can have a shear thinning index of 500 or more, alternately 1,000 or more, alternately 1,000 to 5,000; a strain hardening ratio of 5 or more, alternately of about 5 to about 15 when measured at Hencky strain rate of 10 sec$^{-1}$, alternately of about 10 to about 20 when measured at Hencky strain rate of 1.0 sec$^{-1}$, alternately of about 15 to about 30 when measured at Hencky strain rate of 0.1 sec$^{-1}$, alternately of about 30 to about 100 when measured at Hencky strain rate of 0.01 sec$^{-1}$, and alternately of about 100 to about 200 when measured at Hencky strain rate of 0.001 sec$^{-1}$; and an ion cluster formation, as determined by X-ray scattering measurements.

In at least one embodiment, the ionmers can have a complex viscosity as measured by oscillatory shear at an angular frequency of 0.1 rad/s of about 500,000 Pa-s to about 800,000 Pa-s.

In at least one embodiment, the ionmers can have a complex viscosity as measured by oscillatory shear at an angular frequency of 100 rad/s of about 100 to 500 Pa-s.

In at least one embodiment, the ionmers can have a shear thinning index of about 1,000 to 5,000.

Properties of ionomers may be influenced by ion content. In that regard, ion content can be increased by at least one of: increasing an aluminum vinyl unit content in copolymer precursors, increasing an extent of an oxidizing reaction to increase a conversion of aluminum pendant groups to carboxylate anions, increasing an extent of ion exchange to promote ionomer conversion or combination(s) thereof. In any case, an ionic content can be increased, thereby presumably forming a stronger ionic network.

In at least one embodiment, an extent of an oxidizing reaction, normalized to initial moles of metal in the metal alkenyl, can be about 0.5 to 1, such as from about 0.7 to 1, such as from about 0.9 to 1. The extent of the oxidizing reaction can be determined by measuring consumption of distal hydrocarbyls bound to the metal alkenyl via FTIR spectroscopy in comparison to a standard solution of the metal cation.

In at least one embodiment, an extent of ion exchange, normalized to initial moles of anion, can be about 0.5 to 1, such as from about 0.7 to 1, such as from about 0.9 to 1. The extent of ion exchange can be determined by measuring a concentration of metal cations in the ionomer via FTIR spectroscopy described below.

In at least one embodiment, ionomers can have local ion clustering. Such ion clustering can provide ionomers exhibiting physical behavior similar to cross-linked rubbers.

Additives

Ionomers of the present disclosure may be mixed with one or more additives to form an ionomer composition. The additives may include reinforcing and non-reinforcing fillers, antioxidants, stabilizers, processing oils (or other solvent(s)), compatibilizing agents, lubricants (e.g., oleamide), antiblocking agents, antistatic agents, waxes, coupling agents for the fillers and/or pigment, pigments, flame retardants, antioxidants, or other processing aids, or combination(s) thereof.

Ionomer compositions of the present disclosure can include additives such that the additives (e.g., fillers of the present disclosure (present in a composition) have an average agglomerate size of less than 50 microns, such as less than 40 microns, such as less than 30 microns, such as less than 20 microns, such as less than 10 microns, such as less than 5 microns, such as less than 1 micron, such as less than 0.5 microns, such as less than 0.1 microns, based on a 1 cm×1 cm cross section of the ionomer as observed using scanning electron microscopy.

In some embodiments, the ionomer composition may include fillers and coloring agents. Exemplary materials include inorganic fillers such as calcium carbonate, clays, silica, talc, titanium dioxide or carbon black. Any type of carbon black can be used, such as channel blacks, furnace blacks, thermal blacks, acetylene black, lamp black and the like.

In some embodiments, the ionomer composition may include flame retardants, such as calcium carbonate, inorganic clays containing water of hydration such as aluminum trihydroxides ("ATH") or Magnesium Hydroxide.

In some embodiments, the ionomer composition may include UV stabilizers, such as titanium dioxide or Tinuvin® XT-850. The UV stabilizers may be introduced into the composition as part of a masterbatch. For example, UV stabilizer may be pre-blended into a masterbatch with a thermoplastic resin, such as polypropylene, or a polyethylene, such as linear low density polyethylene.

Still other additives may include antioxidant and/or thermal stabilizers. In an exemplary embodiment, processing and/or field thermal stabilizers may include IRGANOX® B-225 and/or IRGANOX® 1010 available from BASF.

In some embodiments, the ionomer composition may include a polymeric processing additive. The processing additive may be a polymeric resin that has a very high melt flow index. These polymeric resins can include both linear and branched polymers that can have a melt flow rate that is about 500 dg/min or more, such as about 750 dg/min or more, such as about 1,000 dg/min or more, such as about 1,200 dg/min or more, such as about 1,500 dg/min or more. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives can include polypropylene homopolymers, and branched polymeric processing additives can include diene-modified polypropylene polymers.

In some embodiments, ionomer compositions of the present disclosure may optionally include reinforcing and non-reinforcing fillers, antioxidants, stabilizers, rubber processing oil, lubricants, antiblocking agents, anti-static agents, waxes, foaming agents, pigments, flame retardants, nucleating agents, and other processing aids known in the rubber compounding art. These additives can comprise up to about 50 weight percent of the total composition.

Fillers and extenders that can be utilized include conventional inorganics such as calcium carbonate, clays, silica, talc, titanium dioxide, carbon black, a nucleating agent, mica, wood flour, and the like, and blends thereof, as well as inorganic and organic nanoscopic fillers.

Molded Products

The ionomers and compositions thereof described herein may be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion.

Further, the ionomers or compositions thereof described herein may be shaped into desirable end use articles by any suitable means. Suitable examples include thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof.

Thermoforming is a process of forming at least one pliable plastic sheet into a desired shape. Typically, an extrudate film of a composition (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The tool stays closed to cool the film and the tool is then opened. The shaped laminate is then removed from the tool. The thermoforming is accomplished by vacuum, positive air pressure, plug-assisted vacuum forming, or combinations and variations of these, once the sheet of material reaches thermoforming temperatures, typically of 140° C. to 185° C. or higher. A pre-stretched bubble step is used, especially on large parts, to improve material distribution.

Blow molding is another suitable forming means for use with a composition herein, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, *Concise Encyclopedia of Polymer Science and Engineering*, pp. 90-92 (Jacqueline I. Kroschwitz, ed., John Wiley & Sons 1990).

Likewise, molded articles may be fabricated by injecting molten polymer into a mold that shapes and solidifies the molten polymer into desirable geometry and thickness of molded articles. Sheets may be made either by extruding a substantially flat profile from a die, onto a chill roll, or by calendaring.

Non-Woven and Fiber Products

The ionomers or compositions thereof described herein may be used to prepare nonwoven fabrics and fibers in any suitable nonwoven fabric and fiber making process, including but not limited to, melt blowing, spunbonding, film aperturing, and staple fiber carding. Examples include continuous filament processes, spunbonding processes, and the like. The spunbonding process involves the extrusion of fibers through a spinneret. These fibers are then drawn using high velocity air and laid on an endless belt. A calendar roll is generally then used to heat the web and bond the fibers to one another although other techniques may be used such as sonic bonding and adhesive bonding.

The ionomers or compositions thereof according to embodiments disclosed herein are useful in a wide variety of applications, such as automotive overshoot parts (e.g., door handles and skins such as dashboard, instrument panel and interior door skins), airbag covers, toothbrush handles, shoe soles, grips, skins, toys, appliance moldings and fascia, gaskets, furniture moldings and the like.

Other articles of commerce that can be produced include but are not limited by the following examples: awnings and canopies—coated fabric, tents/tarps coated fabric covers, curtains extruded soft sheet, protective cloth coated fabric, bumper fascia, instrument panel and trim skin, coated fabric for auto interior, geo textiles, appliance door gaskets, liners/gaskets/mats, hose and tubing, syringe plunger tips, light weight conveyor belt PVC replacement, modifier for rubber concentrates to reduce viscosity, single ply roofing compositions, recreation and sporting goods, grips for pens, razors, toothbrushes, handles, and the like. Other articles include marine belting, pillow tanks, ducting, dunnage bags, architectural trim and molding, collapsible storage containers, synthetic wine corks, IV and fluid administration bags, examination gloves, and the like.

Exemplary articles made using the ionomers or compositions thereof include cookware, storage ware, toys, medical devices, sterilizable medical devices, sterilization containers, sheets, crates, containers, packaging, wire and cable jacketing, pipes, geomembranes, sporting equipment, chair mats, tubing, profiles, instrumentation sample holders and sample windows, outdoor furniture, e.g., garden furniture, playground equipment, automotive, boat and water craft components, and other such articles. In particular, the ionomers or compositions thereof are suitable for automotive components such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles. The ionomers can be useful for producing "soft touch" grips in products such as personal care articles such as toothbrushes, etc.; toys; small appliances; packaging; kitchenware; sport and leisure products; consumer electronics; PVC and silicone rubber replacement medical tubing; industrial hoses; and shower tubing.

Polymerization Processes

Polymerization processes to form copolymers (and subsequent ionomers thereof) of the present disclosure can be carried out in any suitable manner A suspension, slurry, or gas phase polymerization process can be used. Such processes can be run in a batch, semi-batch, or continuous mode. Gas phase polymerization processes and slurry processes are preferred. In embodiments, the polymerization process is not a homogeneous process. A homogeneous polymerization process is defined to be a process where at least 90 wt % of the product is soluble in the reaction media. A bulk process is defined to be a process where monomer concentration in all feeds to the reactor is 70 vol % or more. Alternately, no solvent or diluent is present or added in the reaction medium, except for the small amounts used as the carrier for the catalyst system or other additives, or amounts typically found with the monomer; e.g., propane in propylene. In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents useful for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, such as aromatics are present in the solvent at less than 1 wt %, such as less than 0.5 wt %, such as less than 0 wt % based upon the weight of the solvents.

In at least one embodiment, the feed concentration of the monomers and comonomers for the polymerization is 60 vol % solvent or less, such as 40 vol % or less, or such as 20 vol % or less, based on the total volume of the feedstream. In at least one embodiment, the polymerization is run in a bulk process.

Polymerizations can be run at any temperature and/or pressure suitable to obtain the desired polymers.

In some embodiments, hydrogen is present in the polymerization reactor at a partial pressure of 0.001 to 50 psig (0.007 to 345 kPa), such as from 0.01 to 25 psig (0.07 to 172 kPa), such as 0.1 to 10 psig (0.7 to 70 kPa).

In at least one embodiment, the activity of the catalyst is at least 800 gpolymer/gsupported catalyst/hour, such as 1,000 or more gpolymer/gsupported catalyst/hour, such as 100 or more gpolymer/gsupported catalyst/hour, such as 1,600 or more gpolymer/gsupported catalyst/hour.

In at least one embodiment, little or no scavenger is used in the process to produce the copolymer. For example, scavenger (such as trialkylaluminum) is present at zero mol %, alternately the scavenger is present at a molar ratio of scavenger metal to transition metal of less than 100:1, such as less than 50:1, such as less than 15:1, such as less than 10:1.

In at least one embodiment, the polymerization can occur in one reaction zone. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In at least one embodiment, the polymerization occurs in one reaction zone.

In at least one embodiment, the reactant mixture is stirred rapidly during polymerization.

In at least one embodiment, polymerization proceeds for about 5 minutes or greater, such as about 5 minutes to about 60 minutes, such as about 5 minutes to about 30 minutes, such as from about 10 minutes to 20 minutes, such as about 15 minutes.

In at least one embodiment, one or more functionalizing/quenching agents is added to the reactor. Functionalizing/quenching agents can include, $CO_2$, $CS_2$, COS, $O_2$, $H_2O$, $SO_2$, $SO_3$, $P_2O_5$, $NO_2$, epoxides, cyclic anhydride, maleic anhydride, methyl methacrylate, styrene, air, and the like.

In at least one embodiment, an oxidizing/quenching agent is added to the reactor. In at least one embodiment an oxidizing/quenching agent can include $CO_2$, $CS_2$, COS, $SO_3$, and combination(s) thereof.

In at least one embodiment, the functionalizing/quenching (such as an oxidizing/quenching) agent is charged to the reactor at a pressure of about 0.5 psig or greater, such as from about 0.5 psig to about 500 psig, such as from about 50 psig to about 200 psig, such as from about 80 psig to about 150 psig, such as about 100 psig.

In at least one embodiment, functionalization/quench (such as oxidation/quench) proceeds at a reactor temperature of about 23° C. or greater, such as 23° C. to about 150° C., such as from about 40° C. to about 100° C., such as from about 50° C. to about 90° C., such as from about 60° C. to about 80° C., such as from about 65° C. to about 75° C., such as about 70° C.

In at least one embodiment, functionalization/quench (such as oxidation/quench) proceeds for about 5 minutes or greater, such as about 5 minutes to about 60 minutes, such as about 5 minutes to about 30 minutes, such as from about 10 minutes to 20 minutes, such as about 15 minutes.

In at least one embodiment, total reaction time for polymerization, functionalization/quench is about 10 minutes or greater, such as from about 10 minutes to about 60 minutes, such as from about 20 minutes to about 40 minutes, such as about 30 minutes.

In at least one embodiment, the polymerization, functionalization/quench occurs in one reaction zone. In at least one embodiment, the polymerization, functionalization/quench occurs in one slurry phase reactor. In at least one embodiment, the polymerization, functionalization/quench occurs in one gas phase reactor.

Copolymers of the present disclosure may be produced using processes where monomer (such as linear α-olefin), a metal alkenyl, optional comonomer, and optional diene, are contacted with a catalyst system comprising the result of the combination of an activator, optional support, and a catalyst compound. The catalyst compound, optional support and activator may be combined in any order, and are combined typically prior to contacting with the monomer, metal alkenyl, optional comonomer, and/or optional diene.

In at least one embodiment, a process to produce a copolymer can include a vinyl addition polymerization between α-olefins and metal alkenyls using a suitable catalyst system. In at least one embodiment, the metal alkenyl can be an alkenylaluminum, an alkenylborane, or any other suitable metal alkenyl, such as those comprising group 13 metals.

In at least one embodiment, a concentration of the metal alkenyl in the polymerization reaction may be from about 0.001 mol % to about 20 mol %, such as from about 0.001 mol % to about 10 mol %, such as from about 0.01 mol % to about 5 mol %, based on total moles of monomer, metal alkenyl, optional comonomer, and optional diene.

In at least one embodiment, metal alkenyl and solvent are introduced into a reactor.

In at least one embodiment, the solvent can be selected from straight and branched-chain hydrocarbons, cyclic and alicyclic hydrocarbons, perhalogenated hydrocarbons, aromatic and alkylsubstituted aromatic compounds, liquid olefins which may act as monomers or comonomers, aliphatic hydrocarbon solvents, and mixtures thereof. In at least one embodiment, an α-olefin monomer is added to the metal alkenyl and solvent mixture. In at least one embodiment the solvent does not comprise aromatic solvent.

In at least one embodiment, the reactor is equilibrated at a temperature of about 23° C. or greater, such as about 23° C. to about 190° C., such as about 23° C. to about 150° C., such as from about 40° C. to about 100° C., such as from about 50° C. to about 90° C., such as from about 60° C. to about 80° C., such as from about 65° C. to about 75° C., such as about 70° C.

In at least one embodiment, a concentration of the α-olefin monomer may be from about 50 mol % to about 99.9 mol %, such as from about 60 mol % to about 99.9 mol %, such as from about 70 mol % to about 99.9 mol %, such as from about 80 mol % to about 99.5 mol %, such as from about 85 mol % to about 99 mol %, such as from about 90 mol % to about 99 mol %, such as from about 93 mol % to about 99 mol %, such as from about 95 mol % to about 99 mol %, based on total moles of monomer, metal alkenyl, optional comonomer, and optional diene.

In at least one embodiment, the reactor is pressurized with a comonomer, which is different than the α-olefin monomer. The comonomer can have any α-olefin composition or other comonomer composition provided herein.

In at least one embodiment, a concentration of the comonomer may be from about 0.1 mol % to about 99 mol %, such as from about 1 mol % to about 50 mol %, such as from about 5 mol % to about 40 mol %, such as from about 10 mol % to about 35 mol %, such as from about 15 mol % to about 30 mol %, such as from about 20 mol % to about 30 mol %, such as from about 25 mol % to about 30 mol %, based on total moles of monomer, metal alkenyl, comonomer, and optional diene.

Monomers and optional comonomers independently include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomer includes ethylene and an optional comonomer comprising one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups. In another embodiment, the monomer includes propylene and an optional comonomer comprising one or more ethylene or $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers may include ethylene, propylene, butene, pentene, hexene, heptene, octene, nonene, decene, undecene, dodecene, norbornene, dicyclopentadiene, cyclopentene, cycloheptene, cyclooctene, cyclododecene, 7-oxanorbornene, substituted derivatives thereof, and isomers thereof, such as hexene, heptene, octene, nonene, decene, dodecene, cyclooctene, 1-hydroxy-4-cyclooctene, 1-acetoxy-4-cyclooctene, 5-methylcyclopentene, cyclopentene, norbornene, and their respective homologs and derivatives, such as norbornene.

In at least one embodiment, an α-olefin monomer or comonomer can be a linear α-olefin. Linear α-olefins (LAOs) can be substituted or unsubstituted $C_6$-$C_{60}$ LAOs, such as $C_6$-$C_{50}$ LAOs, such as $C_8$-$C_{40}$ LAOs, such as $C_{10}$-$C_{30}$ LAOs, such as $C_{10}$-$C_{20}$ LAOs, such as $C_{15}$-$C_{20}$ LAOs, alternatively $C_8$-$C_{16}$ LAOs, such as $C_8$-$C_{12}$ LAOs. In at least one embodiment, a copolymer has linear α-olefin units selected from 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-icosene, 1-henicosene, 1-docosene, 1-tricosene, 1-tetracosene, 1-pentacosene, and combination(s) thereof.

In at least one embodiment, a diene is optionally added to the reactant mixture. Addition of a diene to the copolymer can result in formation of ionomers having increased toughness compared to ionomers formed using similar polymers without diene units. In at least one embodiment, dienes can be substituted or unsubstituted dienes selected from $C_4$-$C_{60}$ dienes, such as $C_5$-$C_{50}$ dienes, such as $C_5$-$C_{40}$ dienes, such as $C_5$-$C_{30}$ dienes, such as $C_5$-$C_{20}$ dienes, such as $C_6$-$C_{15}$ dienes, such as $C_6$-$C_{10}$ dienes, such as $C_7$-$C_9$ dienes, such as a substituted or unsubstituted $C_7$ diene, $C_8$ diene, or $C_9$ diene. In at least one embodiment, a copolymer has diene units of a $C_7$ diene. In at least one embodiment, a diene is a substituted or unsubstituted α,Ω-diene (e.g., the diene units of the copolymer are formed from di-vinyl monomers). The dienes can be linear di-vinyl monomers. In at least one embodiment, a diene is selected from butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacos adiene, hexacos adiene, heptacos adiene, octacosadiene, nonacosadiene, triacontadiene, and combination(s) thereof. In some embodiments, a diene is selected from 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and combination(s) thereof. In at least one embodiment, a diene is selected from cyclopentadiene, vinylnorbornene, norbornadiene, 5-ethylidene-2-norbornene, 5-vinyl-2-norbornene, divinylbenzene, dicyclopentadiene, and combination(s) thereof. In at least one embodiment, the copolymer (and subsequent ionomer) has diene units of 5-ethylidene-2-norbornene.

In at least one embodiment, a concentration of the optional diene added to the reaction mixture may be from about 0.1 mol % to about 40 mol %, such as from about 0.1 mol % to about 20 mol %, such as from about 1 mol % to about 10 mol %, based on total moles of monomer, metal alkenyl, optional comonomer, and diene, such as from about 1 mol % to about 5 mol %. In some other embodiments, 500 ppm or less of diene is added to the polymerization, such as 400 ppm or less, such as 300 ppm or less. In other embodiments, at least 50 ppm of diene is added to the polymerization, or 100 ppm or more, or 150 ppm or more.

In at least one embodiment, monomer, metal alkenyl, optional comonomer, and optional diene are charged to the reactor at a pressure independently selected from about 10 psig or greater, such as from about 10 psig to about 500 psig, such as from about 50 psig to about 200 psig, such as from about 80 psig to about 150 psig, such as about 100 psig, alternatively about 120 psig.

In at least one embodiment, the monomer α-olefin is ethylene or propylene.

In at least one embodiment, the α-olefin monomer is selected from the group consisting of $C_3$-$C_{60}$ α-olefins, and the comonomer is ethylene.

In at least one embodiment, the α-olefin monomer is selected from the group consisting of $C_2$ and $C_4$-$C_{60}$ α-olefins, and the comonomer is propylene. Addition of longer chain α-olefins to the copolymer can result in formation of ionomers having untangled backbones for soft materials and better processing properties.

Gas Phase Polymerization

Generally, in a fluidized gas bed process used for producing the copolymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399; 4,588,790; 5,028,670; 5,317,036; 5,352,749; 5,405,922; 5,436,304; 5,453,471; 5,462,999; 5,616,661; and 5,668,228 all of which are incorporated herein by reference.)

Slurry Phase Polymerization

A slurry polymerization process generally operates between 1 to about 50 atmosphere pressure range (15 psi to 735 psi, 103 kPa to 5,068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added.

The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, such as a branched alkane. The medium employed should be liquid under the conditions of polymerization and relatively inert. When a propane medium is used the process must be operated above the reaction diluent critical temperature and pressure. Preferably, a hexane or an isobutane medium is employed.

In an embodiment, a polymerization technique herein is referred to as a particle form polymerization, or a slurry process where the temperature is kept below the temperature at which the polymer goes into solution. Such technique is described in for instance U.S. Pat. No. 3,248,179 incorporated herein by reference. The temperature in the particle form process may be from about 85° C. to about 110° C. Two example polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. (In one embodiment 500 ppm or less of hydrogen is added, or 400 ppm or less or 300 ppm or less. In other embodiments at least 50 ppm of hydrogen is added, or 100 ppm or more, or 150 ppm or more.)

The reactor may be maintained at a pressure of 3,620 kPa to 4,309 kPa and at a temperature in the range of about 60° C. to about 104° C. depending on the desired polymer melting characteristics. Reaction heat is removed through the loop wall since much of the reactor is in the form of a double-jacketed pipe. The slurry is allowed to exit the reactor into an environment containing the functionalizing/quenching agents. The quenching process can take from a few seconds up to 3 hours. Alternatively, the quenching process can be carried out after the removal of solvent/comonomers described below. The slurry is allowed to exit the reactor at regular intervals or continuously to a heated low pressure flash vessel, rotary dryer and a nitrogen purge column in sequence for removal of the solvent diluent and all unreacted monomer and comonomers. The resulting ionomer is then compounded for use in various applications.

Useful reactor types and/or processes for the production of polyolefin polymers include, but are not limited to, UNIPOL™ Gas Phase Reactors (available from Univation Technologies); INEOS™ Gas Phase Reactors and Processes; Continuous Flow Stirred-Tank (CSTR) reactors (solution and slurry); Plug Flow Tubular reactors (solution and slurry); Slurry: (e.g., Slurry Loop (single or double loops)) (available from Chevron Phillips Chemical Company) and (Series Reactors) (available from Mitsui Chemicals)); BORSTAR™ Process and Reactors (slurry combined with gas phase); and Multi-Zone Circulating Reactors (MZCR) such as SPHERIZONE™ Reactors and Process available from Lyondell Basell.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Useful chain transfer agents are typically alkylalumoxanes, a compound represented by the formula $AlR_3$, $ZnR_2$ (where each R is, independently, a $C_1$-$C_8$ aliphatic radical, such as methyl, ethyl, propyl, butyl, penyl, hexyl octyl or an isomer thereof) or a combination thereof, such as diethyl zinc, methylalumoxane, trimethylaluminum, triisobutylaluminum, trioctylaluminum, or a combination thereof.

Polymerization Catalyst Compounds

Polymerization catalysts of the present disclosure for forming α-olefin-metal alkenyl and α-olefin-metal alkenyldiene copolymers can be single site coordination polymerization catalysts, such as metallocene or post-metallocene compounds (such as bis(phenolate) heterocyclic Lewis base complexes). Transition metal compounds known as metallocenes and or bis(phenolate) heterocyclic Lewis base are exemplary catalyst compounds according to the present disclosure.

Metallocene Catalyst Compounds

Useful metallocene catalyst compound can be transition metal catalyst compound having one, two or three, typically one or two, substituted or unsubstituted cyclopentadienyl ligands (such as substituted or unsubstituted Cp, Ind or Flu) bound to the transition metal. Metallocene catalyst compounds as used herein include metallocenes comprising Group 3 to Group 12 metal complexes, such as, Group 4 to Group 6 metal complexes, for example, Group 4 metal complexes.

The metallocene catalyst compound of catalyst systems of the present disclosure may be unbridged metallocene catalyst compounds represented by the formula (MCN-I): $Cp^A Cp^B M'X'_n$, wherein each $Cp^A$ and $Cp^B$ is independently selected from cyclopentadienyl ligands (for example, Cp, Ind, or Flu) and ligands isolobal to cyclopentadienyl, one or both $Cp^A$ and $Cp^B$ may contain heteroatoms, and one or both $Cp^A$ and $Cp^B$ may be substituted by one or more R" groups; M' is selected from Groups 3 through 12 atoms and lanthanide Group atoms; X' is an anionic leaving group; n is 0 or an integer from 1 to 4; each R" is independently selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, ether, and thioether.

In at least one embodiment, each $Cp^A$ and $Cp^B$ is independently selected from cyclopentadienyl, indenyl, fluorenyl, indacenyl, tetrahydroindenyl, cyclopentaphenanthreneyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated and substituted versions thereof. Each $Cp^A$ and $Cp^B$ may independently be indacenyl or tetrahydroindenyl.

The metallocene catalyst compound may be a bridged metallocene catalyst compound represented by the formula (MCN-II): $Cp^A(T)Cp^B M'X'_n$, wherein each $Cp^A$ and $Cp^B$ is independently selected from cyclopentadienyl ligands (for example, Cp, Ind, or Flu) and ligands isolobal to cyclopentadienyl, where one or both $Cp^A$ and $Cp^B$ may contain heteroatoms, and one or both $Cp^A$ and $Cp^B$ may be substituted by one or more R" groups; M' is selected from Groups 3 through 12 atoms and lanthanide Group atoms, preferably Group 4; X is an anionic leaving group; n is 0 or an integer from 1 to 4; (T) is a bridging group selected from divalent alkyl, divalent substituted alkyl, divalent heteroalkyl, divalent alkenyl, divalent substituted alkenyl, divalent heteroalkenyl, divalent alkynyl, divalent substituted alkynyl, divalent heteroalkynyl, divalent alkoxy, divalent aryloxy, divalent alkylthio, divalent arylthio, divalent aryl, divalent substituted aryl, divalent heteroaryl, divalent aralkyl, divalent aralkylene, divalent alkaryl, divalent alkarylene, divalent haloalkyl, divalent haloalkenyl, divalent haloalkynyl, divalent heteroalkyl, divalent heterocycle, divalent heteroaryl, a divalent heteroatom-containing group, divalent hydrocarbyl, divalent substituted hydrocarbyl, divalent heterohydrocarbyl, divalent silyl, divalent boryl, divalent phosphino, divalent phosphine, divalent amino, divalent amine, divalent ether, divalent thioether. R" is selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, germanium, ether, and thioether.

In at least one embodiment, each of $Cp^A$ and $Cp^B$ is independently selected from cyclopentadienyl, indenyl, fluorenyl, cyclopentaphenanthreneyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated, and substituted versions thereof, preferably cyclopentadienyl, n-propylcyclopentadienyl, indenyl, pentamethylcyclopentadienyl, tetramethylcyclopentadienyl, and n-butylcyclopentadienyl, 2-methyl-4-phenyl-1H-indene, 2-methyl-7-phenyl-1H-indene, 4-(4-(tert-butyl)phenyl)-2-methyl-1H-indene, 7-(4-(tert-butyl)phenyl)-2-methyl-1H-indene,2-methyl-4-(o-tolyl)-1H-indene, 2-methyl-7-(o-tolyl)-1H-indene, 4-(3,5-dimethylphenyl)-2-methyl-1H-indene, 7-(3,5-dimethylphenyl)-2-methyl-1H-indene, 4-(3,5-di-tert-butylphenyl)-2-methyl-1H-indene, 7-(3,5-di-tert-butylphenyl)-2-methyl-1H-indene, 4-(3,5-di-tert-butyl-4-methoxyphenyl)-2-methyl-1H-indene, 7-(3,5-di-tert-butyl-4-methoxyphenyl)-2-methyl-1H-indene, 4-([1,1'-biphenyl]-2-yl)-2-methyl-1H-indene, 7-([1,1'-biphenyl]-2-yl)-2-methyl-1H-indene, 2-methyl-4-(2,4,5-trimethylphenyl)-1H-indene, 2-methyl-7-(2,4,5-trimethylphenyl)-1H-indene, 1-(2-methyl-1H-inden-4-yl)naphthalene, 1-(2-methyl-1H-inden-7-yl)naphthalene, 9-(2-methyl-1H-inden-4-yl) anthracene, 9-(2-methyl-1H-inden-7-yl)anthracene, 4-(3,5-bis(trifluoromethyl)phenyl)-2-methyl-1H-indene, 7-(3,5-bis(trifluoromethyl)phenyl)-2-methyl-1H-indene, 6-methyl-1,2,3,5-tetrahydro-s-indacene, 6-methyl-8-phenyl-1,2,3,5-tetrahydro-s-indacene, 6-methyl-4-phenyl-1,2,3,5-tetrahydro-s-indacene, 8-(4-(tert-butyl)phenyl)-6-methyl-1,2,3,5-tetrahydro-s-indacene, 4-(4-(tert-butyl)phenyl)-6-methyl-1,2,3,5-tetrahydro-s-indacene, 8-(2-isopropylphenyl)-6-methyl-1,2,3,5-tetrahydro-s-indacene, 4-(2-isopropylphenyl)-6-methyl-1,2,3,5-tetrahydro-s-indacene, 6-methyl-8-(o-tolyl)-1,2,3,5-tetrahydro-s-indacene, 6-methyl-4-(o-tolyl)-1,2,3,5-tetrahydro-s-indacene, 8-([1,1'-biphenyl]-2-yl)-6-methyl-1,2,3,5-tetrahydro-s-indacene, 4-([1,1'-biphenyl]-2-yl)-6-methyl-1,2,3,5-tetrahydro-s-indacene, 8-(3,5-di-tert-butyl-4-methoxyphenyl)-6-methyl-1,2,3,5-tetrahydro-s-indacene, 4-(3,5-di-tert-butyl-4-methoxyphenyl)-6-methyl-1,2,3,5-tetrahydro-s-indacene, 8-(3,5-di-tert-butylphenyl)-6-methyl-1,2,3,5-tetrahydro-s-indacene, 4-(3,5-di-tert-butylphenyl)-6-methyl-1,2,3,5-tetrahydro-s-indacene, 8-(3,5-bis(trifluoromethyl)phenyl)-6-methyl-1,2,3,5-tetrahydro-s-indacene, 4-(3,5-bis(trifluoromethyl)phenyl)-6-methyl-1,2,3,5-tetrahydro-s-indacene, 6-methyl-8-(naphthalen-1-yl)-1,2,3,5-tetrahydro-s-indacene, 6-methyl-4-(naphthalen-1-yl)-1,2,3,5-tetrahydro-s-indacene, 9-(6-methyl-1,2,3,7-tetrahydro-s-indacen-4-yl)anthracene, 9-(6-methyl-1,2,3,5-tetrahydro-s-indacen-4-yeanthracene, 6-methyl-8-(2,4,5-trimethylphenyl)-1,2,3,5-tetrahydro-s-indacene, 4-methyl-8-(2,4,5-trimethylphenyl)-1,2,3,5-tetrahydro-s-indacene.

In at least one embodiment, each $Cp^A$ and $Cp^B$ may independently be indacenyl, tetrahydroindenyl, tetrahydroindacenyl.

In at least one embodiment, (T) is a bridging group containing at least one Group 13, 14, 15, or 16 element, in particular boron or a Group 14, 15 or 16 element, preferably (T) is O, S, NR', or $SiR'_2$, where each R is independently hydrogen or $C_1$-$C_{20}$ hydrocarbyl.

In another embodiment, the metallocene catalyst compound is represented by the formula:

where Cp is independently a substituted or unsubstituted cyclopentadienyl ligand (for example, substituted or unsubstituted Cp, Ind, or Flu) or substituted or unsubstituted ligand isolobal to cyclopentadienyl; M is a Group 4 transition metal; G is a heteroatom group represented by the formula $JR^*_z$ where J is N, P, O or S, and $R^*$ is a linear, branched, or cyclic $C_1$-$C_{20}$ hydrocarbyl; z is 1 or 2; T is a bridging group; y is 0 or 1; X is a leaving group; m=1, n=1, 2 or 3, q=0, 1, 2 or 3, and the sum of m+n+q is equal to the coordination number of the transition metal.

In at least one embodiment, J is N, and $R^*$ is methyl, ethyl, propyl, butyl, pentyl, hexyl, heptyl, octyl, nonyl, cyclooctyl, cyclododecyl, decyl, undecyl, dodecyl, adamantyl or an isomer thereof.

In at least one embodiment, the catalyst compound is represented by formula (MCN-R) or formula (MCN-S):

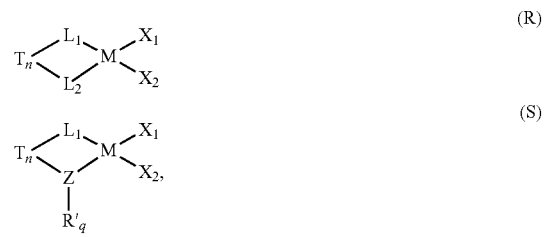

wherein in each of formula (MCN-R) and formula (MCN-S):

M is the metal center, and is a Group 4 metal, such as titanium, zirconium or hafnium, such as zirconium or hafnium when $L_1$ and $L_2$ are present and titanium when Z is present;

n is 0 or 1;

T is an optional bridging group which, if present, is a bridging group containing at least one Group 13, 14, 15, or 16 element, in particular boron or a Group 14, 15 or 16 element (preferably T is selected from dialkylsilyl, diarylsilyl, dialkylmethyl, ethylenyl (—CH$_2$—CH$_2$—) or hydrocarbylethylenyl wherein one, two, three or four of the hydrogen atoms in ethylenyl are substituted by hydrocarbyl, where hydrocarbyl can be independently C$_1$ to C$_{16}$ alkyl or phenyl, tolyl, xylyl and the like), and when T is present, the catalyst represented can be in a racemic or a meso form;

L$_1$ and L$_2$ are independently cyclopentadienyl, indenyl, tetrahydroindenyl or fluorenyl, optionally substituted, that are each bonded to M, or L$_1$ and L$_2$ are independently cyclopentadienyl, indenyl, tetrahydroindenyl or fluorenyl, which are optionally substituted, in which any two adjacent substituents on L$^1$ and L$^2$ are optionally joined to form a substituted or unsubstituted, saturated, partially unsaturated, or aromatic cyclic or polycyclic substituent;

Z is nitrogen, oxygen, sulfur, or phosphorus (preferably nitrogen);

q is 1 or 2 (preferably q is 1 when Z is N);

R' is a cyclic, linear or branched C$_1$ to C$_{40}$ alkyl or substituted alkyl group;

X$_1$ and X$_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or X$_1$ and X$_2$ are joined and bound to the metal atom to form a metallacycle ring containing from about 3 to about 20 carbon atoms; or both together can be an olefin, diolefin or aryne ligand.

Preferably, T in any of the MCN formulas herein is present and is a bridging group containing at least one Group 13, 14, 15, or 16 element, in particular a Group 14 element. Examples of suitable bridging groups include P(=S)R', P(=Se)R', P(=O)R', R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R'$_2$SiOSiR'$_2$, R'$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR'$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', R'$_2$C—PR'—CR'$_2$, O, S, Se, Te, NR', PR', AsR', SbR', O—O, S—S, R'N—NR', R'P—PR', O—S, O—NR', O—PR', S—NR', S—PR', and R'N—PR' where R' is hydrogen or a C$_1$-C$_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferred examples for the bridging group T include CH$_2$, CH$_2$CH$_2$, SiMe$_2$, SiPh$_2$, SiMePh, Si(CH$_2$)$_3$, Si(CH$_2$)$_4$, O, S, NPh, PPh, NMe, PMe, NEt, NPr, NBu, PEt, PPr, Me$_2$SiOSiMe$_2$, and PBu.

In a preferred embodiment of the invention in any embodiment of any MCN formulas described herein, T is represented by the formula R$^a_2$J or (R$^a_2$J)$_2$, where J is C, Si, or Ge, and each R$^a$ is, independently, hydrogen, halogen, C$_1$ to C$_{20}$ hydrocarbyl (such as methyl, ethyl, propyl, butyl, pentyl, hexyl, heptyl, octyl, nonyl, decyl, undecyl, or dodecyl) or a C$_1$ to C$_{20}$ substituted hydrocarbyl, and two R$^a$ can form a cyclic structure including aromatic, partially saturated, or saturated cyclic or fused ring system. Preferably, T is a bridging group comprising carbon or silica, such as dialkylsilyl, preferably T is selected from CH$_2$, CH$_2$CH$_2$, C(CH$_3$)$_2$, SiMe$_2$, SiPh$_2$, SiMePh, silylcyclobutyl (Si(CH$_2$)$_3$), (Ph)$_2$C, (p-(Et)$_3$SiPh)$_2$C, Me$_2$SiOSiMe$_2$, and cyclopentasilylene (Si(CH$_2$)$_4$).

Polymerization catalysts of the present disclosure for forming α-olefin-metal alkenyl and α-olefin-metal alkenyl-diene copolymers can be monocyclopentadienyl group 4 transition metal compounds represented by the formula (MCN-IB):

$$T_y Cp'_m MG_n X_q \quad (MCN\text{-}IB)$$

wherein Cp' is a substituted or unsubstituted tetrahydroindacenyl group (such as tetrahydro-s-indacenyl or tetrahydro-as-indacenyl) which may be substituted or unsubstituted, optionally provided that when Cp' is tetrahydro-s-indecenyl: 1) the 3 and/or 4 positions are not aryl or substituted aryl, 2) the 3 position is not directly bonded to a group 15 or 16 heteroatom, 3) there are no additional rings fused to the tetrahydroindacenyl ligand, 4) T is not bonded to the 2-position, 5) the 5, 6, or 7-position (such as the 6 position) is geminally disubstituted, such as with two C$_1$-C$_{10}$ alkyl groups; and 6) when G is t-butylamido, adamantylamido, cyclooctylamido, cyclohexylamido or cyclododecylamido and the 5 and 7 positions are H, then the 6 position and/or X is not methyl;

M is a group 3, 4, 5, or 6 transition metal, such as group 4 transition metal, for example titanium, zirconium, or hafnium (such as titanium);

G is a heteroatom group represented by the formula JR$^i_z$ where J is N, P, O or S, R$^i$ is a C$_1$ to C$_{20}$ hydrocarbyl group, and z is 2-y when J is N or P, and 1-y when J is O or S (such as J is N and z is 1);

T is a bridging group (such as dialkylsilylene or dialkylcarbylene); T can be (CR$^8$R$^9$)$_x$, SiR$^8$R$^9$ or GeR$^8$R$^9$ where x is 1 or 2, R$^8$ and R$^9$ are independently selected from substituted or unsubstituted hydrocarbyl, halocarbyl, silylcarbyl and germylcarbyl and R$^8$ and R$^9$ may optionally be bonded together to form a ring structure, and in an alternate embodiment, R$^8$ and R$^9$ are not aryl);

y is 0 or 1, indicating the absence or presence of T;

X is a leaving group (such as a halide, a hydride, an alkyl group, an alkenyl group or an arylalkyl group);

m=1; n=1, 2 or 3; q=1, 2 or 3; and the sum of m+n+q is equal to the oxidation state of the transition metal (such as 3, 4, 5, or 6, such as 4); such as m=1, n=1, q is 2, and y=1.

In some embodiments, the 6 position of Cp' is not methyl.

In at least one embodiment, each R$^i$ is a linear, branched or cyclic C$_1$ to C$_{20}$ hydrocarbyl group, such as independently selected from the group consisting of methyl, ethyl, propyl, butyl, pentyl, hexyl, heptyl, octyl, nonyl, decyl, and isomers thereof, such as t-butyl and or cyclododecyl.

In at least one embodiment, a mono-tetrahydro-s-indacenyl group 4 transition metal compound is represented by the formula MCN-IA or MCN-IIA:

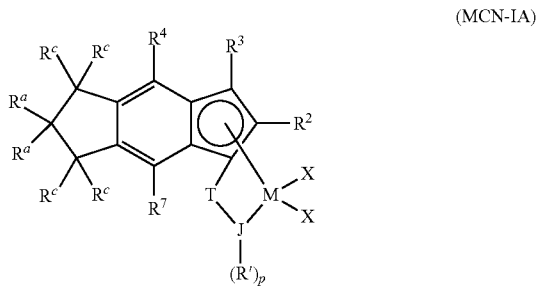

(MCN-IA)

or

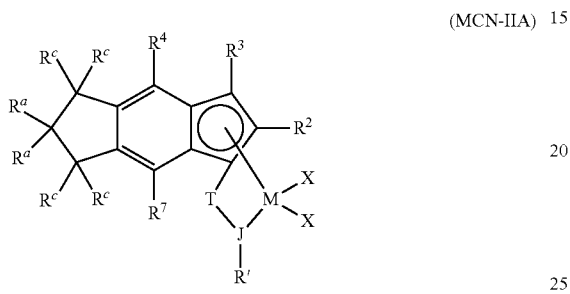

(MCN-IIA)

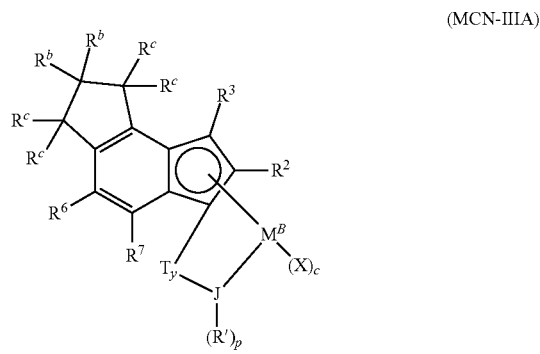

(MCN-IIIA)

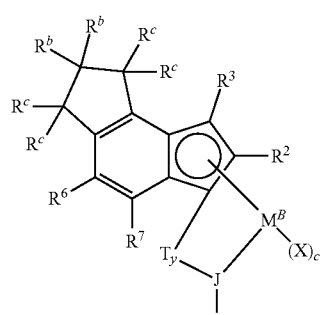

MCN-IVA)

where M is a group 4 metal (such as Hf, Ti or Zr, such as Ti);

J is N, O, S or P (such as N and p=1);

p is 1 when J is N or P, and is 0 when J is O or S;

each $R^a$ is independently $C_1$-$C_{10}$ alkyl (alternately a $C_2$-$C_{10}$ alkyl);

each $R^c$ is independently hydrogen or a $C_1$-$C_{10}$ alkyl;

each $R^2$, $R^3$, $R^4$, and $R^7$ is independently hydrogen, or a $C_1$-$C_{50}$ substituted or unsubstituted hydrocarbyl, halocarbyl, silylcarbyl or germylcarbyl, optionally provided that: 1) $R^3$ and/or $R^4$ are not aryl or substituted aryl, 2) $R^3$ is not directly bonded to a group 15 or 16 heteroatom, and 3) adjacent $R^4$, $R^c$, $R^a$ or $R^7$ do not join together to form a fused ring system;

each R' is, independently, a $C_1$-$C_{100}$ substituted or unsubstituted hydrocarbyl, halocarbyl, silylcarbyl or germylcarbyl; T is $(CR^8R^9)_x$, $SiR^8R^9$ or $GeR^8R^9$ where x is 1 or 2, $R^8$ and $R^9$ are independently selected from substituted or unsubstituted hydrocarbyl, halocarbyl, silylcarbyl and germylcarbyl and $R^8$ and $R^9$ may optionally be bonded together to form a ring structure;

each X is, independently, a leaving group, or two Xs are joined and bound to the metal atom to form a metallocycle ring, or two Xs are joined to form a chelating ligand, a diene ligand, or an alkylidene, optionally provided that: in formula MCN-IA, when J(R')p is t-butylamido, adamantylamido, cyclooctylamido, cyclohexylamido or cyclododecylamido and $R^c$ are H, then $R^a$ and or X is not methyl; and in formula MCN-IIA, when JR' is t-butylamido, adamantylamido, cyclooctylamido, cyclohexylamido or cyclododecylamido and $R^c$ is H, then $R^a$ and/or X is not methyl.

Optionally, $R^a$ is not methyl.

In at least one embodiment, a bridged mono-tetrahydro-as-indacenyl transition metal compound is represented by the formula MCN-IIIA or MCN-IVA:

where M is group 3, 4, 5, or 6 transition metal;

B is the oxidation state of M, and is 3, 4, 5 or 6;

c is B-2;

J is N, O, S or P;

p is 2-y when J is N or P, and 1-y when J is O or S;

each $R^2$, $R^3$, $R^6$, and $R^7$, is independently hydrogen, or a $C_1$-$C_{50}$ substituted or unsubstituted hydrocarbyl, halocarbyl or silylcarbyl;

each $R^b$ and $R^c$ is independently $C_1$-$C_{10}$ alkyl, or hydrogen;

each R' is, independently, a $C_1$-$C_{100}$ substituted or unsubstituted hydrocarbyl, halocarbyl, silylcarbyl or germylcarbyl;

T is $(CR^8R^9)_x$, $SiR^8R^9$ or $GeR^8R^9$ where x is 1 or 2, $R^8$ and $R^9$ are independently selected from hydrogen, substituted or unsubstituted hydrocarbyl, halocarbyl, silylcarbyl and germylcarbyl, and $R^8$ and $R^9$ may optionally be bonded together to form a ring structure;

y is 1 when T is present and y is 0 when T is absent; and each X is, independently, a leaving group, or two Xs are joined and bound to the metal atom to form a metallocycle ring, or two Xs are joined to form a chelating ligand, a diene ligand, or an alkylidene.

In at least one embodiment, a bridged mono-tetrahydro-as-indacenyl transition metal compound is represented by the formula MCN-A or MCN-B:

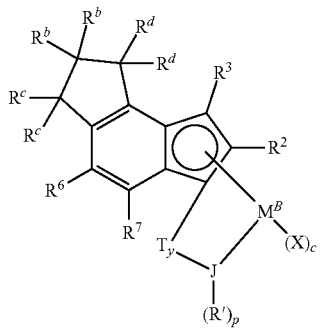

(MCN-A)

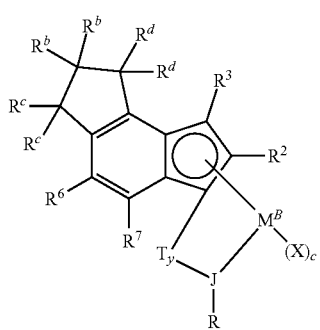

(MCN-B)

where M, B, c, J, p, $R^2$, $R^3$, $R^6$, $R^7$, R', T, y and X are as defined above for formula MCN-IIIA and MCN-IVA and each $R^b$, $R^c$, and $R^d$ is independently $C_1$-$C_{10}$ alkyl, or hydrogen, optionally provided that both $R^b$, both $R^c$, or both $R^d$ are not hydrogen. In some embodiments, $R^d$ is independently selected from the group consisting of hydrogen, methyl, ethyl, propyl, butyl, pentyl, hexyl, heptyl, octyl, nonyl, decyl, and isomers thereof, such as hydrogen or methyl.

The present disclosure also relates to bridged monoindacenyl group 4 transition metal compounds represented by the formula MCN-V or MCN-VI:

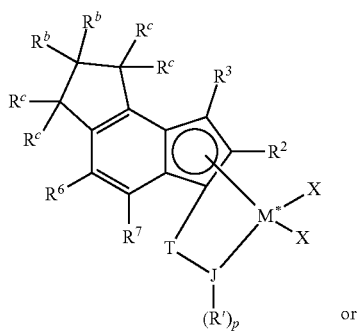

(MCN-V)

or

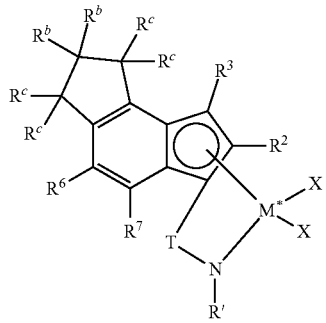

(MCN-VI)

where M* is a group 4 transition metal (such as Hf, Zr or Ti);

J is N, O, S or P (such as J is N and p is 1);

p is 2-y when J is N or P, and 1-y when J is O or S, each $R^2$, $R^3$, $R^6$, and $R^7$ is independently hydrogen, or a $C_1$-$C_{50}$ substituted or unsubstituted hydrocarbyl, halocarbyl, silylcarbyl or germycarbyl;

each $R^b$ and each $R^c$ is independently a $C_1$-$C_{10}$ alkyl or hydrogen;

each R' is, independently, a $C_1$-$C_{100}$ substituted or unsubstituted hydrocarbyl, halocarbyl, silylcarbyl or germylcarbyl;

T is $(CR^8R^9)_x$, $SiR^8R^9$ or $GeR^8R^9$ where x is 1 or 2, $R^8$ and $R^9$ are independently selected from substituted or unsubstituted hydrocarbyl, halocarbyl, silylcarbyl and germylcarbyl and $R^8$ and $R^9$ may optionally be bonded together to form a ring structure;

y is 1 when T is present and y is 0 when T is absent; and each X is, independently, a leaving group, or two Xs are joined and bound to the metal atom to form a metallocycle ring, or two Xs are joined to form a chelating ligand, a diene ligand, or an alkylidene.

In a particularly useful embodiment of formula (MCN-V) and/or (MCN-VI), M* is a group 4 metal (such as Hf, Zr or Ti); J is nitrogen; each $R^2$, $R^3$, $R^6$, and $R^7$ is independently hydrogen, or a $C_1$-$C_{20}$ substituted or unsubstituted hydrocarbyl, halocarbyl, silylcarbyl or germycarbyl; each $R^b$ and each $R^c$ is independently $C_1$-$C_{10}$ alkyl (such as methyl, ethyl, propyl, butyl, pentyl, hexyl, heptyl, octyl, nonyl, decyl, or an isomer thereof), or hydrogen; R' is a $C_1$-$C_{20}$ substituted or unsubstituted hydrocarbyl, halocarbyl, silylcarbyl or germylcarbyl; T is $(CR^8R^9)_x$, $SiR^8R^9$ or $GeR^8R^9$ where x is 1 or 2, $R^8$ and $R^9$ are independently selected from substituted or unsubstituted hydrocarbyl, halocarbyl, silylcarbyl and germylcarbyl, y is 1, and $R^8$ and $R^9$ may optionally be bonded together to form a ring structure; each X is halogen or a $C_1$ to $C_{20}$ hydrocarbyl wherein the hydrocarbyls are optionally joined to form a chelating ligand, a diene, or an alkylidene.

In at least one embodiment, M and/or M* are a group 4 metal, such as titanium.

In at least one embodiment, $R^3$ is not substituted with a group 15 or 16 heteroatom.

In at least one embodiment, each $R^2$, $R^3$, $R^4$, $R^6$, and $R^7$ is independently hydrogen, or a $C_1$-$C_{50}$ substituted or unsubstituted hydrocarbyl, halocarbyl, silylcarbyl or germylcarbyl, such as methyl, ethyl, propyl, butyl, pentyl, hexyl, heptyl, octyl, nonyl, decyl, undecyl, and dodecyl or an isomer thereof.

In at least one embodiment, each $R^a$ is independently selected from the group consisting of methyl, ethyl, propyl, butyl, pentyl, hexyl, heptyl, octyl, nonyl, decyl, and isomers thereof, such as methyl and ethyl, such as methyl.

Alternately, the indacene ligand does not have a methyl at the 6 position, alternately one or both $R^a$ are not methyl.

In at least one embodiment, $R^b$ is independently selected from the group consisting of hydrogen, methyl, ethyl, propyl, butyl, pentyl, hexyl, heptyl, octyl, nonyl, decyl, and isomers thereof, such as methyl and ethyl, such as methyl.

In at least one embodiment, $R^c$ is independently selected from the group consisting of hydrogen, methyl, ethyl, propyl, butyl, pentyl, hexyl, heptyl, octyl, nonyl, decyl, and isomers thereof, such as hydrogen or methyl.

In at least one embodiment, R' is a $C_1$-$C_{100}$ substituted or unsubstituted hydrocarbyl, halocarbyl, or silylcarbyl, such as methyl, ethyl, propyl, butyl, pentyl, hexyl, heptyl, octyl, nonyl, decyl, undecyl, dodecyl or an isomer thereof, such as t-butyl, neopentyl, cyclohexyl, cyclooctyl, cyclododecyl, adamantyl, or norbornyl.

In at least one embodiment, T is $CR^8R^9$, $R^8R^9C$—$CR^8R^9$, $SiR^8R^9$ or $GeR^{8*}R^{9*}$ where $R^8$ and $R^9$ are independently selected from substituted or unsubstituted hydrocarbyl, halocarbyl, silylcarbyl and $R^8$ and $R^9$ may optionally be bonded together to form a ring structure, such as each $R^8$ and $R^9$ is independently methyl, ethyl, propyl, butyl, pentyl, hexyl, heptyl, octyl, nonyl, decyl, benzyl, phenyl, methylphenyl or an isomer thereof, such as methyl, ethyl, propyl, butyl, or hexyl.

In at least one embodiment, at least one of $R^8$ or $R^9$ is not aryl. In at least one embodiment, $R^8$ is not aryl. In at least one embodiment, $R^9$ is not aryl. In at least one embodiment, $R^8$ and $R^9$ are not aryl.

In at least one embodiment, $R^8$ and $R^9$ are independently $C_1$-$C_{10}$ alkyls, such as methyl, ethyl, propyl, butyl, pentyl, hexyl, heptyl, octyl, nonyl, decyl, or an isomer thereof.

In at least one embodiment, each $R^2$, $R^3$, $R^4$, and $R^7$ is independently hydrogen or hydrocarbyl. In at least one embodiment, each $R^2$, $R^3$, $R^6$, and $R^7$ is independently hydrogen or hydrocarbyl.

In at least one embodiment, each $R^2$, $R^3$, $R^4$, and $R^7$ is independently hydrogen or a $C_1$-$C_{10}$ alkyl, such as methyl, ethyl, propyl, butyl, pentyl, hexyl, heptyl, octyl, nonyl, decyl, or an isomer thereof.

In at least one embodiment, each $R^2$, $R^3$, $R^6$, and $R^7$ is independently hydrogen or a $C_1$-$C_{10}$ alkyl, such as methyl, ethyl, propyl, butyl, pentyl, hexyl, heptyl, octyl, nonyl, decyl, or an isomer thereof.

In at least one embodiment, $R^2$ is a $C_1$-$C_{10}$ alkyl and $R^3$, $R^4$, and $R^6$ are hydrogen. In some embodiments, $R^2$ is a $C_1$-$C_{10}$ alkyl and $R^3$, $R^6$, and $R^7$ are hydrogen.

In at least one embodiment, $R^2$, $R^3$, $R^4$, and $R^6$ are hydrogen. In some embodiments, $R^2$, $R^3$, $R^6$, and $R^7$ are hydrogen.

In at least one embodiment, $R^2$ is methyl, ethyl, or an isomer of propyl, butyl, pentyl or hexyl, and $R^3$, $R^4$, and $R^7$ are hydrogen. In at least one embodiment, $R^2$ is methyl, ethyl, or an isomer of propyl, butyl, pentyl or hexyl, and $R^3$, $R^6$, and $R^7$ are hydrogen.

In at least one embodiment, $R^2$ is methyl and $R^3$, $R^4$, and $R^7$ are hydrogen. In some embodiments, $R^2$ is methyl and $R^3$, $R^6$, and $R^7$ are hydrogen.

In at least one embodiment, $R^3$ is hydrogen. In at least one embodiment, $R^2$ is hydrogen. In at least one embodiment, R' is $C_1$-$C_{100}$ or $C_1$-$C_{30}$ substituted or unsubstituted hydrocarbyl.

In at least one embodiment, R' is $C_1$-$C_{30}$ substituted or unsubstituted alkyl (linear, branched, or cyclic), aryl, alkaryl, or heterocyclic group.

In at least one embodiment, R' is $C_1$-$C_{30}$ linear, branched or cyclic alkyl group. In at least one embodiment, R' is methyl, ethyl, or any isomer of propyl, butyl, pentyl, hexyl, heptyl, octyl, nonyl, decyl, undecyl, or dodecyl.

In at least one embodiment, R' is a cyclic or polycyclic hydrocarbyl. In at least one embodiment, R' is selected from tert-butyl, neopentyl, cyclohexyl, cycloheptyl, cyclooctyl, cyclononyl, cyclodecyl, cycloundecyl, cyclododecyl, adamantyl, and norbornyl.

In at least one embodiment, $R^t$ is selected from tert-butyl, neopentyl, cyclohexyl, cycloheptyl, cyclooctyl, cyclononyl, cyclodecyl, cycloundecyl, cyclododecyl, adamantyl, and norbornyl.

In at least one embodiment, T is selected from diphenylmethylene, dimethylmethylene, 1,2-ethylene, cyclotrimethylenesilylene, cyclotetramethylenesilylene, cyclopentamethylenesilylene, dimethylsilylene, diethylsilylene, methylethylsilylene, and dipropylsilylene.

In at least one embodiment, each $R^a$ is independently methyl, ethyl, propyl, butyl, pentyl or hexyl.

In at least one embodiment, each $R^a$ is independently methyl or ethyl. In at least one embodiment, each $R^a$ is methyl.

In at least one embodiment, each $R^b$ is independently hydrogen, methyl, ethyl, propyl, butyl, pentyl or hexyl. In at least one embodiment, each $R^b$ and each $R^c$ is independently hydrogen, methyl, ethyl, propyl, butyl, pentyl or hexyl. In at least one embodiment, each $R^b$ is independently hydrogen, methyl or ethyl. In at least one embodiment, each $R^b$ is methyl.

In at least one embodiment, each X is hydrocarbyl, halocarbyl, or substituted hydrocarbyl or halocarbyl. In at least one embodiment, X is methyl, benzyl, or halo where halo includes fluoro, chloro, bromo and iodido.

In at least one embodiment of formula MCN-V or MCN-VI described herein: 1) $R^3$ and/or $R^4$ are not aryl or substituted aryl; 2) $R^3$ is not directly bonded to a group 15 or 16 heteroatom, and 3) adjacent $R^4$, $R^c$, $R^a$ or $R^7$ do not join together to form a fused ring system, and 4) each $R^a$ is a $C_1$ to $C_{10}$ alkyl (such as methyl, ethyl, propyl, butyl, pentyl, hexyl, heptyl, octyl, nonyl, decyl, or an isomer thereof).

Illustrative, but not limiting, examples of metallocenes for use in a catalyst system include:

dimethylsilylene(2,6,6-trimethyl-1,5,6,7-tetrahydro-s-indacen-1-yl)(cyclododecylamido)$M(R)_2$ (such as $TiCl_2$ or $TiMe_2$), dimethylsilylene(2,6,6-trimethyl-1,5,6,7-tetrahydro-s-indacen-1-yl)(t-butylamido)$M(R)_2$ (such as $TiCl_2$ or $TiMe_2$), dimethylsilylene(6,6-dimethyl-1,5,6,7-tetrahydro-s-indacen-1-yl)(cyclododecylamido)$M(R)_2$ (such as $TiCl_2$ or $TiMe_2$), dimethylsilylene(6,6-dimethyl-1,5,6,7-tetrahydro-s-indacen-1-yl)(t-butylamido)$M(R)_2$ (such as $TiCl_2$ or $TiMe_2$), dimethylsilylene(2,7,7-trimethyl-3,6,7,8-tetrahydro-as-indacen-3-yl)(cyclododecylamido)$M(R)_2$ (such as $TiCl_2$ or $TiMe_2$), dimethylsilylene(2,7,7-trimethyl-3,6,7,8-tetrahydro-as-indacen-3-yl)(t-butylamido)$M(R)_2$ (such as $TiCl_2$ or $TiMe_2$), dimethylsilylene(7,7-dimethyl-3,6,7,8-tetrahydro-as-indacen-3-yl)(cyclododecylamido)$M(R)_2$ (such as $TiCl_2$ or $TiMe_2$), dimethylsilylene(7,7-dimethyl-3,6,7,8-tetrahydro-as-indacen-3-yl)(t-butylamido)$M(R)_2$ (such as $TiCl_2$ or $TiMe_2$), μ-(CH₃)₂Si(2,6,6-trimethyl-1,5,6,7-tetrahydro-s-indacen-1-yl)(1-adamantylamido)M(R)₂;
μ-(CH₃)₂Si(6,6-dimethyl-1,5,6,7-tetrahydro-s-indacen-1-yl)(1-adamantylamido)M(R)₂;
μ-(CH₃)₂Si(2-methyl-6,6-diethyl-1,5,6,7-tetrahydro-s-indacen-1-yl)(1-adamantylamido)M(R)₂;
μ-(CH₃)₂Si(6,6-diethyl-1,5,6,7-tetrahydro-s-indacen-1-yl)(1-adamantylamido)M(R)₂;
μ-(CH₃)₂Si(2,7,7-trimethyl-3,6,7,8-tetrahydro-as-indacen-3-yl)(1-adamantylamido)M(R)₂;
μ-(CH₃)₂Si(7,7-dimethyl-3,6,7,8-tetrahydro-as-indacen-3-yl)(1-adamantylamido)M(R)₂;
μ-(CH₃)₂Si(2-methyl-3,6,7,8-tetrahydro-as-indacen-3-yl)(1-adamantylamido)M(R)₂;
μ-(CH₃)₂Si(2-methyl-7,7-diethyl-3,6,7,8-tetrahydro-as-indacen-3-yl)(1-adamantylamido)M(R)₂;
μ-(CH₃)₂Si(7,7-diethyl-3,6,7,8-tetrahydro-as-indacen-3-yl)(1-adamantylamido)M(R)₂;
μ-(CH₃)₂Si(2,6,6-trimethyl-1,5,6,7-tetrahydro-s-indacen-1-yl)(t-butylamido)M(R)₂;
μ-(CH₃)₂Si(6,6-dimethyl-1,5,6,7-tetrahydro-s-indacen-1-yl)(t-butylamido)M(R)₂;
μ-(CH₃)₂Si(2-methyl-6,6-diethyl-1,5,6,7-tetrahydro-s-indacen-1-yl)(t-butylamido)M(R)₂;
μ-(CH₃)₂Si(6,6-diethyl-1,5,6,7-tetrahydro-s-indacen-1-yl)(t-butylamido)M(R)₂;
μ-(CH₃)₂Si(2,7,7-trimethyl-3,6,7,8-tetrahydro-as-indacen-3-yl)(t-butylamido)M(R)₂;
μ-(CH₃)₂Si(7,7-dimethyl-3,6,7,8-tetrahydro-as-indacen-3-yl)(t-butylamido)M(R)₂;
μ-(CH₃)₂Si(2-methyl-3,6,7,8-tetrahydro-as-indacen-3-yl)(t-butylamido)M(R)₂;
μ-(CH₃)₂Si(2-methyl-7,7-diethyl-3,6,7,8-tetrahydro-as-indacen-3-yl)(t-butylamido)M(R)₂;
μ-(CH₃)₂Si(7,7-diethyl-3,6,7,8-tetrahydro-as-indacen-3-yl)(t-butylamido)M(R)₂;
μ-(CH₃)₂Si(2,6,6-trimethyl-1,5,6,7-tetrahydro-s-indacen-1-yl)(cyclododecylamido)M(R)₂;
μ-(CH₃)₂Si(6,6-dimethyl-1,5,6,7-tetrahydro-s-indacen-1-yl)(cyclododecylamido)M(R)₂;
μ-(CH₃)₂Si(2-methyl-6,6-diethyl-1,5,6,7-tetrahydro-s-indacen-1-yl)(cyclododecylamido)M(R)₂;
μ-(CH₃)₂Si(6,6-diethyl-1,5,6,7-tetrahydro-s-indacen-1-yl)(cyclododecylamido)M(R)₂;
μ-(CH₃)₂Si(2,7,7-trimethyl-3,6,7,8-tetrahydro-as-indacen-3-yl)(cyclododecylamido)M(R)₂;
μ-(CH₃)₂Si(7,7-dimethyl-3,6,7,8-tetrahydro-as-indacen-3-yl)(cyclododecylamido)M(R)₂;
μ-(CH₃)₂Si(2-methyl-3,6,7,8-tetrahydro-as-indacen-3-yl)(cyclododecylamido)M(R)₂;
μ-(CH₃)₂Si(2-methyl-7,7-diethyl-3,6,7,8-tetrahydro-as-indacen-3-yl)(cyclododecylamido)M(R)₂;
μ-(CH₃)₂Si(7,7-diethyl-3,6,7,8-tetrahydro-as-indacen-3-yl)(cyclododecylamido)M(R)₂;
μ-(CH₂)₃Si(2,6,6-trimethyl-1,5,6,7-tetrahydro-s-indacen-1-yl)(t-butylamido)M(R)₂;
μ-(CH₂)₄Si(2,6,6-trimethyl-1,5,6,7-tetrahydro-s-indacen-1-yl)(t-butylamido)M(R)₂;
μ-(CH₂)₅Si(2,6,6-trimethyl-1,5,6,7-tetrahydro-s-indacen-1-yl)(t-butylamido)M(R)₂;
μ-(CH₃)₂C(2,6,6-trimethyl-1,5,6,7-tetrahydro-s-indacen-1-yl)(t-butylamido)M(R)₂;
μ-(CH₂)₃Si(2,6,6-trimethyl-1,5,6,7-tetrahydro-s-indacen-1-yl)(t-butylamido)M(R)₂;
μ-(CH₂)₄Si(2,6,6-trimethyl-1,5,6,7-tetrahydro-s-indacen-1-yl)(t-butylamido)M(R)₂;
μ-(CH₂)₅Si(2,6,6-trimethyl-1,5,6,7-tetrahydro-s-indacen-1-yl)(t-butylamido)M(R)₂;
μ-(CH₃)₂C(2,6,6-trimethyl-1,5,6,7-tetrahydro-s-indacen-1-yl)(t-butylamido)M(R)₂; and
μ-(CH₃)₂Si(2,6,6-trimethyl-1,5,6,7-tetrahydro-s-indacen-1-yl)(neopentylamido)M(R)₂;

where M is selected from a group consisting of Ti, Zr, and Hf and R is selected from halogen or $C_1$ to $C_5$ alkyl, such as R is a methyl group or a halogen group, (such as TiCl₂ or TiMe₂), optionally provided however that, when the compound is dimethylsilylene(2,6,6-trimethyl-1,5,6,7-tetrahydro-s-indacen-1-yl)(Z)Ti(R)₂ or μ-(CH₃)₂Si(2-methyl-3,6,7,8-tetrahydro-as-indacen-3-yl)(Z)Ti(R)₂, where Z is t-butylamido, adamantylamido, cyclooctylamido, cyclohexylamido or cyclododecylamido, then R is not methyl.

In at least one embodiment, a catalyst system includes μ-(CH₃)₂Si($\eta^5$-2,6,6-trimethyl-1,5,6,7-tetrahydro-s-indacen-1-yl)(tertbutylamido)M(R)₂; where M is selected from a group consisting of Ti, Zr, and Hf and R is selected from halogen or $C_1$ to $C_5$ alkyl, such as, R is a methyl group. In an embodiment, M is Ti and R is Cl, Br or Me.

In alternate embodiments, two or more different transition metal compounds may be used herein. For purposes of the present disclosure one transition metal compound is considered different from another if they differ by at least one atom. For example "Me₂Si(2,7,7-Me₃-3,6,7,8-tetrahydro-as-indacen-3-yl)(cyclohexylamido)TiCl₂" is different from "Me₂Si(2,7,7-Me₃-3,6,7,8-tetrahydro-as-indacen-3-yl)(n-butylamido)TiCl₂" which is different from Me₂Si(2,7,7-Me₃-3,6,7,8-tetrahydro-as-indacen-3-yl)(n-butylamido)HfCl₂.

In at least one embodiment, one mono-tetrahydroindacenyl compounds as described herein is used in the catalyst system.

In some embodiments, catalyst compounds are represented by the formula:

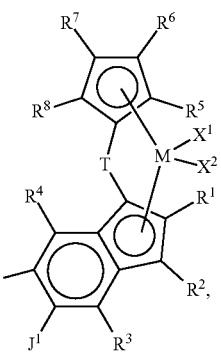

(MCN VII)

wherein:
M is a transition metal atom;
T is a bridging group;
each of $X^1$ and $X^2$ is a univalent anionic ligand, or $X^1$ and $X^2$ are joined to form a metallocycle ring;
$R^1$ is hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'₂, —SR', —OR, —SiR'₃, —OSiR'₃, —PR'₂, or —R'—SiR'₃, where R' is $C_1$-$C_{10}$ alkyl and each R' is hydrogen, halogen, $C_1$-$C_{10}$ alkyl, or $C_6$-$C_{10}$ aryl;

R³ is an unsubstituted C₄-C₆₂ cycloalkyl, a substituted C₄-C₆₂ cycloalkyl, an unsubstituted C₄-C₆₂ aryl, a substituted C₄-C₆₂ aryl, an unsubstituted C₄-C₆₂ heteroaryl, or a substituted C₄-C₆₂ heteroaryl;

each of R² and R⁴ is independently hydrogen, a halogen, an unsubstituted C₁-C₄₀ hydrocarbyl, a C₁-C₄₀ substituted hydrocarbyl, an unsubstituted C₄-C₆₂ aryl, a substituted C₄-C₆₂ aryl, an unsubstituted C₄-C₆₂ heteroaryl, a substituted C₄-C₆₂ heteroaryl, —NR'₂, —SR', —OR, —SiR'₃, —OSiR'₃, —PR'₂, or —R"—SiR'₃, wherein R' is C₁-C₁₀ alkyl and each R' is hydrogen, halogen, C₁-C₁₀ alkyl, or C₆-C₁₀ aryl;

each of R⁵, R⁶, R⁷, and R⁸ is independently hydrogen, a halogen, an unsubstituted C₁-C₄₀ hydrocarbyl, a C₁-C₄₀ substituted hydrocarbyl, an unsubstituted C₄-C₆₂ aryl, a substituted C₄-C₆₂ aryl, an unsubstituted C₄-C₆₂ heteroaryl, a substituted C₄-C₆₂ heteroaryl, —NR'₂, —SR, —OR, —SiR'₃, —OSiR'₃, —PR'₂, or —R"—SiR'₃, wherein R' is C₁-C₁₀ alkyl and each R' is hydrogen, halogen, C₁-C₁₀ alkyl, or C₆-C₁₀ aryl, or one or more of R⁵ and R⁶, R⁶ and R⁷, or R⁷ and R⁸ can be joined to form a substituted or unsubstituted C₄-C₆₂ saturated or unsaturated cyclic or polycyclic ring structure, or a combination thereof; and each of J¹ and J² is joined to form a substituted or unsubstituted C₄-C₆₂ (alternately C₅-C₆₂, alternately C₅-C₄₀, alternately C₆ to C₃₀, alternately C₆ to C₂₀) unsaturated cyclic or polycyclic ring structure, or a combination thereof, provided that J¹ and J² together with the two carbons they are bound to on the indenyl group form at least one saturated ring. Preferably J¹ and J² together with the two carbons they are bound to on the indenyl group form at least one 5 or 6 membered saturated ring.

As a non-limiting illustration, the phrase "J¹ and J² together with the two carbons they are bound on the indenyl group" means that the J¹ and J² groups and the carbon atoms in the box in the formula below. Preferably the atoms in the box form a 5 or 6 membered saturated ring. For example an indacenyl ligand contains such a saturated 5 membered ring and a hexahydrobenz[f]indenyl ligand contains such a saturated 6 membered ring.

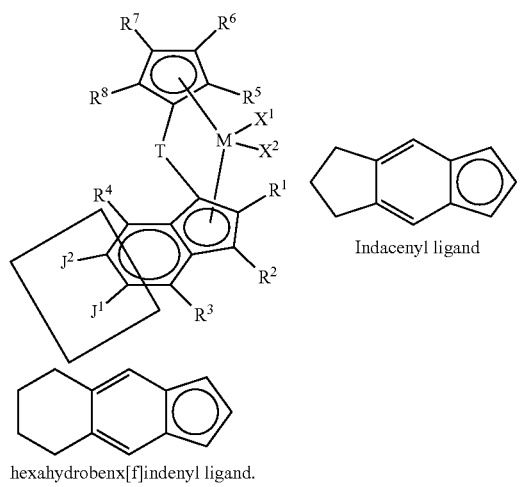

hexahydrobenx[f]indenyl ligand.

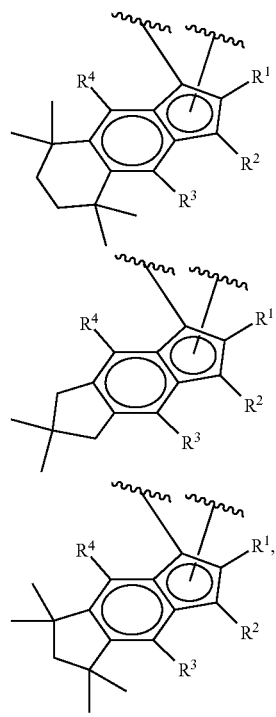

Indacenyl ligand

The unsaturated ring in the indacenyl ligand and the hexahydrobenzflindenyl ligand can be substituted or unsubstituted and can be part of multi-cyclic groups where the additional cyclic groups may be saturated or unsaturated, and substituted or unsubstituted. Typical substituents on the unsaturated ring include C₁ to C₄₀ hydrocarbyls (which may be substituted or unsubstituted), heteroatoms (such as halogens, such as Br, F, Cl), heteroatom-containing groups (such as a halocarbyl), or two or more substituents are joined together to form a cyclic or polycyclic ring structure (which may contain saturated and or unsaturated rings), or a combination thereof.

In some embodiments of the present disclosure, each of J¹ and J² is joined form an unsubstituted C₄-C₃₀ (alternately C₅-C₃₀, alternately C₆-C₂₀) cyclic or polycyclic ring, either of which may be saturated, partially saturated, or unsaturated. In some embodiments each J joins to form a substituted C₄-C₂₀ cyclic or polycyclic ring, either of which may be saturated or unsaturated. Examples include:

where R¹, R², R³ and R⁴ are as defined in Formula (I) above, and the wavy lines indicate connection to M (such as Hf or Zr) and T (such as Me₂Si).

In some embodiments of the present disclosure, M is a transition metal such as a transition metal of Group 3, 4, or 5 of the Periodic Table of Elements, such as a Group 4 metal, for example Zr, Hf, or Ti.

In some embodiments of the present disclosure, each of X¹ and X² is independently an unsubstituted hydrocarbyl (such as an unsubstituted C₂-C₂₀ hydrocarbyl), a substituted C₁-C₄₀ hydrocarbyl (such as a substituted C₂-C₂₀ hydrocarbyl), an unsubstituted C₄-C₆₂ aryl, a substituted C₄-C₆₂ aryl, an unsubstituted C₄-C₆₂ heteroaryl, a substituted C₄-C₆₂ heteroaryl, hydride, amide, alkoxide, sulfide, phosphide, halide, diene, amine, phosphine, ether, and a combination thereof, for example each of X¹ and X² is independently a halide or a C₁-C₅ alkyl, such as methyl. In some embodiments, each of X¹ and X² is independently chloro, bromo, methyl, ethyl, propyl, butyl, pentyl, hexyl, heptyl, octyl, nonyl, decyl, undecyl, or dodecyl. In some embodiments of the present disclosure, X¹ and X² form a part of a fused ring or a ring system.

In some embodiments, T is represented by the formula, (R*$_2$G)$_g$, wherein each G is C, Si, or Ge, g is 1 or 2, and each R* is, independently, hydrogen, halogen, an unsubstituted C$_1$-C$_{20}$ hydrocarbyl (such as methyl, ethyl, propyl, butyl, pentyl, hexyl, heptyl, octyl, nonyl, decyl, undecyl, or dodecyl), a substituted C$_1$-C$_{20}$ hydrocarbyl, or the two or more R* may join to form a substituted or unsubstituted, saturated, partially unsaturated or aromatic, cyclic or polycyclic substituent. In some embodiments of the present disclosure, T is a bridging group and is represented by R'$_2$C, R'$_2$Si, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', or R'$_2$C—PR—CR'$_2$ where each R' is independently hydrogen or an unsubstituted C$_1$-C$_{20}$ hydrocarbyl (such as methyl, ethyl, propyl, butyl, pentyl, hexyl, heptyl, octyl, nonyl, decyl, undecyl, or dodecyl), a substituted C$_1$-C$_{20}$ hydrocarbyl, a C$_1$-C$_{20}$ halocarbyl, a C$_1$-C$_{20}$ silylcarbyl, or a C$_1$-C$_{20}$ germylcarbyl substituent, or two or more adjacent R' join to form a substituted or unsubstituted, saturated, partially unsaturated or aromatic, cyclic or polycyclic substituent. In some embodiments of the present disclosure, T is a bridging group that includes carbon or silicon, such as dialkylsilyl, for example T is a CH$_2$, CH$_2$CH$_2$, C(CH$_3$)$_2$, (Ph)$_2$C, (p-(Et)$_3$SiPh)$_2$C, SiMe$_2$, SiPh$_2$, SiMePh, Si(CH$_2$)$_3$, Si(CH$_2$)$_4$, or Si(CH$_2$)$_4$.

In some embodiments, R$^1$ is hydrogen, a substituted C$_1$-C$_{20}$ hydrocarbyl, or an unsubstituted C$_1$-C$_{20}$ hydrocarbyl, such as a substituted C$_1$-C$_{12}$ hydrocarbyl or an unsubstituted C$_1$-C$_{12}$ hydrocarbyl (such as methyl, ethyl, propyl, butyl, pentyl, hexyl, heptyl, octyl, nonyl, decyl, undecyl, or dodecyl), for example hydrogen, a substituted C$_1$-C$_6$ hydrocarbyl, or an unsubstituted C$_1$-C$_6$ hydrocarbyl.

In some embodiments, each of R$^2$ and R$^4$ is independently hydrogen, a substituted C$_1$-C$_{20}$ hydrocarbyl, or an unsubstituted C$_1$-C$_{20}$ hydrocarbyl, such as a substituted C$_1$-C$_{12}$ hydrocarbyl or an unsubstituted C$_1$-C$_{12}$ hydrocarbyl (such as methyl, ethyl, propyl, butyl, pentyl, hexyl, heptyl, octyl, nonyl, decyl, undecyl, or dodecyl), for example hydrogen, a substituted C$_1$-C$_6$ hydrocarbyl, or an unsubstituted C$_1$-C$_6$ hydrocarbyl.

In some embodiments, each of R$^5$, R$^6$, R$^7$, and R$^8$ is independently hydrogen, a substituted C$_1$-C$_{20}$ hydrocarbyl, or an unsubstituted C$_1$-C$_{20}$ hydrocarbyl, such as a substituted C$_1$-C$_{12}$ hydrocarbyl or an unsubstituted C$_1$-C$_{12}$ hydrocarbyl (such as methyl, ethyl, propyl, butyl, pentyl, hexyl, heptyl, octyl, nonyl, decyl, undecyl, or dodecyl), such as a substituted C$_1$-C$_6$ hydrocarbyl, or an unsubstituted C$_1$-C$_6$ hydrocarbyl (such as methyl, ethyl, propyl, butyl, pentyl, or hexyl), or one or more of R$^5$ and R$^6$, R$^6$ and R$^7$, or R$^7$ and R$^8$ can be joined to form a substituted or unsubstituted C$_4$-C$_{20}$ saturated or unsaturated cyclic or polycyclic ring structure, or a combination thereof.

In some embodiments, one or more of R$^5$ and R$^6$, R$^6$ and R$^7$, or R$^7$ and R$^8$ can be joined to form a substituted or unsubstituted C$_5$-C$_8$ saturated or unsaturated cyclic or polycyclic ring structure, or a combination thereof.

In some embodiments, R$^3$ is an unsubstituted C$_4$-C$_{20}$ cycloalkyl (e.g., cyclohexane, cyclypentane, cyloocatane, adamantane), or a substituted C$_4$-C$_{20}$ cycloalkyl.

In some embodiments, R$^3$ is a substituted or unsubstituted phenyl, benzyl, carbazolyl, naphthyl, or fluorenyl.

In some embodiments, R$^3$ is a substituted or unsubstituted aryl group represented by the Formula (X):

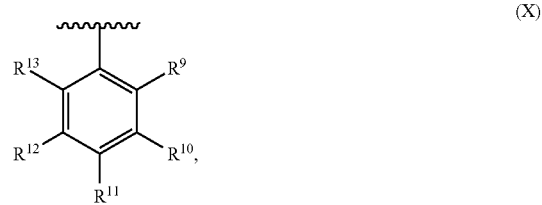

wherein each of R$^9$, R$^{10}$, R$^{11}$, R$^{12}$, and R$^{13}$ is independently hydrogen, an unsubstituted C$_1$-C$_{40}$ hydrocarbyl, a substituted C$_1$-C$_{40}$ hydrocarbyl, a heteroatom, a heteroatom-containing group, or two or more of R$^9$, R$^{10}$, R$^{11}$, R$^{12}$, and R$^{13}$ are joined together to form a C$_4$-C$_{62}$ cyclic or polycyclic ring structure, or a combination thereof.

In some embodiments of the present disclosure, each of R$^9$, R$^{10}$, R$^{11}$, R$^{12}$, and R$^{13}$ is independently hydrogen, a halogen, an unsubstituted C$_1$-C$_{40}$ hydrocarbyl, a substituted C$_1$-C$_{40}$ hydrocarbyl, an unsubstituted C$_4$-C$_{62}$ aryl (such as an unsubstituted C$_4$-C$_{20}$ aryl, such as a phenyl), a substituted C$_4$-C$_{62}$ aryl (such as a substituted C$_4$-C$_{20}$ aryl), an unsubstituted C$_4$-C$_{62}$ heteroaryl (such as an unsubstituted C$_4$-C$_{20}$ heteroaryl), a substituted C$_4$-C$_{62}$ heteroaryl (such as a substituted C$_4$-C$_{20}$ heteroaryl), —NR'$_2$, —SR', —OR, —SiR'$_3$, —OSiR'$_3$, —PR'$_2$, or —R"—SiR'$_3$, where R" is C$_1$-C$_{10}$ alkyl and each R' is hydrogen, halogen, C$_1$-C$_{10}$ alkyl, or C$_6$-C$_{10}$ aryl. For example, each of R$^9$, R$^{10}$, R$^{11}$, R$^{12}$, and R$^{13}$ is independently hydrogen, a substituted C$_1$-C$_{20}$ hydrocarbyl, or an unsubstituted C$_1$-C$_{20}$ hydrocarbyl, such as a substituted C$_1$-C$_{12}$ hydrocarbyl or an unsubstituted C$_1$-C$_{12}$ hydrocarbyl (such as methyl, ethyl, propyl, butyl, pentyl, hexyl, heptyl, octyl, nonyl, decyl, undecyl, or dodecyl), such as a substituted C$_1$-C$_6$ hydrocarbyl, or an unsubstituted C$_1$-C$_6$ hydrocarbyl (such as methyl, ethyl, propyl, butyl, pentyl, or hexyl), or two or more of R$^9$, R$^{10}$, R$^{11}$, R$^{12}$, and R$^{13}$ can be joined to form a substituted or unsubstituted C$_4$-C$_{20}$ saturated or unsaturated cyclic or polycyclic ring structure, or a combination thereof.

In some embodiments of the present disclosure, at least one of R$^9$, R$^{10}$, R$^{11}$, R$^{12}$, and R$^{13}$ is a phenyl.

In some embodiments of the present disclosure, the catalyst compounds are represented by Formula (MCN VII):

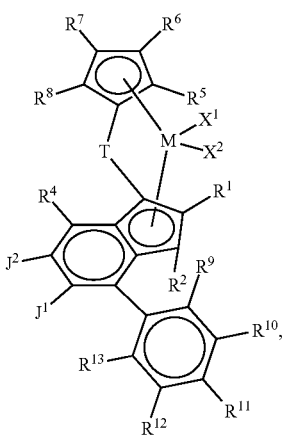

(MCN VII)

wherein M, T, $J^1$, $J^2$, $X^1$, $X^2$, $R^1$, $R^2$, $R^4$, $R^5$, $R^6$, $R^7$, and $R^8$ are as described in Formula (I) and $R^9$, $R^{10}$, $R^{11}$, $R^{12}$, and $R^{13}$ are as described in Formula (X).

In some embodiments of the present disclosure, the catalyst compounds are represented by Formula (MCN VIII):

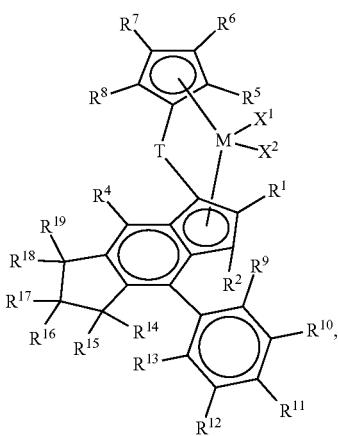

(MCN VIII)

wherein:
each of $R^{14}$, $R^{15}$, $R^{16}$, $R^{17}$, $R^{18}$, and $R^{19}$ is independently hydrogen, an unsubstituted $C_1$-$C_{40}$ hydrocarbyl, a substituted $C_1$-$C_{40}$ hydrocarbyl, a heteroatom, a heteroatom-containing group, or two or more of $R^{14}$, $R^{15}$, $R^{16}$, $R^{17}$, $R^{18}$, and $R^{19}$ are joined together to form a cyclic or polycyclic ring structure, or a combination thereof; and
wherein M, T, $J^1$, $J^2$, $X^1$, $X^2$, $R^1$, $R^2$, $R^4$, $R^5$, $R^6$, $R^7$, and $R^8$ are as described in Formula (I) and $R^9$, $R^{10}$, $R^{11}$, $R^{12}$, and $R^{13}$ are as described in Formula (X).

In some embodiments, each of $R^{14}$, $R^{15}$, $R^{16}$, $R^{17}$, $R^{18}$, and $R^{19}$ is independently hydrogen, a halogen, an unsubstituted $C_1$-$C_{40}$ hydrocarbyl, a substituted $C_1$-$C_{40}$ hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —$NR'_2$, —$SR'$, —$OR$, —$SiR'_3$, —$OSiR'_3$, —$PR'_2$, or —R"—$SiR'_3$, where R" is $C_1$-$C_{10}$ alkyl and each R' is hydrogen, halogen, $C_1$-$C_{10}$ alkyl, or $C_6$-$C_{10}$ aryl. For example, each of $R^{14}$, $R^{15}$, $R^{16}$, $R^{17}$, $R^{18}$, and $R^{19}$ is independently hydrogen, a substituted $C_1$-$C_{20}$ hydrocarbyl, or an unsubstituted $C_1$-$C_{20}$ hydrocarbyl, such as a substituted $C_1$-$C_{12}$ hydrocarbyl or an unsubstituted $C_1$-$C_{12}$ hydrocarbyl (such as methyl, ethyl, propyl, butyl, pentyl, hexyl, heptyl, octyl, nonyl, decyl, undecyl, or dodecyl), such as a substituted $C_1$-$C_6$ hydrocarbyl, or an unsubstituted $C_1$-$C_6$ hydrocarbyl (such as methyl, ethyl, propyl, butyl, pentyl, or hexyl), or two or more of $R^{14}$, $R^{15}$, $R^{16}$, $R^{17}$, $R^{18}$, and $R^{19}$ can be joined to form a substituted or unsubstituted $C_4$-$C_{20}$ saturated or unsaturated cyclic or polycyclic ring structure, or a combination thereof.

Illustrative, but not limiting, examples of bridged metallocenes for use in a catalyst system include:
dimethylsilyl bis(2-methyl-4-phenyl)indenyl zirconium dichloride;
dimethylsilyl bis(2-methyl-4-phenyl)indenyl zirconium dimethyl;
dimethylsilyl bis(2-methyl-4-(4-tertbutylphenyl)indenyl zirconium dichloride;
dimethylsilyl bis(2-methyl-4-(4-tertbutylphenyl)indenyl zirconium dimethyl;
dimethylsilyl bis(2-methyl-4-(4-(1-naphtyl))indenyl zirconium dichloride;
dimethylsilyl bis(2-methyl-4-(4-(1-naphtyl))indenyl zirconium dimethyl;
dimethylsilyl bis(2-methyl-4-(4-(3,5-ditertbutylphenyl)indenyl zirconium dichloride;
dimethylsilyl bis(2-methyl-4-(4-(3,5-ditertbutylphenyl)indenyl zirconium dimethyl;
dimethylsilyl-(4-([1,1'-biphenyl]-2-yl)-2-hexyl-1H-inden-1-yl)(4-(3,5-di-tert-butyl-4-methoxyphenyl)-2-methyl-1H-inden-1-yl) zirconium dichloride;
dimethylsilyl-(4-([1,1'-biphenyl]-2-yl)-2-hexyl-1H-inden-1-yl)(4-(3,5-di-tert-butyl-4-methoxyphenyl)-2-methyl-1H-inden-1-yl) zirconium dimethyl;
dimethylsilyl-(4-(4-(tert-butyl)phenyl)-2-isopropyl-1H-inden-1-yl)(4-(4-(tert-butyl)phenyl)-2-methyl-1,5,6,7-tetrahydro-s-indacen-1-yl) zirconium dichloride;
dimethylsilyl-(4-(4-(tert-butyl)phenyl)-2-isopropyl-1H-inden-1-yl)(4-(4-(tert-butyl)phenyl)-2-methyl-1,5,6,7-tetrahydro-s-indacen-1-yl) zirconium dimethyl;
dimethylsilyl-(4-(4-(tert-butyl)phenyl)-2-isopropyl-1H-inden-1-yl)(4-(4-(tert-butyl)phenyl)-2-methyl-1H-inden-1-yl) zirconium dichloride;
dimethylsilyl-(4-(4-(tert-butyl)phenyl)-2-isopropyl-1H-inden-1-yl)(4-(4-(tert-butyl)phenyl)-2-methyl-1H-inden-1-yl) zirconium dimethyl;
tetramethylcyclopentadienyl dimethylsilyl (2-methyl-4-phenyl)-1,5,6,7-tetrahydro-s-indacen-1-yl) zirconium dichloride;
tetramethylcyclopentadienyl dimethylsilyl (2-methyl-4-phenyl)-1,5,6,7-tetrahydro-s-indacen-1-yl) zirconium dimethyl;
tetramethylcyclopentadienyl dimethylsilyl (2-methyl-4-(4-tertbutylphenyl)-1,5,6,7-tetrahydro-s-indacen-1-yl)zirconium dichloride;
tetramethylcyclopentadienyl dimethylsilyl (2-methyl-4-(4-tertbutylphenyl)-1,5,6,7-tetrahydro-s-indacen-1-yl)zirconium dimethyl;
tetramethylcyclopentadienyl dimethylsilyl (2-methyl-4-(o-tolyl)-1,5,6,7-tetrahydro-s-indacen-1-yl)zirconium dichloride;
tetramethylcyclopentadienyl dimethylsilyl (2-methyl-4-(o-tolyl)-1,5,6,7-tetrahydro-s-indacen-1-yl) zirconium dimethyl;
tetramethylcyclopentadienyl dimethylsilyl (4-([1,1'-biphenyl]-2-yl)-1,5,6,7-tetrahydro-s-indacen-1-yl) zirconium dichloride;

tetramethylcyclopentadienyl dimethylsilyl (4-([1,1'-biphenyl]-2-yl)-1,5,6,7-tetrahydro-s-indacen-1-yl) zirconium dimethyl;
tetramethylcyclopentadienyl dimethylsilyl (4-(2-isopropylphenyl)-2-methyl-1,5,6,7-tetrahydro-s-indacen-1-yl) zirconium dichloride;
tetramethylcyclopentadienyl dimethylsilyl (4-(2-isopropylphenyl)-2-methyl-1,5,6,7-tetrahydro-s-indacen-1-yl) zirconium dimethyl;
tetramethylcyclopentadienyl dimethylsilyl (2-methyl-4-(2,3,4-trimethylphenyl)-1,5,6,7-tetrahydro-s-indacen-1-yl) zirconium dichloride;
tetramethylcyclopentadienyl dimethylsilyl (2-methyl-4-(2,3,4-trimethylphenyl)-1,5,6,7-tetrahydro-s-indacen-1-yl) zirconium dimethyl;
tetramethylcyclopentadienyl dimethylsilyl (4-(3,5-di-tert-butyl-4-methoxyphenyl)-2-methyl-1,5,6,7-tetrahydro-s-indacen-1-yl) zirconium dichloride;
tetramethylcyclopentadienyl dimethylsilyl (4-(3,5-di-tert-butyl-4-methoxyphenyl)-2-methyl-1,5,6,7-tetrahydro-s-indacen-1-yl) zirconium dimethyl;
tetramethylcyclopentadienyl dimethylsilyl (4-(anthracen-9-yl)-2-methyl-1,5,6,7-tetrahydro-s-indacen-1-yl)) zirconium dichloride;
tetramethylcyclopentadienyl dimethylsilyl (4-(anthracen-9-yl)-2-methyl-1,5,6,7-tetrahydro-s-indacen-1-yl)) zirconium dimethyl;
tetramethylcyclopentadienyl dimethylsilyl (2-methyl-4-(3,5-di-trifluoromethylphenyl)-1,5,6,7-tetrahydro-s-indacen-1-yl) zirconium dichloride;
tetramethylcyclopentadienyl dimethylsilyl (2-methyl-4-(3,5-di-trifluoromethylphenyl)-1,5,6,7-tetrahydro-s-indacen-1-yl) zirconium dimethyl;
tetramethylcyclopentadienyl dimethylsilyl (4-(1-naphtyl)-2-methyl-1,5,6,7-tetrahydro-s-indacen-1-yl)) zirconium dichloride; and
tetramethylcyclopentadienyl dimethylsilyl (4-(1-naphtyl)-2-methyl-1,5,6,7-tetrahydro-s-indacen-1-yl)) zirconium dimethyl.

Post-Metallocene Catalyst Compounds

Suitable catalyst components may include post-metallocene complexes that are transition metal complexes that do not feature a cyclopentadienyl anion or substituted cyclopentadienyl anion donors (e.g., cyclopentadienyl, fluorenyl, indenyl, methylcyclopentadienyl). Examples of families of post-metallocene complexes that may be suitable can include bis(phenolate) heterocyclic Lewis base complexes, such as the metal complexes described in WO 2020/167838, WO 2020/167819, US 2020/0254431, US 2020/0255556, US 2020/0255553; US 2020/0255555, WO 2020/167821; and US 2020/0255561, the disclosures of which are incorporated herein by reference.

Bis(phenolate) Heterocyclic Lewis Base Complexes

Catalyst complexes useful in the present invention may include catalyst compounds, and catalyst systems comprising such compounds, represented by the Formula (A):

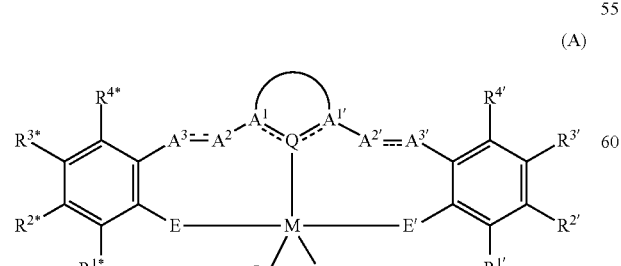

(A)

wherein:

M is a group 3, 4, 5, or 6 transition metal or a Lanthanide (such as Hf, Zr or Ti);

E and E' are each independently O, S, or $NR^9$, where $R^9$ is independently hydrogen, $C_1$-$C_{40}$ hydrocarbyl, $C_1$-$C_{40}$ substituted hydrocarbyl, or a heteroatom-containing group, preferably O, preferably both E and E' are O;

Q is group 14, 15, or 16 atom that forms a dative bond to metal M, preferably Q is C, O, S or N, more preferably Q is C, N or O, most preferably Q is N;

$A^1QA^{1'}$ are part of a heterocyclic Lewis base containing 4 to 40 non-hydrogen atoms that links $A^2$ to $A^{2'}$ via a 3-atom bridge with Q being the central atom of the 3-atom bridge ($A^1QA^{1'}$ combined with the curved line joining $A^1$ and $A^{1'}$ represents the heterocyclic Lewis base), $A^1$ and $A^{1'}$ are independently C, N, or $C(R^{22})$, where $R^{22}$ is selected from hydrogen, $C_1$-$C_{20}$ hydrocarbyl, and $C_1$-$C_{20}$ substituted hydrocarbyl. Preferably $A^1$ and $A^{1'}$ are C;

$A^3\text{=}A^2$ is a divalent group containing 2 to 40 non-hydrogen atoms that links $A^1$ to the E-bonded aryl group via a 2-atom bridge, such as ortho-phenylene, substituted ortho-phenylene, ortho-arene, indolene, substituted indolene, benzothiophene, substituted benzothiophene, pyrrolene, substituted pyrrolene, thiophene, substituted thiophene, 1,2-ethylene ($-CH_2CH_2-$), substituted 1,2-ethylene, 1,2-vinylene ($-HC=CH-$), or substituted 1,2-vinylene, preferably $A^3\text{=}A^2$ is a divalent hydrocarbyl group;

$A^{2'}\text{=}A^{3'}$ is a divalent group containing 2 to 40 non-hydrogen atoms that links $A^{1'}$ to the E'-bonded aryl group via a 2-atom bridge such as ortho-phenylene, substituted ortho-phenylene, ortho-arene, indolene, substituted indolene, benzothiophene, substituted benzothiophene, pyrrolene, substituted pyrrolene, thiophene, substituted thiophene, 1,2-ethylene ($-CH_2CH_2-$), substituted 1,2-ethylene, 1,2-vinylene ($-HC=CH-$), or substituted 1,2-vinylene, preferably $A^{2'}\text{=}A^{3'}$ is a divalent hydrocarbyl group;

each L is independently a Lewis base;

each X is independently an anionic ligand;

n is 1, 2 or 3;

m is 0, 1, or 2;

n+m is not greater than 4;

each of $R^{1*}$, $R^{2*}$, $R^{3*}$, $R^{4*}$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group (preferably $R^{1'}$ and $R^{1*}$ are independently a cyclic group, such as a cyclic tertiary alkyl group), or one or more of $R^{1*}$ and $R^{2*}$, $R^{2*}$ and $R^{3*}$, $R^{3*}$ and $R^{4*}$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;

any two L groups may be joined together to form a bidentate Lewis base;

an X group may be joined to an L group to form a monoanionic bidentate group;

any two X groups may be joined together to form a dianionic ligand group.

This invention is further related to catalyst compounds, and catalyst systems comprising such compounds, represented by the Formula (A-II):

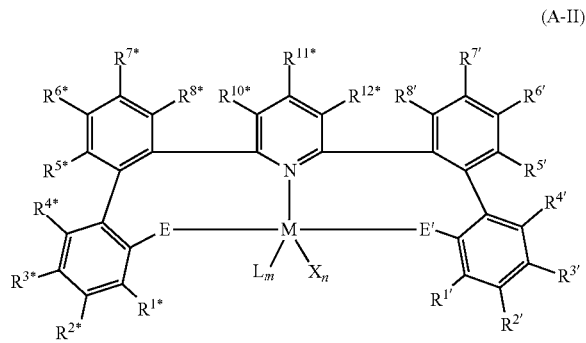

(A-II)

wherein:
- M is a group 3, 4, 5, or 6 transition metal or a Lanthanide (such as Hf, Zr or Ti);
- E and E' are each independently O, S, or $NR^{9*}$, where $R^{9*}$ is independently hydrogen, $C_1$-$C_{40}$ hydrocarbyl, $C_1$-$C_{40}$ substituted hydrocarbyl, or a heteroatom-containing group, preferably O, preferably both E and E' are O;
- each L is independently a Lewis base;
- each X is independently an anionic ligand;
- n is 1, 2 or 3;
- m is 0, 1, or 2;
- n+m is not greater than 4;
- each of $R^{1*}$, $R^{2*}$, $R^{3*}$, $R^{4*}$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^{1*}$ and $R^{2*}$, $R^{2*}$ and $R^{3*}$, $R^{3*}$ and $R^{4*}$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;
- any two L groups may be joined together to form a bidentate Lewis base;
- an X group may be joined to an L group to form a monoanionic bidentate group;
- any two X groups may be joined together to form a dianionic ligand group;
- each of $R^{5*}$, $R^{6*}$, $R^{7*}$, $R^{8*}$, $R^{5'}$, $R^{6'}$, $R^{7'}$, $R^{8'}$, $R^{10*}$, $R^{11*}$, and $R^{12*}$ is independently hydrogen, $C_1$-$C_{40}$ hydrocarbyl, $C_1$-$C_{40}$ substituted hydrocarbyl, a heteroatom or a heteroatom-containing group, or one or more of $R^{5*}$ and $R^{6*}$, $R^{6*}$ and $R^{7*}$, $R^{7*}$ and $R^{8*}$, $R^{5'}$ and $R^{6'}$, $R^{6'}$ and $R^{7'}$, $R^{7'}$ and $R^{8'}$, $R^{10*}$ and $R^{11*}$, or $R^{11*}$ and $R^{12*}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings.

The metal, M, is preferably selected from group 3, 4, 5, or 6 elements, more preferably group 4. Most preferably the metal, M, is zirconium or hafnium.

The donor atom Q of the neutral heterocyclic Lewis base (in Formula (A)) is preferably nitrogen, carbon, or oxygen. Preferred Q is nitrogen.

Non-limiting examples of neutral heterocyclic Lewis base groups include derivatives of pyridine, pyrazine, pyrimidine, triazine, thiazole, imidazole, thiophene, oxazole, thiazole, furan, and substituted variants of thereof. Preferred heterocyclic Lewis base groups include derivatives of pyridine, pyrazine, thiazole, and imidazole.

Each $A^1$ and $A^{1'}$ of the heterocyclic Lewis base (in Formula (I)) are independently C, N, or $C(R^{22})$, where $R^{22}$ is selected from hydrogen, $C_1$-$C_{20}$ hydrocarbyl, and $C_1$-$C_{20}$ substituted hydrocarbyl. Preferably $A^1$ and $A^{1'}$ are carbon. When Q is carbon, it is preferred that $A^1$ and $A^{1'}$ be selected from nitrogen and $C(R^{22})$. When Q is nitrogen, it is preferred that $A^1$ and $A^{1'}$ be carbon. It is preferred that Q=nitrogen, and $A^1$=$A^{1'}$=carbon. When Q is nitrogen or oxygen, is preferred that the heterocyclic Lewis base in Formula (A) not have any hydrogen atoms bound to the $A^1$ or $A^{1'}$ atoms. This is preferred because it is thought that hydrogens in those positions may undergo unwanted decomposition reactions that reduce the stability of the catalytically active species.

The heterocyclic Lewis base (of Formula (A)) represented by $A^1QA^{1'}$ combined with the curved line joining $A^1$ and $A^{1'}$ is preferably selected from the following, with each $R^{23}$ group selected from hydrogen, heteroatoms, $C_1$-$C_{20}$ alkyls, $C_1$-$C_{20}$ alkoxides, $C_1$-$C_{20}$ amides, and $C_1$-$C_{20}$ substituted alkyls.

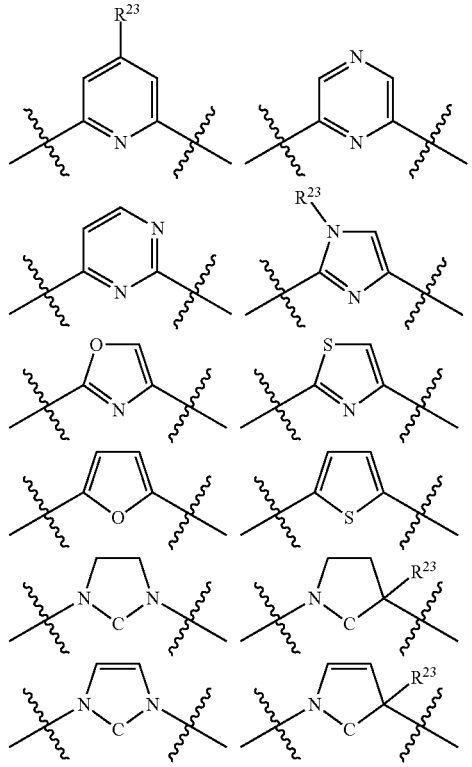

In Formula (A) or (A-II), E and E' are each selected from oxygen or $NR^{9*}$, where $R^{9*}$ is independently hydrogen, $C_1$-$C_{40}$ hydrocarbyl, $C_1$-$C_{40}$ substituted hydrocarbyl, or a heteroatom-containing group. It is preferred that E and E' are oxygen. When E and/or E' are $NR^{9*}$ it is preferred that $R^{9*}$ be selected from $C_1$ to $C_{20}$ hydrocarbyls, alkyls, or aryls. In one embodiment E and E' are each selected from O, S, or N(alkyl) or N(aryl), where the alkyl is preferably a $C_1$ to $C_{20}$ alkyl, such as methyl, ethyl, propyl, butyl, pentyl, hexyl, octyl, nonyl, decyl, undecyl, dodeceyl and the like, and aryl is a $C_6$ to $C_{40}$ aryl group, such as phenyl, naphthalenyl, benzyl, methylphenyl, and the like.

In embodiments, $A^3 ==== A^2$ and $A^{2'} === A^{3'}$ are independently a divalent hydrocarbyl group, such as $C_1$ to $C_{12}$ hydrocarbyl group.

In complexes of Formula (A) or (A-II), when E and E' are oxygen it is advantageous that each phenolate group be substituted in the position that is next to the oxygen atom (i.e. $R^{1*}$ and $R^{1'}$ in Formula (A) and (A-II)). Thus, when E and E' are oxygen it is preferred that each of $R^{1*}$ and $R^{1'}$ is independently a $C_1$-$C_{40}$ hydrocarbyl, a $C_1$-$C_{40}$ substituted hydrocarbyl, a heteroatom or a heteroatom-containing group, more preferably, each of $R^{1*}$ and $R^{1'}$ is independently a non-aromatic cyclic alkyl group with one or more five- or six-membered rings (such as cyclohexyl, cyclooctyl, adamantanyl, or 1-methylcyclohexyl, or substituted adamantanyl), most preferably a non-aromatic cyclic tertiary alkyl group (such as 1-methylcyclohexyl, adamantanyl, or substituted adamantanyl).

In some embodiments of the invention of Formula (A) or (A-II), each of $R^{1*}$ and $R^{1'}$ is independently a tertiary hydrocarbyl group. In other embodiments of the invention of Formula (A) or (A-II), each of $R^{1*}$ and $R^{1'}$ is independently a cyclic tertiary hydrocarbyl group. In other embodiments of the invention of Formula (A) or (A-II), each of $R^{1*}$ and $R^{1'}$ is independently a polycyclic tertiary hydrocarbyl group.

In some embodiments of the invention of Formula (A) or (A-II), each of $R^{1*}$ and $R^{1'}$ is independently a tertiary hydrocarbyl group. In other embodiments of the invention of Formula (A) or (A-II), each of $R^{1*}$ and $R^{1'}$ is independently a cyclic tertiary hydrocarbyl group. In other embodiments of the invention of Formula (A) or (A-II), each of $R^{1*}$ and $R^{1'}$ is independently a polycyclic tertiary hydrocarbyl group.

The linker groups (i.e. $A^3 ==== A^2$ and $A^{2'} === A^{3'}$ in Formula (A)) are each preferably part of an ortho-phenylene group, preferably a substituted ortho-phenylene group. It is preferred for the $R^{7*}$ and $R^{7'}$ positions of Formula (A-II) to be hydrogen, or $C_1$ to $C_{20}$ alkyl, such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, or an isomer thereof, such as iospropyl, etc. For applications targeting polymers with high tacticity it is preferred for the $R^{7*}$ and $R^{7'}$ positions of Formula (A-II) to be a $C_1$ to $C_{20}$ alkyl, most preferred for both $R^{7*}$ and $R^{7'}$ to be a $C_1$ to $C_3$ alkyl.

In embodiments of Formula (A) herein, Q is C, N or O, preferably Q is N.

In embodiments of Formula (A) herein, $A^1$ and $A^{1'}$ are independently carbon, nitrogen, or $C(R^{22})$, with $R^{22}$ selected from hydrogen, $C_1$-$C_{20}$ hydrocarbyl, $C_1$-$C_{20}$ substituted hydrocarbyl. Preferably $A^1$ and $A^{1'}$ are carbon.

In embodiments of Formula (A) herein, $A^1QA^{1'}$ in Formula (I) is part of a heterocyclic Lewis base, such as a pyridine, pyrazine, pyrimidine, triazine, thiazole, imidazole, thiophene, oxazole, thiazole, furan, or a substituted variant of thereof.

In embodiments of Formula (A) herein, $A^1QA^{1'}$ are part of a heterocyclic Lewis base containing 2 to 20 non-hydrogen atoms that links $A^2$ to $A^{2'}$ via a 3-atom bridge with Q being the central atom of the 3-atom bridge. Preferably each $A^1$ and $A^{1'}$ is a carbon atom and the $A^1QA^{1'}$ fragment forms part of a pyridine, pyrazine, pyrimidine, triazine, thiazole, imidazole, thiophene, oxazole, thiazole, furan, or a substituted variant of thereof group, or a substituted variant thereof.

In one embodiment of Formula (A) herein, Q is carbon, and each $A^1$ and $A^{1'}$ is N or $C(R^{22})$, where $R^{22}$ is selected from hydrogen, $C_1$-$C_{20}$ hydrocarbyl, $C_1$-$C_{20}$ substituted hydrocarbyl, a heteroatom or a heteroatom-containing group. In this embodiment, the $A^1QA^{1'}$ fragment forms part of a cyclic carbene, N-heterocyclic carbene, cyclic amino alkyl carbene, or a substituted variant of thereof group, or a substituted variant thereof.

In embodiments of Formula (A) herein, $A^3 ==== A^2$ is a divalent group containing 2 to 20 non-hydrogen atoms that links $A^1$ to the E-bonded aryl group via a 2-atom bridge, where the $A^3 ==== A^2$ is a linear alkyl or forms part of a cyclic group (such as an optionally substituted ortho-phenylene group, or ortho-arylene group) or a substituted variant thereof.

$A^{2'} === A^{3'}$ is a divalent group containing 2 to 20 non-hydrogen atoms that links $A^{1'}$ to the E'-bonded aryl group via a 2-atom bridge, where the $A^{2'} === A^{3'}$ is a linear alkyl or forms part of a cyclic group (such as an optionally substituted ortho-phenylene group, or ortho-arylene group or, or a substituted variant thereof.

In embodiments of the invention herein, in Formula (A) or (A-II), M is a group 4 metal, such as Hf or Zr.

In embodiments of the invention herein, in Formula (A) or (A-II), E and E' are O.

In embodiments of the invention herein, in Formula (A) or (A-II), $R^{1*}$, $R^{2*}$, $R^{3*}$, $R^{4*}$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^{1*}$ and $R^{2*}$, $R^{2*}$ and $R^{3*}$, $R^{3*}$ and $R^{4*}$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings, preferably hydrogen, methyl, ethyl, propyl, butyl, pentyl, hexyl, or an isomer thereof.

In embodiments of the invention herein, in Formula (A) or (A-II), $R^{1*}$, $R^{2*}$, $R^{3*}$, $R^{4*}$, $R^{1'}$, $R^{2'}$, $R^{3'}$, $R^{4'}$, and $R^{9*}$ are independently selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, phenyl, substituted phenyl (such as methylphenyl and dimethylphenyl), benzyl, substituted benzyl (such as methylbenzyl), naphthalenyl, cyclohexyl, cyclohexenyl, methylcyclohexyl, and isomers thereof.

In embodiments of the invention herein, in Formula (A) or (A-II), $R^{4*}$ and $R^{4'}$ is independently hydrogen or a $C_1$ to $C_3$ hydrocarbyl, such as methyl, ethyl or propyl.

In embodiments of the invention herein, in Formula (A) or (A-II), $R^{9*}$ is hydrogen, $C_1$-$C_{40}$ hydrocarbyl, $C_1$-$C_{40}$ substituted hydrocarbyl, or a heteroatom-containing group, preferably hydrogen, methyl, ethyl, propyl, butyl, pentyl, hexyl, or an isomer thereof. Preferably $R^{9*}$ is methyl, ethyl, propyl, butyl, $C_1$ to $C_6$ alkyl, phenyl, 2-methylphenyl, 2,6-dimethylphenyl, or 2,4,6-trimethylphenyl.

In embodiments of the invention herein, in Formula (A) or (A-II), each X is, independently, selected from the group consisting of hydrocarbyl radicals having from 1 to 20 carbon atoms (such as alkyls or aryls), hydrides, amides, alkoxides, sulfides, phosphides, halides, alkyl sulfonates, and a combination thereof, (two or more X's may form a part of a fused ring or a ring system), preferably each X is independently selected from halides, aryls, and $C_1$ to $C_5$ alkyl groups, preferably each X is independently a hydrido, dimethylamido, diethylamido, methyltrimethylsilyl, neopentyl, phenyl, benzyl, methyl, ethyl, propyl, butyl, pentyl, fluoro, iodo, bromo, or chloro group.

Alternatively, each X may be, independently, a halide, a hydride, an alkyl group, an alkenyl group or an arylalkyl group.

In embodiments of the invention herein, in Formula (A) or (A-II), each L is a Lewis base, independently, selected from the group consisting of ethers, thioethers, amines, nitriles, imines, pyridines, halocarbons, and phosphines, preferably ethers and thioethers, and a combination thereof, optionally two or more L's may form a part of a fused ring or a ring system, preferably each L is independently selected from ether and thioether groups, preferably each L is a ethyl ether, tetrahydrofuran, dibutyl ether, or dimethylsulfide group.

In embodiments of the invention herein, in Formula (A) or (A-II), $R^{1*}$ and $R^{1'}$ are independently cyclic tertiary alkyl groups.

In embodiments of the invention herein, in Formula (A) or (A-II), n is 1, 2 or 3, typically 2. In embodiments of the invention herein, in Formula (A) or (A-II), m is 0, 1 or 2, typically 0.

In embodiments of the invention herein, in Formula (A) or (A-II), $R^{1*}$ and $R^{1'}$ are not hydrogen.

In embodiments of the invention herein, in Formula (A) or (A-II), M is Hf or Zr, E and E' are O; each of $R^{1*}$ and $R^{1'}$ is independently a $C_1$-$C_{40}$ hydrocarbyl, a $C_1$-$C_{40}$ substituted hydrocarbyl, a heteroatom or a heteroatom-containing group, each $R^{2*}$, $R^{3*}$, $R^{4*}$, $R^{2'}$, $R^{3'}$, and $R^{4'}$ is independently hydrogen, $C_1$-$C_{20}$ hydrocarbyl, $C_1$-$C_{20}$ substituted hydrocarbyl, a heteroatom or a heteroatom-containing group, or one or more of $R^{1*}$ and $R^{2*}$, $R^{2*}$ and $R^{3*}$, $R^{3*}$ and $R^{4*}$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings; each X is, independently, selected from the group consisting of hydrocarbyl radicals having from 1 to 20 carbon atoms (such as alkyls or aryls), hydrides, amides, alkoxides, sulfides, phosphides, halides, and a combination thereof, (two or more X's may form a part of a fused ring or a ring system); each L is, independently, selected from the group consisting of ethers, thioethers, and halo carbons (two or more L's may form a part of a fused ring or a ring system).

In embodiments of the invention herein, in Formula (A-II), each of $R^{5*}$, $R^{6*}$, $R^{7*}$, $R^{8*}$, $R^{5'}$, $R^{6'}$, $R^{7'}$, $R^{8'}$, $R^{10*}$, $R^{11*}$ and $R^{12*}$ is independently hydrogen, $C_1$-$C_{40}$ hydrocarbyl, $C_1$-$C_{40}$ substituted hydrocarbyl, a heteroatom or a heteroatom-containing group, or one or more adjacent R groups may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings.

In embodiments of the invention herein, in Formula (A-II), each of $R^{5*}$, $R^{6*}$, $R^{7*}$, $R^{8*}$, $R^{5'}$, $R^{6'}$, $R^{7'}$, $R^{8'}$, $R^{10*}$, $R^{11*}$ and $R^{12*}$ is independently hydrogen, methyl, ethyl, propyl, butyl, pentyl, hexyl, or an isomer thereof.

In embodiments of the invention herein, in Formula (A-II), each of $R^{5*}$, $R^{6*}$, $R^{7*}$, $R^{8*}$, $R^{5'}$, $R^{6'}$, $R^{7'}$, $R^{8'}$, $R^{10*}$, $R^{11*}$ and $R^{12*}$ is are independently selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, phenyl, substituted phenyl (such as methylphenyl and dimethylphenyl), benzyl, substituted benzyl (such as methylbenzyl), naphthalenyl, cyclohexyl, cyclohexenyl, methylcyclohexyl, and isomers thereof.

In embodiments of the invention herein, in Formula (A-II), M is Hf or Zr, E and E' are O; each of $R^{1*}$ and $R^{1'}$ is independently a $C_1$-$C_{40}$ hydrocarbyl, a $C_1$-$C_{40}$ substituted hydrocarbyl, a heteroatom or a heteroatom-containing group, each $R^{1*}$, $R^{2*}$, $R^{3*}$, $R^{4*}$, $R^{1'}$, $R^{2'}$, $R^{3'}$, and $R^{4'}$ is independently hydrogen, $C_1$-$C_{20}$ hydrocarbyl, $C_1$-$C_{20}$ substituted hydrocarbyl, a heteroatom or a heteroatom-containing group, or one or more of $R^{1*}$ and $R^{2*}$, $R^{2*}$ and $R^{3*}$, $R^{3*}$ and $R^{4*}$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings; $R^{9*}$ is hydrogen, $C_1$-$C_{20}$ hydrocarbyl, $C_1$-$C_{20}$ substituted hydrocarbyl, or a heteroatom-containing group, such as hydrogen, methyl, ethyl, propyl, butyl, pentyl, hexyl, or an isomer thereof;

each X is, independently, selected from the group consisting of hydrocarbyl radicals having from 1 to 20 carbon atoms (such as alkyls or aryls), hydrides, amides, alkoxides, sulfides, phosphides, halides, dienes, amines, phosphines, ethers, and a combination thereof, (two or more X's may form a part of a fused ring or a ring system); n is 2; m is 0; and each of $R^{5*}$, $R^{6*}$, $R^{7*}$, $R^{8*}$, $R^{5'}$, $R^{6'}$, $R^{7'}$, $R^{8'}$, $R^{10*}$, $R^{11*}$ and $R^{12*}$ is independently hydrogen, $C_1$-$C_{20}$ hydrocarbyl, $C_1$-$C_{20}$ substituted hydrocarbyl, a heteroatom or a heteroatom-containing group, or one or more adjacent R groups may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings, such as each of $R^{5*}$, $R^{6*}$, $R^{7*}$, $R^{8*}$, $R^{5'}$, $R^{6'}$, $R^{7'}$, $R^{8'}$, $R^{10*}$, $R^{11*}$ and $R^{12*}$ is are independently selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, phenyl, substituted phenyl (such as methylphenyl and dimethylphenyl), benzyl, substituted benzyl (such as methylbenzyl), naphthyl, cyclohexyl, cyclohexenyl, methylcyclohexyl, and isomers thereof.

Preferred embodiment of Formula (A) is M is Zr or Hf, Q is nitrogen, both $A^1$ and $A^{1'}$ are carbon, both E and E' are oxygen, and both $R^{1*}$ and $R^{1'}$ are $C_4$-$C_{20}$ cyclic tertiary alkyls.

Preferred embodiment of Formula (A) is M is Zr or Hf, Q is nitrogen, both $A^1$ and $A^{1'}$ are carbon, both E and E' are oxygen, and both $R^{1*}$ and $R^{1'}$ are adamantan-1-yl or substituted adamantan-1-yl.

Preferred embodiment of Formula (A) is M is Zr or Hf, Q is nitrogen, both $A^1$ and $A^{1'}$ are carbon, both E and E' are oxygen, and both $R^{1*}$ and $R^{1'}$ are $C_6$-$C_{20}$ aryls.

Preferred embodiment of Formula (A-II) is M is Zr or Hf, both E and E' are oxygen, and both $R^{1*}$ and $R^{1'}$ are $C_4$-$C_{20}$ cyclic tertiary alkyls.

Preferred embodiment of Formula (A-II) is M is Zr or Hf, both E and E' are oxygen, and both $R^{1*}$ and $R^{1'}$ are adamantan-1-yl or substituted adamantan-1-yl.

Preferred embodiment of Formula (A-II) is M is Zr or Hf, both E and E' are oxygen, and each of $R^{1*}$, $R^{1'}$, $R^{3*}$ and $R^{3'}$ are adamantan-1-yl or substituted adamantan-1-yl.

Preferred embodiment of Formula (A-II) is M is Zr or Hf, both E and E' are oxygen, both $R^{1*}$ and $R^{1'}$ are $C_4$-$C_{20}$ cyclic tertiary alkyls, and both $R^{7*}$ and $R^{7'}$ are $C_1$-$C_{20}$ alkyls.

Catalyst compounds that are particularly useful in this invention include one or more of: dimethylzirconium[2',2'''-(pyridine-2,6-diyl)bis(3-adamantan-1-yl)-5-(tert-butyl)-[1,1'-biphenyl]-2-olate)], dimethylhafnium[2',2'''-(pyridine-2,6-diyl)bis(3-adamantan-1-yl)-5-(tert-butyl)-[1,1'-biphenyl]-2-olate)], dimethylzirconium[6,6'-(pyridine-2,6-diylbis(benzo[b]thiophene-3,2-diyl))bis(2-adamantan-1-yl)-4-methylphenolate)], dimethylhafnium[6,6'-(pyridine-2,6-diylbis(benzo[b]thiophene-3,2-diyl))bis(2-adamantan-1-yl)-4-methylphenolate)], dimethylzirconium[2',2'''-(pyridine-2,6-diyl)bis(3-((3r,5r,7r)-adamantan-1-yl)-5-methyl-[1,1'-biphenyl]-2-olate)], dimethylhafnium[2',2'''-(pyridine-2,6-diyl)bis(3-((3r,5r,7r)-adamantan-1-yl)-5-methyl-[1,1'-biphenyl]-2-olate)], dimethylzirconium[2',2'''-(pyridine-2,6-diyl)bis(3-((3r,5r,7r)-adamantan-1-yl)-4',5-dimethyl-[1,1'-biphenyl]-2-olate)], dimethylhafnium[2',2'''-(pyridine-2,6-diyl)bis(3-((3r,5r,7r)-adamantan-1-yl)-4',5-dimethyl-[1,1'-biphenyl]-2-olate)].

Catalyst compounds that are particularly useful in this invention include those shown in FIG. 5.

In an embodiment of any of the processes described herein one catalyst compound is used, e.g. the catalyst compounds are not different. For purposes of this invention one catalyst compound is considered different from another if they differ by at least one atom. For example "bisindenyl zirconium dichloride" is different from (indenyl)(2-methylindenyl) zirconium dichloride" which is different from "(indenyl)(2-methylindenyl) hafnium dichloride." Catalyst compounds that differ only by isomer are considered the same for purposes if this invention, e.g., rac-dimethylsilylbis(2-methyl 4-phenyl)hafnium dimethyl is considered to be the same as meso-dimethylsilylbis(2-methyl 4-phenyl)hafnium dimethyl.

In some embodiments, two or more different catalyst compounds are present in the catalyst system used herein. In some embodiments, two or more different catalyst compounds are present in the reaction zone where the process(es) described herein occur. When two transition metal compound based catalysts are used in one reactor as a mixed catalyst system, the two transition metal compounds are preferably chosen such that the two are compatible. A simple screening method such as by $^1H$ or $^{13}C$ NMR, known to those of ordinary skill in the art, can be used to determine which transition metal compounds are compatible. It is preferable to use the same activator for the transition metal compounds, however, two different activators can be used in combination.

In some embodiments, a co-activator is combined with the catalyst compound (such as halogenated catalyst compounds described above) to form an alkylated catalyst compound. Organoaluminum compounds which may be utilized as co-activators include, for example, trialkyl aluminum compounds, such as trimethylaluminum, triethylaluminum, triisobutylaluminum, tri-n-hexylaluminum, tri-n-octylaluminum, and the like, or alumoxanes.

If one or more transition metal compounds contain an anionic ligand as a leaving group which is not a hydride, hydrocarbyl, or substituted hydrocarbyl, then alumoxane, alkyl aluminum, or co-activator is typically contacted with the transition metal compounds prior to addition of a non-coordinating anion activator.

In embodiments herein, two transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Activators

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Activators typically include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

Alumoxane Activators

Alumoxane activators are utilized as activators in the catalyst systems described herein. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator typically at up to a 5,000-fold molar excess Al/M over the catalyst compound (per metal catalytic site). The minimum activator-to-catalyst-compound is a 1:1 molar ratio. Alternate ranges include from 1:1 to 500:1, alternately from 1:1 to 200:1, alternately from 1:1 to 100:1, or alternately from 1:1 to 50:1.

Non Coordinating Anion Activators

Non-coordinating anion activators may also be used herein. The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with the present disclosure are those that are compatible, stabilize the transition metal cation in the sense of balancing its ionic charge at +1, and yet retain sufficient lability to permit displacement during polymerization.

The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, phosphorus, and silicon.

It is within the scope of this invention to use an ionizing activator, neutral or ionic. It is also within the scope of this invention to use neutral or ionic activators alone or in combination with alumoxane or modified alumoxane activators.

The catalyst systems of the present disclosure can include at least one non-coordinating anion (NCA) activator. Specifically, the catalyst systems may include an NCAs which either do not coordinate to a cation or which only weakly coordinate to a cation thereby remaining sufficiently labile to be displaced during polymerization.

The terms "cocatalyst" and "activator" are used herein interchangeably and are defined to be any compound which can activate any one of the catalyst compounds described above by converting the neutral catalyst compound to a catalytically active catalyst compound cation.

In at least one embodiment, boron containing NCA activators represented by the formula below can be used:

$$Z_d^+(A^{d-})$$

where: Z is (L-H) or a reducible Lewis acid; L is a neutral Lewis base; H is hydrogen; (L-H) is a Bronsted acid; $A^{d-}$ is a boron containing non-coordinating anion having the charge d-; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $Z_d^+$ may also be a moiety such as silver, tropylium, carboniums, ferroceniums and mixtures, such as carboniums and ferroceniums. Such as $Z_d^+$ is triphenyl carbonium. Reducible Lewis acids can be any triaryl carbonium (where the aryl can be substituted or unsubstituted, such as those represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl), such as the reducible Lewis acids in formula (14) above as "Z" include those represented by the formula: $(Ph_3C)$, where Ph is a substituted or unsubstituted phenyl, such as substituted with $C_1$ to $C_{40}$ hydrocarbyls or substituted a $C_1$ to $C_{40}$ hydrocarbyls, such as $C_1$ to $C_{20}$ alkyls or aromatics or substituted $C_1$ to $C_{20}$ alkyls or aromatics, such as Z is a triphenylcarbonium.

When $Z_d^+$ is the activating cation $(L-H)_d^+$, it is preferably a Bronsted acid, capable of donating a proton to the transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers, tetrahydrothiophene, and mixtures thereof.

Alternately $(Z)_d^+$ is represented by the formula:

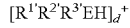

wherein: E is nitrogen or phosphorous; d is 1, 2 or 3; $R^{1'}$, $R^{2'}$, and $R^{3'}$ are independently hydrogen or a $C_1$ to $C_{50}$ hydrocarbyl group optionally substituted with one or more alkoxy groups, silyl groups, a halogen atoms, or halogen containing groups, wherein $R^{1'}$, $R^{2'}$, and $R^{3'}$ together comprise 15 or more carbon atoms.

Alternately E is nitrogen; $R^{1'}$ is hydrogen, and $R^{2'}$, and $R^{3'}$ are independently a $C_6$-$C_{40}$ hydrocarbyl group optionally substituted with one or more alkoxy groups, silyl groups, a halogen atoms, or halogen containing groups, wherein $R^{2'}$, and $R^{3'}$ together comprise 14 or more carbon atoms.

Alternately E is nitrogen; $R^{1'}$ is hydrogen, and $R^{2'}$ is a $C_6$-$C_{40}$ hydrocarbyl group optionally substituted with one or more alkoxy groups, silyl groups, a halogen atoms, or halogen containing groups, and $R^{3'}$ is a substituted phenyl group, wherein $R^{2'}$, and $R^{3'}$ together comprise 14 or more carbon atoms.

Alternately, $(Z)_d^+$ is represented by the formula:

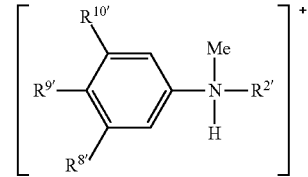

wherein: N is nitrogen, H is hydrogen, Me is methyl, $R^{2'}$ is a $C_6$-$C_{40}$ hydrocarbyl group optionally substituted with one or more alkoxy groups, silyl groups, a halogen atoms, or halogen containing groups; $R^{8'}$, $R^{9'}$, and $R^{10'}$ are independently a $C_4$-$C_{30}$ hydrocarbyl or substituted $C_4$-$C_{30}$ hydrocarbyl group.

Optionally, $R^{8'}$ and $R^{10'}$ are hydrogen atoms and $R^{9'}$ is a $C_4$-$C_{30}$ hydrocarbyl group which is optionally substituted with one or more alkoxy groups, silyl groups, a halogen atoms, or halogen containing groups.

Optionally, $R^{9'}$ is a $C_8$-$C_{22}$ hydrocarbyl group which is optionally substituted with one or more alkoxy groups, silyl groups, a halogen atoms, or halogen containing groups.

Optionally, $R^{2'}$ and $R^{3'}$ are independently a $C_{12}$-$C_{22}$ hydrocarbyl group.

Optionally, $R^{1'}$, $R^{2'}$ and $R^{3'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, $R^{2'}$ and $R^{3'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, $R^{8'}$, $R^{9'}$, and $R^{10'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

The anion component $A^{d-}$ includes those having the formula $[M^{k+}Q_n]^{d-}$ wherein k is 1, 2, or 3; n is 1, 2, 3, 4, 5, or 6 (such as 1, 2, 3, or 4); n-k=d; M is an element selected from Group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, such as each Q is a fluorinated aryl group, and such as each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting, examples of boron compounds which may be used as an activating cocatalyst are the compounds described as (and particularly those specifically listed as) activators in U.S. Pat. No. 8,658,556, which is incorporated by reference herein.

For example, the ionic stoichiometric activator $Z_d^+$ ($A^{d-}$) is one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

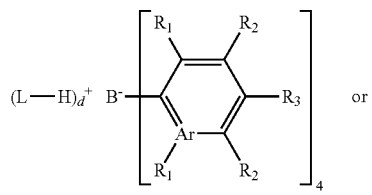 or

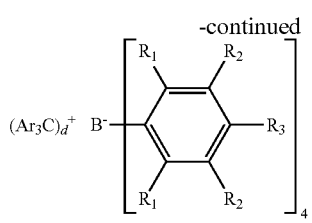

where: each $R_1$ is, independently, a halide, such as a fluoride; Ar is substituted or unsubstituted aryl group (such as a substituted or unsubstituted phenyl), such as substituted with $C_1$ to $C_{40}$ hydrocarbyls, such as $C_1$ to $C_{20}$ alkyls or aromatics; each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (such as $R_2$ is a fluoride or a perfluorinated phenyl group); each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (such as $R_3$ is a fluoride or a $C_6$ perfluorinated aromatic hydrocarbyl group); wherein $R_2$ and $R_3$ can form one or more saturated or unsaturated, substituted or unsubstituted rings (such as $R_2$ and $R_3$ form a perfluorinated phenyl ring); and L is an neutral Lewis base; (L-H)$^+$ is a Bronsted acid; d is 1, 2, or 3; wherein the anion has a molecular weight of greater than 1020 g/mol; wherein at least three of the substituents on the B atom each have a molecular volume of greater than 250 cubic Å, alternately greater than 300 cubic Å, or alternately greater than 500 cubic Å.

For example, ($Ar_3C)_d^+$ is ($Ph_3C)_d^+$, where Ph is a substituted or unsubstituted phenyl, such as substituted with $C_1$ to $C_{40}$ hydrocarbyls or substituted $C_1$ to $C_{40}$ hydrocarbyls, such as $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," *Journal of Chemical Education*, v. 71(11), November 1994, pp. 962-964. Molecular volume (MV), in units of cubic Å, is calculated using the formula: MV=8.3$V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
| --- | --- |
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

For a list of particularly useful Bulky activators please see U.S. Pat. No. 8,658,556, which is incorporated by reference herein.

In another embodiment, one or more of the NCA activators is chosen from the activators described in U.S. Pat. No. 6,211,105.

Activators can include N,N-dimethylanilinium tetrakis (pentafluorophenyl)borate, N,N-dimethylanilinium tetrakis (perfluoronaphthyeborate, N,N-dimethylanilinium tetrakis (perfluorobiphenyl)borate, N,N-dimethylanilinium tetrakis (perfluorophenyl)borate, N,N-dimethylanilinium tetrakis(3,5-bis(trifluoromethyl)phenyl)borate, triphenylcarbenium tetrakis (perfluoronaphthyl)borate, triphenylcarbenium tetrakis (perfluorobiphenyl)borate, triphenylcarbenium tetrakis (3,5-bis (trifluoromethyl)phenyl)borate, triphenylcarbenium tetrakis(perfluorophenyl)borate, $[Ph_3C^+][B(C_6F_5)_4^-]$, $[Me_3NH^+][B(C_6F_5)_4^-]$; 1-(4-(tris(pentafluorophenyl)borate)-2,3,5,6-tetrafluorophenyl)pyrrolidinium; and 4-(tris (pentafluorophenyl)borate)-2,3,5,6-tetrafluoropyridine.

In at least one embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl)ammonium tetrakis(pentafluorophenyl)borate, (where alkyl is methyl, ethyl, propyl, n-butyl, sec-butyl, or t-butyl).

The activators may be added to a polymerization in the form of an ion pair using, for example, [M2HTH]+[NCA]− in which the di(hydrogenated tallow)methylamine ("M2HTH") cation reacts with a basic leaving group on the transition metal complex to form a transition metal complex cation and [NCA]−. Alternatively, the transition metal complex may be reacted with a neutral NCA precursor, such as $B(C_6F_5)_3$, which abstracts an anionic group from the complex to form an activated species.

Activator compounds that useful in this invention include one or more of:
di(hydrogenated tallow)methylammonium[tetrakis(pentafluorophenyl)borate],
di(octadecyl)tolylammonium [tetrakis(pentafluorophenyl) borate],
N,N-dimethylanilinium [tetrakis(heptafluoronaphthalen-2-yl)borate],
N,N-dimethylanilinium [tetrakis(pentafluorophenyl)borate],
N,N-di(hydrogenated tallow)methylammonium [tetrakis (perfluorophenyl) borate],
N-methyl-4-nonadecyl-N-octadecylanilinium [tetrakis(perfluorophenyl)borate],
N-methyl-4-hexadecyl-N-octadecylanilinium [tetrakis(perfluorophenyl)borate],
N-methyl-4-tetradecyl-N-octadecylanilinium [tetrakis(perfluorophenyl)borate],
N-methyl-4-dodecyl-N-octadecylanilinium [tetrakis(perfluorophenyl)borate],
N-methyl-4-decyl-N-octadecylanilinium [tetrakis(perfluorophenyl)borate],
N-methyl-4-octyl-N-octadecylanilinium [tetrakis(perfluorophenyl)borate],
N-methyl-4-hexyl-N-octadecylanilinium [tetrakis(perfluorophenyl)borate],
N-methyl-4-butyl-N-octadecylanilinium [tetrakis(perfluorophenyl)borate],
N-methyl-4-octadecyl-N-decylanilinium [tetrakis(perfluorophenyl)borate],
N-methyl-4-nonadecyl-N-dodecylanilinium [tetrakis(perfluorophenyl)borate],
N-methyl-4-nonadecyl-N-tetradecylanilinium [tetrakis(perfluorophenyl)borate],
N-methyl-4-nonadecyl-N-hexadecylanilinium [tetrakis(perfluorophenyl)borate],
N-ethyl-4-nonadecyl-N-octadecylanilinium [tetrakis(perfluorophenyl)borate],
N-methyl-N,N-dioctadecylammonium [tetrakis(perfluorophenyl)borate],
N-methyl-N,N-dihexadecylammonium [tetrakis(perfluorophenyl)borate],
N-methyl-N,N-ditetradecylammonium [tetrakis(perfluorophenyl)borate],
N-methyl-N,N-didodecylammonium [tetrakis(perfluorophenyl)borate],
N-methyl-N,N-didecylammonium [tetrakis(perfluorophenyl)borate],
N-methyl-N,N-dioctylammonium [tetrakis(perfluorophenyl)borate],
N-ethyl-N,N-dioctadecylammonium [tetrakis(perfluorophenyl)borate],
N,N-di(octadecyl)tolylammonium [tetrakis(perfluorophenyl)borate],
N,N-di(hexadecyl)tolylammonium [tetrakis(perfluorophenyl)borate],
N,N-di(tetradecyl)tolylammonium [tetrakis(perfluorophenyl)borate],
N,N-di(dodecyl)tolylammonium [tetrakis(perfluorophenyl) borate],
N-octadecyl-N-hexadecyl-tolylammonium [tetrakis(perfluorophenyl)borate],
N-octadecyl-N-tetradecyl-tolylammonium [tetrakis(perfluorophenyl)borate],
N-octadecyl-N-dodecyl-tolylammonium [tetrakis(perfluorophenyl)borate],
N-octadecyl-N-decyl-tolylammonium [tetrakis(perfluorophenyl)borate],
N-hexadecyl-N-tetradecyl-tolylammonium [tetrakis(perfluorophenyl)borate],
N-hexadecyl-N-dodecyl-tolylammonium [tetrakis(perfluorophenyl)borate],
N-hexadecyl-N-decyl-tolylammonium [tetrakis(perfluorophenyl)borate],
N-tetradecyl-N-dodecyl-tolylammonium [tetrakis(perfluorophenyl)borate],
N-tetradecyl-N-decyl-tolylammonium [tetrakis(perfluorophenyl)borate],
N-dodecyl-N-decyl-tolylammonium [tetrakis(perfluorophenyl)borate], N-methyl-N-octadecylanilinium [tetrakis(perfluorophenyl) borate],
N-methyl-N-hexadecylanilinium [tetrakis(perfluorophenyl) borate],
N-methyl-N-tetradecylanilinium [tetrakis(perfluorophenyl) borate],
N-methyl-N-dodecylanilinium [tetrakis(perfluorophenyl) borate],
N-methyl-N-decylanilinium [tetrakis(perfluorophenyl)borate], and
N-methyl-N-octylanilinium [tetrakis(perfluorophenyl)borate].

Preferred activators for use herein also include:
N-methyl-4-nonadecyl-N-octadecylbenzenaminium tetrakis(pentafluorophenyl)borate,
N-methyl-4-nonadecyl-N-octadecylbenzenaminium tetrakis(perfluoronaphthalen-2-yl)borate,
N,N-dimethylanilinium tetrakis(perfluoronaphthalen-2-yl)borate,
N,N-dimethylanilinium tetrakis(perfluorobiphenyl)borate,
N,N-dimethylanilinium tetrakis(perfluorophenyl)borate,
N,N-dimethylanilinium tetrakis(3,5-bis(trifluoromethyl)phenyl)borate,
triphenylcarbenium tetrakis(perfluoronaphthalen-2-yl)borate,
triphenylcarbenium tetrakis(perfluorobiphenyl)borate,
triphenylcarbenium tetrakis (3,5-bis (trifluoromethyl)phenyl)borate,
triphenylcarbenium tetrakis(perfluorophenyl)borate,
[Me$_3$NH$^+$][B(C$_6$F$_5$)$_4^-$];
1-(4-(tris(pentafluorophenyl)borate)-2,3,5,6-tetrafluorophenyl)pyrrolidinium; and
4-(tris(pentafluorophenyl)borate)-2,3,5,6-tetrafluoropyridine.

In a preferred embodiment, the activator comprises a triaryl carbenium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthalen-2-yl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, dioctadecylmethylammonium tetrakis (pentafluorophenyeborate, dioctadecylmethylammonium tetrakis (perfluoronaphthalen-2-yl)borate, N,N-dimethyl-(2,4,6-trimethylanilinium) tetrakis(pentafluorophenyl)borate, trialkylammonium tetrakis-(2,3,4,6-tetrafluorophenyl)borate, N,N-dialkylanilinium tetrakis-(2,3,4,6-tetrafluorophenyl)borate, trialkylammonium tetrakis(perfluoronaphthalen-2-yl)borate, N,N-dialkylanilinium tetrakis(perfluoronaphthalen-2-yl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

Likewise, useful activators also include N,N-dimethylanilinium tetrakis(pentafluorophenyl)borate, N,N-dimethylanilinium tetrakis(heptafluoronaphthalen-2-yl)borate, dioctadecylmethylammonium tetrakis(pentafluorophenyl) borate, and dioctadecylmethylammonium tetrakis (perfluoronaphthalen-2-yl)borate.

Additional useful activators and the synthesis of non-aromatic-hydrocarbon soluble activators are described in U.S. Ser. No. 16/394,166 filed Apr. 25, 2019, U.S. Ser. No. 16/394,186, filed Apr. 25, 2019, and U.S. Ser. No. 16/394,197, filed Apr. 25, 2019, which are incorporated by reference herein.

For a more detailed description of useful activators please see WO 2004/026921 page 72, paragraph [00119] to page 81 paragraph [00151]; U.S. Pat. Nos. 8,658,556; 6,211,105; US 2019/0330139; and US 2019/0330392. A list of useful activators that can be used in the practice of this invention may be found at page 72, paragraph [00177] to page 74, paragraph [00178] of WO 2004/046214.

The typical NCA activator-to-catalyst ratio, e.g., all NCA activators-to-catalyst ratio is about a 1:1 molar ratio. Alternate ranges include from 0.1:1 to 100:1, alternately from 0.5:1 to 200:1, alternately from 1:1 to 500:1 alternately from 1:1 to 1000:1. A particularly useful range is from 0.5:1 to 10:1, such as 1:1 to 5:1.

Activators useful herein also include those described in U.S. Pat. No. 7,247,687 at column 169, line 50 to column 174, line 43, particularly column 172, line 24 to column 173, line 53.

It is also within the scope of the present disclosure that the catalyst compounds can be combined with combinations of alumoxanes and NCA's (see for example, U.S. Pat. Nos. 5,153,157, 5,453,410, EP 0 573 120 B1, WO 1994/007928, and WO 1995/014044 which discuss the use of an alumoxane in combination with an ionizing activator).

Optional Scavengers or Co-Activators

In addition to the activator compounds, scavengers, chain transfer agents or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Useful chain transfer agents that may also be used herein are typically a compound represented by the formula AlR$_3$, ZnR$_2$ (where each R is, independently, a C$_1$-C$_8$ aliphatic radical, such as methyl, ethyl, propyl, butyl, penyl, hexyl octyl or an isomer thereof) or a combination thereof, such as diethyl zinc, trimethylaluminum, triisobutylaluminum, trioctylaluminum, or a combination thereof.

Supports

In some embodiments, the complexes described herein may be supported (with or without an activator) by any method effective to support other coordination catalyst systems, effective meaning that the catalyst so prepared can be used for oligomerizing or polymerizing olefin in a heterogeneous process. The catalyst precursor, activator, co-activator if needed, suitable solvent, and support may be added in any order or simultaneously. Typically, the complex and activator may be combined in solvent to form a solution. Then the support is added, and the mixture is stirred for 1 minute to 10 hours. The total solution volume may be greater than the pore volume of the support, but some embodiments limit the total solution volume below that needed to form a gel or slurry (about 90% to 400%, such as about 100-200% of the pore volume). After stirring, the residual solvent is removed under vacuum, typically at ambient temperature and over 10-16 hours. But greater or lesser times and temperatures are possible.

The complex may also be supported absent the activator; in that case, the activator (and co-activator if needed) is added to a polymerization process's liquid phase. Additionally, two or more different complexes may be placed on the same support. Likewise, two or more activators or an activator and co-activator may be placed on the same support.

Suitable solid particle supports are typically comprised of polymeric or refractory oxide materials, each being porous. Preferably any support material that has an average particle size greater than 10 µm is suitable for use. Various embodiments select a porous support material, such as for example, talc, inorganic oxides, inorganic chlorides, for example magnesium chloride and resinous support materials such as polystyrene polyolefin or polymeric compounds or any other organic support material and the like. Some embodiments select inorganic oxide materials as the support material including Group-2, -3, -4, -5, -13, or -14 metal or metalloid oxides. Some embodiments select the catalyst support materials to include silica, alumina, silica-alumina, and their mixtures. Other inorganic oxides may serve either alone or in combination with the silica, alumina, or silica-alumina. These are magnesia, titania, zirconia, and the like. Lewis acidic materials such as montmorillonite and similar clays may also serve as a support. In this case, the support can optionally double as the activator component, however, an additional activator may also be used.

The support material may be pretreated by any number of methods. For example, inorganic oxides may be calcined, chemically treated with dehydroxylating agents such as aluminum alkyls and the like, or both.

As stated above, polymeric carriers will also be suitable in accordance with the present disclosure, see for example the descriptions in WO 1995/015815 and U.S. Pat. No. 5,427,991. The methods disclosed may be used with the catalyst complexes, activators or catalyst systems of the present disclosure to adsorb or absorb them on the polymeric supports, particularly if made up of porous particles, or may be chemically bound through functional groups bound to or in the polymer chains.

Useful supports typically have a surface area of 10-700 m$^2$/g, a pore volume of 0.1-4.0 cc/g and an average particle size of 10-500 µm. Some embodiments select a surface area of 50-500 m$^2$/g, a pore volume of 0.5-3.5 cc/g, or an average particle size of 20-200 µm. Other embodiments select a surface area of 100-400 m$^2$/g, a pore volume of 0.8-3.0 cc/g, and an average particle size of 30-100 µm. Useful supports typically have a pore size of 10-1000 Angstroms, alternatively 50-500 Angstroms, or 75-350 Angstroms.

The catalyst complexes described herein are generally deposited on the support at a loading level of 10-100 micromoles of complex per gram of solid support; alternately 20-80 micromoles of complex per gram of solid support; or 40-60 micromoles of complex per gram of support. But greater or lesser values may be used provided that the total amount of solid complex does not exceed the support's pore volume.

In an alternate embodiment, catalyst complexes and catalyst systems described herein may be present on a fluorided support, e.g., a support, desirably particulate and porous, which has been treated with at least one inorganic fluorine containing compound. For example, the fluorided support composition can be a silicon dioxide support wherein a portion of the silica hydroxyl groups has been replaced with fluorine or fluorine containing compounds. For example, a useful support herein, is a silica support treated with ammonium hexafluorosilicate and/or ammonium tetrafluoroborate fluorine compounds. Typically the fluorine concentration present on the support is in the range of 0.1 to 25 wt %, alternately 0.19 to 19 wt %, alternately from 0.6 to 3.5 wt %, based upon the weight of the support.

In some embodiments, the catalyst system comprises fluorided silica, alkylalumoxane activator, and the bridged monocyclopentadienyl group 4 transition metal compound, where the fluorided support has not been calcined at a temperature of 400° C. or more.

In some embodiments, the catalyst system the reaction product of fluorides silica support, alkylalumoxane activator and µ-(CH$_3$)$_2$Si(η$^5$-2,6,6-trimethyl-1,5,6,7-tetrahydro-s-indacen-1-yl)(tertbutylamido)M(R)$_2$; where M is selected from a group consisting of Ti, Zr, and Hf and R is selected from halogen or C$_1$ to C$_5$ alkyl, where the fluorided silica support has not been calcined at a temperature of 400° C. or more.

The catalyst compound may be present on a support at 1 to 100 µmol/g supported catalyst, such as 20-60 µmol/g supported catalyst.

Catalyst compositions of the present disclosure can include the reaction product of at least three components: (1) one or more catalyst compounds (such as bridged metallocenes comprising a tetrahydroindacenyl group); (2) one or more alkylalumoxane activators; and (3) one or more fluorided support compositions, where the fluorided support composition has not been calcined at 400° C. or more, such as the fluorided support composition has been calcined at a temperature of 100° C. to 395° C., alternately 125° C. to 350° C., alternately 150° C. to 300° C.).

Typically, the fluorided supports described herein are prepared by combining a solution of polar solvent (such as water) and fluorinating agent (such as SiF$_4$ or (NH$_4$)$_2$SiF$_6$) with a slurry of support (such as a toluene slurry of silica), then drying until it is free flowing, and optionally, calcining (typically at temperatures over 100° C. for at least 1 hour). The supports are then combined with activator(s) and catalyst compound (separately or together).

For more information on fluorided supports and methods to prepare them, please see U.S. Ser. No. 62/149,799, filed Apr. 20, 2015 (and all cases claiming priority to or the benefit of U.S. Ser. No. 62/149,799); U.S. Ser. No. 62/103,372, filed Jan. 14, 2015 (and all cases claiming priority to or the benefit of U.S. Ser. No. 62/103,372); and PCT/US2015/067582, filed Dec. 28, 2015 which are incorporated by reference herein.

Additional Aspects

The present disclosure provides, among others, the following aspects, each of which may be considered as optionally including any alternate aspects. This invention further relates to:

1. A process to produce an ionomer comprising:
   1) contacting, in a reactor, one or more C$_2$-C$_{60}$ α-olefins (such as ethylene and/or propylene), an optional diene, and a metal alkenyl, represented by the formula:

where Q is a group 1, 2, 12 or 13 metal, such as Al, B Ga, Mg, Li, or Zn,

R is a hydrocarbenyl group containing 4 to 20 carbon atoms having an allyl chain end, R' is a hydrocarbyl group containing 1 to 30 carbon atoms, z is 1, 2, or 3 (such as where z is 3 for group 13 metals, z is 2 for group 2 and 12 metals, and z is 1 for group 1 metals); and v is 1, 2 or 3, where z-v is 0, 1 or 2;

with a catalyst system comprising an activator (such as an alumoxane or a non-coordinating anion), a catalyst compound (such as a single site coordination polymerization catalyst), and a support (such as silica);

2) forming a copolymer comprising one or more $C_2$-$C_{60}$ α-olefin monomers (such as ethylene and/or propylene) and about 0.01 wt % to about 20 wt %, based on the weight of the copolymer, of metal alkenyl, wherein the copolymer optionally has a melting point of 100° C. or more and or an Mw of 100,000 g/mol; and 3) functionalizing and quenching the polymerization reaction with one or more electrophilic groups, such as $CO_2$, $CS_2$, COS, $O_2$, $H_2O$ $SO_2$, $SO_3$, $P_2O_5$, $NO_2$, epoxides, cyclic anhydrides (such as maleic anhydride), methyl methacrylate, styrenics (such as styrene), and air; and 4) obtaining ionomer comprising an ionic group, such as carboxlate (such as thiocarboxlate), sulfonate, phosphate, epoxides, or styrenics (such as styrene, para methylstyrene), where the ionomer optionally has a shear thinning index of 500 or more and/or a strain hardening ratio of 5 or more, when measured at Hencky strain rate of 10 sec$^{-1}$.

2. The process of paragraph 1, wherein Q is Al.

3. The process of paragraph 1 or 2, wherein R is butenyl, pentenyl, heptenyl, or octenyl and R' is methyl, ethyl, propyl, isobutyl, butyl, octyl, or n-octyl.

4. The process of paragraph 1, 2, or 3 wherein aluminum alkenyl is one or more of isobutyl-di(oct-7-en-1-yl)-aluminum, isobutyl-di(dec-9-en-1-yl)-aluminum, isobutyl-di(non-8-en-1-yl)-aluminum, isobutyl-di(hept-6-en-1-yl)-aluminum, dimethyl(oct-7-en-1-yl)aluminum, diethyhoct-7-en-1-yl)aluminum, dibutyl(oct-7-en-1-yl)aluminum, diisobutyl(oct-7-en-1-yl)aluminum, diisobutyl(non-8-en-1-yl)aluminum, diisobutyl(dec-9-en-1-yl)aluminum, diisobutyl(dodec-10-en-1-yl)aluminum, diisobutyl(hept-6-en-1-yl)aluminum, diethyl(hept-6-en-1-yl)aluminum, dimethyl(hept-6-en-1-yl)aluminum, di-n-octyl(7-octen-1-yl)aluminum, n-octyl(di-7-octen-1-yl)aluminum, and diisobutyl(6-hepten-1-yl)aluminum.

5. The process of any of paragraphs 1 to 4, where the $C_2$-$C_{60}$ α-olefins are one or more of ethylene, propylene, butene, pentene, hexene, heptene, octene, nonene, decene, undecene, dodecene and isomers thereof.

6. The process of any of paragraphs 1 to 5, where the diene comprises one or more of butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, cyclopentadiene, vinylnorbornene, norbornadiene, 5-ethylidene-2-norbornene, 5-vinyl-2-norbornene, divinylbenzene, dicyclopentadiene, and combination(s) thereof.

7. The process of any of paragraphs 1 to 6, where copolymer comprises:
1) 50 wt % to about 99.99 wt % of a first α-olefin monomer,
2) up to about 50 wt % of an optional second α-olefin comonomer different from the first α-olefin monomer,
3) up to about 20 wt % of an optional diene, and
4) 0.01 wt % to about 20 wt % of a metal alkenyl, based on the weight of the copolymer.

8. The process of any of paragraphs 1 to 7, where ionomer comprises:
1) 50 wt % to about 99.88 wt % of a first α-olefin monomer selected from the group consisting of ethylene or propylene,
2) 0.1 wt % to about 50 wt % of a second α-olefin comonomer different from the first α-olefin monomer selected from the group consisting of $C_2$ to $C_{26}$ α-olefins,
3) 0.01 wt % to about 20 wt % of an optional diene selected from the group consisting of vinylnorbornene, norbornadiene, 5-ethylidene-2-norbornene, 5-vinyl-2-norbomene, divinylbenzene, dicyclopentadiene, and combination(s) thereof, and
4) 0.01 wt % to about 20 wt % of a metal alkenyl selected from the group consisting of (diisobutyl)(7-octen-1-yl) aluminum, (di-n-octyl)(7-octen-1-yl)aluminum, (isobutyl)(di-7-octen-1-yl)aluminum, (n-octyl)(di-7-octen-1-yl)aluminum, (diisobutyl)(6-hepten-1-yl)aluminum and combinations thereof,
based on the weight of the copolymer.

9. The process of any of paragraphs 1 to 8, where copolymer has an Mw/Mn of from about 2 to about 4 Mw of about 50,000 g/mol or more and an Mn of about 21,000 g/mol or more.

10. The process any of paragraphs 1 to 9, where functionalizing/quench agent is one or more of $CO_2$, $CS_2$, COS, $O_2$, $H_2O$ $SO_2$, $SO_3$, $P_2O_5$, $NO_2$, epoxides, cyclic anhydrides (such as maleic anhydride), methyl methacrylate, styrenics (such as styrene), air, water, alcohol.

11. The process of any of paragraphs 1 to 10, where functionalizing/quench agent is: 1) one or more of $CO_2$, $CS_2$, COS, $O_2$, $H_2O$ $SO_2$, $SO_3$, $P_2O_5$, $NO_2$, epoxides, cyclic anhydrides (such as maleic anhydride), methyl methacrylate, styrenics (such as styrene), and 2) one or more of air, water, and alcohol.

12. The process of any of paragraphs 1 to 11, where the ionomer comprises one or more ionic groups selected from the group consisting of a sulfonate, a phosphonate, alkoxy, carboxlate (such as thiocarboxlate), sulfonate, phosphate, epoxide, and styrenics (such as styrene, para methylstyrene).

13. The process of any of paragraphs 1 to 12, wherein the ionomer comprises one or more pendant groups represent by the formula: —R*—C(O)—OQ-(OR'$_{2-v'}$(R)$_{v'}$)$_2$, where R* is a hydrocarbyl having 2 to 18 carbon atoms, Q is a group 13 metal, R is a hydrocarbenyl group containing 4 to 20 carbon atoms having an allyl chain end, R' is a hydrocarbyl group containing 1 to 30 carbon atoms, and v' is 1 or 2.

14. The process of any of paragraphs 1 to 13, wherein the reaction conditions comprise a temperature of about 50° C. to about 100° C. and a time of about 5 minutes to about 30 minutes.

15. The process any of paragraphs 1 to 14, wherein the functionalizing/quench agent is introduced at a pressure of from about 50 psi to about 150 psi, wherein introducing the oxidizing agent to the copolymer is performed at a temperature of about 50° C. to about 100° C., and for a time of about 5 minutes to about 30 minutes in.

16. The process any of paragraphs 1 to 15, wherein the activator comprises one or more of: alumoxane, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl) borate, triphenylcarbenium tetrakis(perfluorophenyl)borate, 1-(4-(tris(pentafluorophenyl)borate)-2,3,5,6-tetrafluorophenyl)pyrrolidinium, 4-(tris(pentafluorophenyl)borate)-2,3,5,6-tetrafluoropyridine, di(hydrogenated tallow)methylamine tetrakis(perfluoronaphthyl)borate,
di(octadecyl)tolylammonium [tetrakis(pentafluorophenyl)borate],
N,N-dimethylanilinium [tetrakis(heptafluoronaphthalen-2-yl)borate],
N,N-dimethylanilinium [tetrakis(pentafluorophenyl)borate],
N,N-dimethylanilinium tetrakis(perfluorobiphenyl)borate,
N,N-dimethylanilinium tetrakis(3,5-bis(trifluoromethyl)phenyl)borate,
N,N-di(hydrogenated tallow)methylammonium [tetrakis(perfluorophenyl) borate],
N-methyl-4-nonadecyl-N-octadecylanilinium [tetrakis(perfluorophenyl)borate],
N-methyl-4-hexadecyl-N-octadecylanilinium [tetrakis(perfluorophenyl)borate],
N-methyl-4-tetradecyl-N-octadecylanilinium [tetrakis(perfluorophenyl)borate],
N-methyl-4-dodecyl-N-octadecylanilinium [tetrakis(perfluorophenyl)borate],
N-methyl-4-decyl-N-octadecylanilinium [tetrakis(perfluorophenyl)borate],
N-methyl-4-octyl-N-octadecylanilinium [tetrakis(perfluorophenyl)borate],
N-methyl-4-hexyl-N-octadecylanilinium [tetrakis(perfluorophenyl)borate],
N-methyl-4-butyl-N-octadecylanilinium [tetrakis(perfluorophenyl)borate],
N-methyl-4-octadecyl-N-decylanilinium [tetrakis(perfluorophenyl)borate],
N-methyl-4-nonadecyl-N-dodecylanilinium [tetrakis(perfluorophenyl)borate],
N-methyl-4-nonadecyl-N-tetradecylanilinium [tetrakis(perfluorophenyl)borate],
N-methyl-4-nonadecyl-N-hexadecylanilinium [tetrakis(perfluorophenyl)borate],
N-ethyl-4-nonadecyl-N-octadecylanilinium [tetrakis(perfluorophenyl)borate],
N-methyl-N,N-dioctadecylammonium [tetrakis(perfluorophenyl)borate],
N-methyl-N,N-dihexadecylammonium [tetrakis(perfluorophenyl)borate],
N-methyl-N,N-ditetradecylammonium [tetrakis(perfluorophenyl)borate],
N-methyl-N,N-didodecylammonium [tetrakis(perfluorophenyl)borate],
N-methyl-N,N-didecylammonium [tetrakis(perfluorophenyl)borate],
N-methyl-N,N-dioctylammonium [tetrakis(perfluorophenyl)borate],
N-ethyl-N,N-dioctadecylammonium [tetrakis(perfluorophenyl)borate],
N,N-di(octadecyl)tolylammonium [tetrakis(perfluorophenyl)borate],
N,N-di(hexadecyl)tolylammonium [tetrakis(perfluorophenyl)borate],
N,N-di(tetradecyl)tolylammonium [tetrakis(perfluorophenyl)borate],
N,N-di(dodecyl)tolylammonium [tetrakis(perfluorophenyl)borate],
N-octadecyl-N-hexadecyl-tolylammonium [tetrakis(perfluorophenyl)borate],
N-octadecyl-N-tetradecyl-tolylammonium [tetrakis(perfluorophenyl)borate],
N-octadecyl-N-dodecyl-tolylammonium [tetrakis(perfluorophenyl)borate],
N-octadecyl-N-decyl-tolylammonium [tetrakis(perfluorophenyl)borate],
N-hexadecyl-N-tetradecyl-tolylammonium [tetrakis(perfluorophenyl)borate],
N-hexadecyl-N-dodecyl-tolylammonium [tetrakis(perfluorophenyl)borate],
N-hexadecyl-N-decyl-tolylammonium [tetrakis(perfluorophenyl)borate],
N-tetradecyl-N-dodecyl-tolylammonium [tetrakis(perfluorophenyl)borate],
N-tetradecyl-N-decyl-tolylammonium [tetrakis(perfluorophenyl)borate],
N-dodecyl-N-decyl-tolylammonium [tetrakis(perfluorophenyl)borate],
N-methyl-N-octadecylanilinium [tetrakis(perfluorophenyl)borate],
N-methyl-N-hexadecylanilinium [tetrakis(perfluorophenyl)borate],
N-methyl-N-tetradecylanilinium [tetrakis(perfluorophenyl)borate],
N-methyl-N-dodecylanilinium [tetrakis(perfluorophenyl)borate],
N-methyl-N-decylanilinium [tetrakis(perfluorophenyl)borate],
N-methyl-N-octylanilinium [tetrakis(perfluorophenyl)borate],
N-methyl-4-nonadecyl-N-octadecylbenzenaminium tetrakis(pentafluorophenyl)borate, and
N-methyl-4-nonadecyl-N-octadecylbenzenaminium tetrakis(perfluoronaphthalen-2-yl)borate.

17. The process of any of paragraphs 1 to 16, wherein the catalyst comprises a metallocene and or a bis(phenolate) heterocyclic Lewis base complex.

18. The process of any of paragraphs 1 to 16, wherein the catalyst comprises a metallocene represented by the formula:

$$Cp^A Cp^B M'X'_n, \quad \text{(MCN-I)}$$

$$Cp^A(T)Cp^B M'X'_n, \text{ or} \quad \text{(MCN-II)}$$

$$T_y Cp_m MG_n X_q \quad \text{(MCN-III)}$$

wherein each $Cp^A$ and $Cp^B$ is independently selected from cyclopentadienyl ligands and ligands isolobal to cyclopentadienyl, one or both $Cp^A$ and $Cp^B$ may contain heteroatoms, and one or both $Cp^A$ and $Cp^B$ may be substituted by one or more R" groups;

M' is selected from Groups 3 through 12 atoms and lanthanide Group atoms;

X' is an anionic leaving group; n is 0 or an integer from 1 to 4;

each R" is independently selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, ether, and thioether;

(T) is a bridging group selected from divalent alkyl, divalent substituted alkyl, divalent heteroalkyl, divalent alkenyl, divalent substituted alkenyl, divalent heteroalkenyl, divalent alkynyl, divalent substituted alkynyl, divalent heteroalkynyl, divalent alkoxy, divalent aryloxy, divalent alkylthio, divalent arylthio, divalent aryl, divalent substituted aryl, divalent heteroaryl, divalent aralkyl, divalent aralkylene, divalent alkaryl, divalent alkarylene, divalent haloalkyl, divalent haloalkenyl, divalent haloalkynyl, divalent heteroalkyl, divalent heterocycle, divalent heteroaryl, a divalent heteroatom-containing group, divalent hydrocarbyl, divalent substituted hydrocarbyl, divalent heterohydrocarbyl, divalent silyl, divalent boryl, divalent phosphino, divalent phosphine, divalent amino, divalent amine, divalent ether, divalent thioether;

Cp is independently a substituted or unsubstituted cyclopentadienyl ligand or substituted or unsubstituted ligand isolobal to cyclopentadienyl;

M is a Group 4 transition metal;

G is a heteroatom group represented by the formula $JR^*_z$ where J is N, P, O or S, and $R^*$ is a linear, branched, or cyclic $C_1$-$C_{20}$ hydrocarbyl; z is 1 or 2;

T is a bridging group; y is 0 or 1; X is a leaving group; m=1, n=1, 2 or 3, q=0, 1, 2 or 3, and the sum of m+n+q is equal to the coordination number of the transition metal.

19. The process of any of paragraphs 1 to 16, wherein the catalyst is represented by the Formula (A):

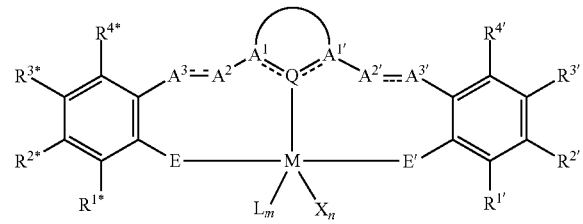

(A)

wherein:
M is a group 3, 4, 5, or 6 transition metal or a Lanthanide;
E and E' are each independently O, S, or $NR^9$, where $R^9$ is independently hydrogen, $C_1$-$C_{40}$ hydrocarbyl, $C_1$-$C_{40}$ substituted hydrocarbyl, or a heteroatom-containing group;
Q is group 14, 15, or 16 atom that forms a dative bond to metal M;
$A^1QA^{1'}$ are part of a heterocyclic Lewis base containing 4 to 40 non-hydrogen atoms that links $A^2$ to $A^{2'}$ via a 3-atom bridge with Q being the central atom of the 3-atom bridge;
$A^3 \text{---} A^2$ is a divalent group containing 2 to 40 non-hydrogen atoms that links $A^1$ to the E-bonded aryl group via a 2-atom bridge;
$A^{2'} \text{---} A^{3'}$ is a divalent group containing 2 to 40 non-hydrogen atoms that links $A^{1'}$ to the E-bonded aryl group via a 2-atom bridge;
each L is independently a Lewis base;
each X is independently an anionic ligand;
n is 1, 2 or 3;
m is 0, 1, or 2;
n+m is not greater than 4;
each of $R^{1*}$, $R^{2*}$, $R^{3*}$, $R^{4*}$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^{1*}$ and $R^{2*}$, $R^{2*}$ and $R^{3*}$, $R^{3*}$ and $R^{4*}$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;
any two L groups may be joined together to form a bidentate Lewis base;
an X group may be joined to an L group to form a monoanionic bidentate group; and
any two X groups may be joined together to form a dianionic ligand group.

20. The process of any of paragraphs 1 to 16, wherein the catalyst comprises one or more of:
dimethylsilylene(cyclopentadienyl)(cyclododecylamido)M(R)$_2$,
dimethylsilylene(cyclopentadienyl)(t-butylamido)M(R)$_2$,
dimethylsilylene(tetramethylcyclopentadienyl)(cyclododecylamido)M(R)$_2$,
dimethylsilylene(tetramethylcyclopentadienyl)(t-butylamido)M(R)$_2$,
dimethylsilylene(indenyl)(cyclododecylamido)M(R)$_2$,
dimethylsilylene(flourenyl)(t-butylamido)M(R)$_2$,
dimethylsilylene(cyclopentadienyl)(adamantylamido)M(R)$_2$,
dimethylsilylene(tetramethylcyclopentadienyl)(adamantylamido)M(R)$_2$,
dimethylsilylene(indenyl)(adamantylamido)M(R)$_2$,
dimethylsilylene(cyclopentadienyl)(cyclooctylamido)M(R)$_2$,
dimethylsilylene(tetramethylcyclopentadienyl)(cyclooctylamido)M(R)$_2$,
dimethylsilylene(indenyl)(cyclooctylamido)M(R)$_2$,
dimethylsilylene(flourenyl)(cyclooctylamido)M(R)$_2$,
dimethylsilylene(cyclopentadienyl)(cyclohexylamido)M(R)$_2$,
dimethylsilylene(tetramethylcyclopentadienyl)(cyclohexylamido)M(R)$_2$,
dimethylsilylene(indenyl)(cyclohexylamido)M(R)$_2$,
dimethylsilylene(flourenyl)(cyclohexylamido)M(R)$_2$,
dimethylsilylene(2,6,6-trimethyl-1,5,6,7-tetrahydro-s-indacen-1-yl)(cyclododecylamido)M(R)$_2$,
dimethylsilylene(2,6,6-trimethyl-1,5,6,7-tetrahydro-s-indacen-1-yl)(t-butylamido)M(R)$_2$,
dimethylsilylene(6,6-dimethyl-1,5,6,7-tetrahydro-s-indacen-1-yl)(cyclododecylamido)M(R)$_2$,
dimethylsilylene (6,6-dimethyl-1,5,6,7-tetrahydro-s-indacen-1-yl)(t-butylamido)M(R)$_2$,
dimethylsilylene(2,7,7-trimethyl-3,6,7,8-tetrahydro-as-indacen-3-yl)(cyclododecylamido)M(R)$_2$,
dimethylsilylene(2,7,7-trimethyl-3,6,7,8-tetrahydro-as-indacen-3-yl)(t-butylamido)M(R)$_2$,
dimethylsilylene(7,7-dimethyl-3,6,7,8-tetrahydro-as-indacen-3-yl)(cyclododecylamido)M(R)$_2$,
dimethylsilylene(7,7-dimethyl-3,6,7,8-tetrahydro-as-indacen-3-yl)(t-butylamido)M(R)$_2$,
μ-$(CH_3)_2$Si(2,6,6-trimethyl-1,5,6,7-tetrahydro-s-indacen-1-yl)(1-adamantylamido)M(R)$_2$;
μ-$(CH_3)_2$Si(6,6-dimethyl-1,5,6,7-tetrahydro-s-indacen-1-yl)(1-adamantylamido)M(R)$_2$;
μ-$(CH_3)_2$Si(2-methyl-6,6-diethyl-1,5,6,7-tetrahydro-s-indacen-1-yl)(1-adamantylamido)M(R)$_2$;
μ-$(CH_3)_2$Si(6,6-diethyl-1,5,6,7-tetrahydro-s-indacen-1-yl)(1-adamantylamido)M(R)$_2$;
μ-$(CH_3)_2$Si(2,7,7-trimethyl-3,6,7,8-tetrahydro-as-indacen-3-yl)(1-adamantylamido)M(R)$_2$;
μ-$(CH_3)_2$Si(7,7-dimethyl-3,6,7,8-tetrahydro-as-indacen-3-yl)(1-adamantylamido)M(R)$_2$;

μ-(CH₃)₂Si(2-methyl-3,6,7,8-tetrahydro-as-indacen-3-yl)
(1-adamantylamido)M(R)₂;
μ-(CH₃)₂Si(2-methyl-7,7-diethyl-3,6,7,8-tetrahydro-as-indacen-3-yl)(1-adamantylamido)M(R)₂;
μ-(CH₃)₂Si(7,7-diethyl-3,6,7,8-tetrahydro-as-indacen-3-yl)
(1-adamantylamido)M(R)₂;
μ-(CH₃)₂Si(2,6,6-trimethyl-1,5,6,7-tetrahydro-s-indacen-1-yl)(t-butylamido)M(R)₂;
μ-(CH₃)₂Si(6,6-dimethyl-1,5,6,7-tetrahydro-s-indacen-1-yl)
(t-butylamido)M(R)₂;
μ-(CH₃)₂Si(2-methyl-6,6-diethyl-1,5,6,7-tetrahydro-s-indacen-1-yl)(t-butylamido)M(R)₂;
μ-(CH₃)₂Si(6,6-diethyl-1,5,6,7-tetrahydro-s-indacen-1-yl)
(t-butylamido)M(R)₂;
μ-(CH₃)₂Si(2,7,7-trimethyl-3,6,7,8-tetrahydro-as-indacen-3-yl)(t-butylamido)M(R)₂;
μ-(CH₃)₂Si(7,7-dimethyl-3,6,7,8-tetrahydro-as-indacen-3-yl)(t-butylamido)M(R)₂;
μ-(CH₃)₂Si(2-methyl-3,6,7,8-tetrahydro-as-indacen-3-yl)(t-butylamido)M(R)₂;
μ-(CH₃)₂Si(2-methyl-7,7-diethyl-3,6,7,8-tetrahydro-as-indacen-3-yl)(t-butylamido)M(R)₂;
μ-(CH₃)₂Si(7,7-diethyl-3,6,7,8-tetrahydro-as-indacen-3-yl)
(t-butylamido)M(R)₂;
μ-(CH₃)₂Si(2,6,6-trimethyl-1,5,6,7-tetrahydro-s-indacen-1-yl)(cyclododecylamido)M(R)₂;
μ-(CH₃)₂Si(6,6-dimethyl-1,5,6,7-tetrahydro-s-indacen-1-yl)
(cyclododecylamido)M(R)₂;
μ-(CH₃)₂Si(2-methyl-6,6-diethyl-1,5,6,7-tetrahydro-s-indacen-1-yl)(cyclododecylamido)M(R)₂;
μ-(CH₃)₂Si(6,6-diethyl-1,5,6,7-tetrahydro-s-indacen-1-yl)
(cyclododecylamido)M(R)₂;
μ-(CH₃)₂Si(2,7,7-trimethyl-3,6,7,8-tetrahydro-as-indacen-3-yl)(cyclododecylamido)M(R)₂;
μ-(CH₃)₂Si(7,7-dimethyl-3,6,7,8-tetrahydro-as-indacen-3-yl)(cyclododecylamido)M(R)₂;
μ-(CH₃)₂Si(2-methyl-3,6,7,8-tetrahydro-as-indacen-3-yl)
(cyclododecylamido)M(R)₂;
μ-(CH₃)₂Si(2-methyl-7,7-diethyl-3,6,7,8-tetrahydro-as-indacen-3-yl)(cyclododecylamido)M(R)₂;
μ-(CH₃)₂Si(7,7-diethyl-3,6,7,8-tetrahydro-as-indacen-3-yl)
(cyclododecylamido)M(R)₂;
μ-(CH₂)₃Si(2,6,6-trimethyl-1,5,6,7-tetrahydro-s-indacen-1-yl)(t-butylamido)M(R)₂;
μ-(CH₂)₄Si(2,6,6-trimethyl-1,5,6,7-tetrahydro-s-indacen-1-yl)(t-butylamido)M(R)₂;
μ-(CH₂)₅Si(2,6,6-trimethyl-1,5,6,7-tetrahydro-s-indacen-1-yl)(t-butylamido)M(R)₂;
μ-(CH₃)₂C(2,6,6-trimethyl-1,5,6,7-tetrahydro-s-indacen-1-yl)(t-butylamido)M(R)₂;
μ-(CH₂)₃Si(2,6,6-trimethyl-1,5,6,7-tetrahydro-s-indacen-1-yl)(t-butylamido)M(R)₂;
μ-(CH₂)₄Si(2,6,6-trimethyl-1,5,6,7-tetrahydro-s-indacen-1-yl)(t-butylamido)M(R)₂;
μ-(CH₂)₅Si(2,6,6-trimethyl-1,5,6,7-tetrahydro-s-indacen-1-yl)(t-butylamido)M(R)₂;
μ-(CH₃)₂C(2,6,6-trimethyl-1,5,6,7-tetrahydro-s-indacen-1-yl)(t-butylamido)M(R)₂; and
μ-(CH₃)₂Si(2,6,6-trimethyl-1,5,6,7-tetrahydro-s-indacen-1-yl)(neopentylamido)M(R)₂;
where M is selected from a group consisting of Ti, Zr, and Hf and R is selected from halogen or $C_1$ to $C_5$ alkyl.

21. The process of any of paragraphs 1 to 16, wherein the catalyst comprises one or more of:
dimethylzirconium[2',2'''-(pyridine-2,6-diyl)bis(3-adamantan-1-yl)-5-(tert-butyl)-[1,1'-biphenyl]-2-olate)],
dimethylhafnium[2',2'''-(pyridine-2,6-diyl)bis(3-adamantan-1-yl)-5-(tert-butyl)-[1,1'-biphenyl]-2-olate)],
dimethylzirconium[6,6'-(pyridine-2,6-diylbis(benzo[b]thiophene-3,2-diyl))bis(2-adamantan-1-yl)-4-methylphenolate)],
dimethylhafnium[6,6'-(pyridine-2,6-diylbis(benzo[b]thiophene-3,2-diyl))bis(2-adamantan-1-yl)-4-methylphenolate)],
dimethylzirconium[2',2'''-(pyridine-2,6-diyl)bis(3-((3r,5r,7r)-adamantan-1-yl)-5-methyl-[1,1'-biphenyl]-2-olate)],
dimethylhafnium[2',2'''-(pyridine-2,6-diyl)bis(3-((3r,5r,7r)-adamantan-1-yl)-5-methyl-[1,1'-biphenyl]-2-olate)],
dimethylzirconium[2',2'''-(pyridine-2,6-diyl)bis(3-((3r,5r,7r)-adamantan-1-yl)-4',5-dimethyl-[1,1'-biphenyl]-2-olate)], and
dimethylhafnium[2',2'''-(pyridine-2,6-diyl)bis(3-((3r,5r,7r)-adamantan-1-yl)-4',5-dimethyl-[1,1'-biphenyl]-2-olate)].

22. The process of any of paragraphs 1 to 16, wherein the catalyst comprises one or more of complexes 1 to 32.

23. The process of any of paragraphs 1 to 16, wherein the catalyst comprises:

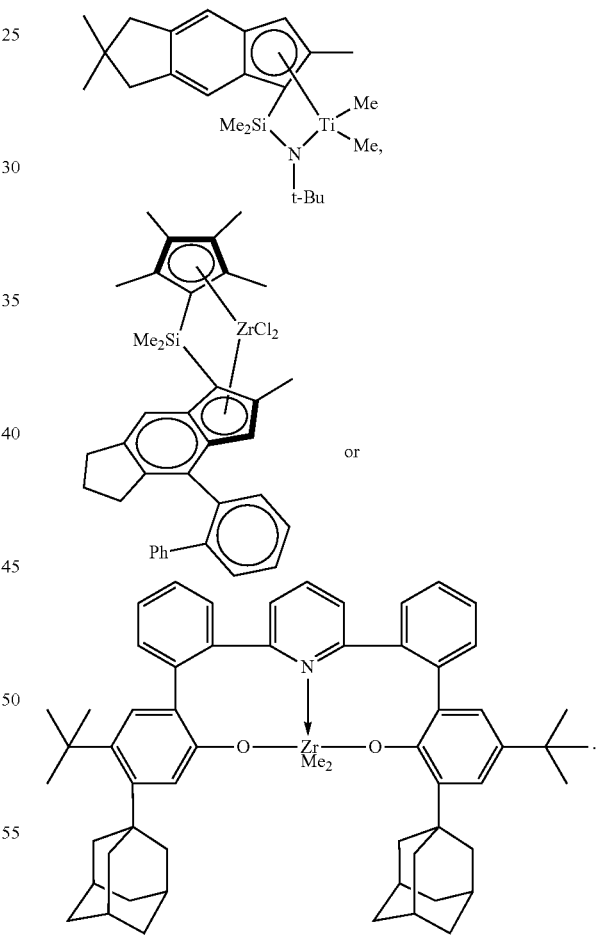

24. The process of any of paragraphs 1 to 23, wherein the support material is selected from $Al_2O_3$, $ZrO_2$, $SiO_2$, $SiO_2/Al_2O_3$, $SiO_2/TiO_2$, silica clay, silicon oxide/clay, or mixtures thereof.

25. The process of any of paragraphs 1 to 24, wherein the ionomer has a maximum elastic range of from about 400% elongation to about 500% elongation.

26. The process of any of paragraphs 1 to 25, wherein the ionomer has an elongation at breakage of about 500% or greater.

27. The process of any of paragraphs 1 to 26, wherein the ionomer has a tensile set, at 200% deformation, of from about 40% to about 50%.

28. The process of any of paragraphs 1 to 27, wherein the ionomer has a tensile strength, at 25° C., of from about 0.1 MPa to about 10 MPa.

29. The process of any of paragraphs 1 to 28, wherein the ionomer has a Young's modulus, at 40° C. of from about 0.5 MPa to about 10 MPa.

30. The process of any of paragraphs 1 to 29, wherein the ionomer has a glass transition temperature of from about −100° C. to about −10° C.

31. The process of any of paragraphs 1 to 30, wherein the ionomer has a complex viscosity as measured by oscillatory shear at a angular frequency of 0.1 rad/s of about 500,000 Pa-s to about 800,000 Pa-s.

32. The process of any of paragraphs 1 to 31 wherein the propylene copolymer has a complex viscosity as measured by oscillatory shear at a angular frequency of 100 rad/s of about 100 to 500 Pa-s.

33. The process of any of paragraphs 1 to 32, wherein the ionomer has a shear thinning index of about 1,000 to 5,000.

34. The process of any of paragraphs 1 to 33, wherein the ionomer has a strain hardening ratio of about 5 to about 15 when measured at Hencky strain rate of 10 sec$^{-1}$, of about 10 to about 20 when measured at Hencky strain rate of 1.0 sec$^{-1}$, of about 15 to about 30 when measured at Hencky strain rate of 0.1 sec$^{-1}$, of about 30 to about 100 when measured at Hencky strain rate of 0.01 sec$^{-1}$, and/or of about 100 to about 200 when measured at Hencky strain rate of 0.001 sec$^{-1}$.

Experimental

Materials

Catalyst A was prepared as described in US 2020/0255561.

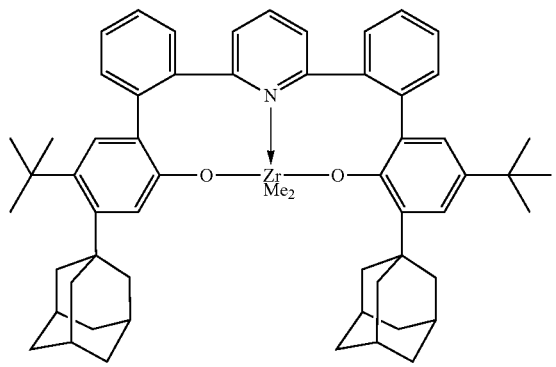

Catalyst A

Silica-supported Catalyst A was prepared as follows:
Preparation of Silica Supported MAO (SMAO)

In a celstir bottle, 20.0 g of silica (DM L403, AGC Chemicals, 200° C. calcination) and 91.2 g of toluene were mixed. The silica slurry was then allowed to cool in the freezer for 30 minutes. In a square bottle, 31.8 g MAO (30% toluene solution, W. R. GRACE), based on 7.5 mmol Al/g silica) was charged in and also cooled down in the freezer for 30 minutes. After 30 minutes, the cold MAO solution was added slowly into the silica slurry bottle by pipette. The solution was allowed to stir at room temperature for 1 hour. After 1 hour, the oil bath was heated up to 100° C. and the solution stirred at 100° C. for 3 hours. After 2.5 hours of stirring, the celstir bottle was taken off the heat and continued to stir for another 30 minutes. The mixture was then filtered, washed 2×20 g toluene (to remove toluene soluble MAO) and 2×20 g isohexane (to remove toluene for easier drying). The product was dried under vacuum overnight.

Silica-Supported Catalyst A was Prepared as Follows:

1 g of support material (SMAO) was suspended in ca. 8 mL of toluene and placed on a shaker. Catalyst A was added as a toluene solution (40.1 mg, based on 40 mol/g) to the support material mixture. The mixture was allowed to react for 3 hours. After 3 hours, the mixture was filtered and the solid was washed with toluene (5 mL) and pentane (2×5 mL) and dried in vacuo to give a supported catalyst A as white solids. Optionally, the supported catalysts were slurried in mineral oil (degassed at 100° C. for 2 hours).

Catalyst B, tetramethylcyclopentadienyl dimethylsilyl (4-([1,1'-biphenyl]-2-yl)-1,5,6,7-tetrahydro-s-indacen-1-yl) zirconium dichloride, was prepared as described in U.S. Ser. No. 62/890,410, filed Aug. 22, 2019.

Silica-Supported Catalyst B was Prepared as Follows:

1 g of support material (SMAO) was suspended in ca. 8 mL of toluene and placed on a shaker. Triisobutylaluminum (0.36 mL of 1M solution) was then added Catalyst A was added as a toluene solution (21.7 mg, based on 32.9 μmol/g) to the support material mixture. The mixture was allowed to react for 3 hours. After 3 hours, the mixture was filtered and the solid was washed with toluene (5 mL) and pentane (2×5 mL) and dried in vacuo to give a supported catalyst as a red solid. Optionally, the supported catalysts were slurried in mineral oil (degassed at 100° C. for 2 hours).

Synthesis of Aluminum Vinyl (AV-1/8)

Under an $N_2$ atmosphere, a 1,000 mL round bottom flask was charged with 663 mL of 1,7-octadiene (4488.8 mmol) and a stir bar. The flask was brought to 60° C. To the flask was slowly added neat diisobutyl aluminum hydride (63.8 g, 448.9 mmol) dropwise (around 3 droplets per second). After the completion of addition, the reaction was stirred at 60° C. for an additional 30 minutes. The excess 1,7-octadiene was distilled off under a dynamic vacuum at 55° C., resulting in a colorless liquid of the desired product. Yield: 108 g. On the basis of NMR integration, the product AV-1/8 molecular formula was assigned as $(C_4H_9)_{2.1}Al(C_8H_{15})_{0.9}$. $^1$H NMR (400 MHz, benzene-$d_6$): δ=5.78 (m, 1H, =CH), 5.01 (m, 2H, =CH$_2$), 1.95 (m, 4H, —CH$_2$), 1.54 (m, 2H, $^i$Bu-CH), 1.34 (m, 6H, —CH$_2$), 1.04 (d, 12H, $^i$Bu-CH$_3$), 0.49 (t, 2H, Al—CH$_2$), 0.27 (d, 4H, $^i$Bu-CH$_2$) ppm.

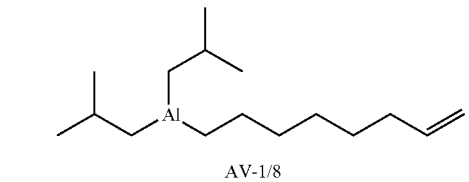

AV-1/8

General Reaction Scheme for the Synthesis of iPP-AV-CO$_2$Al.

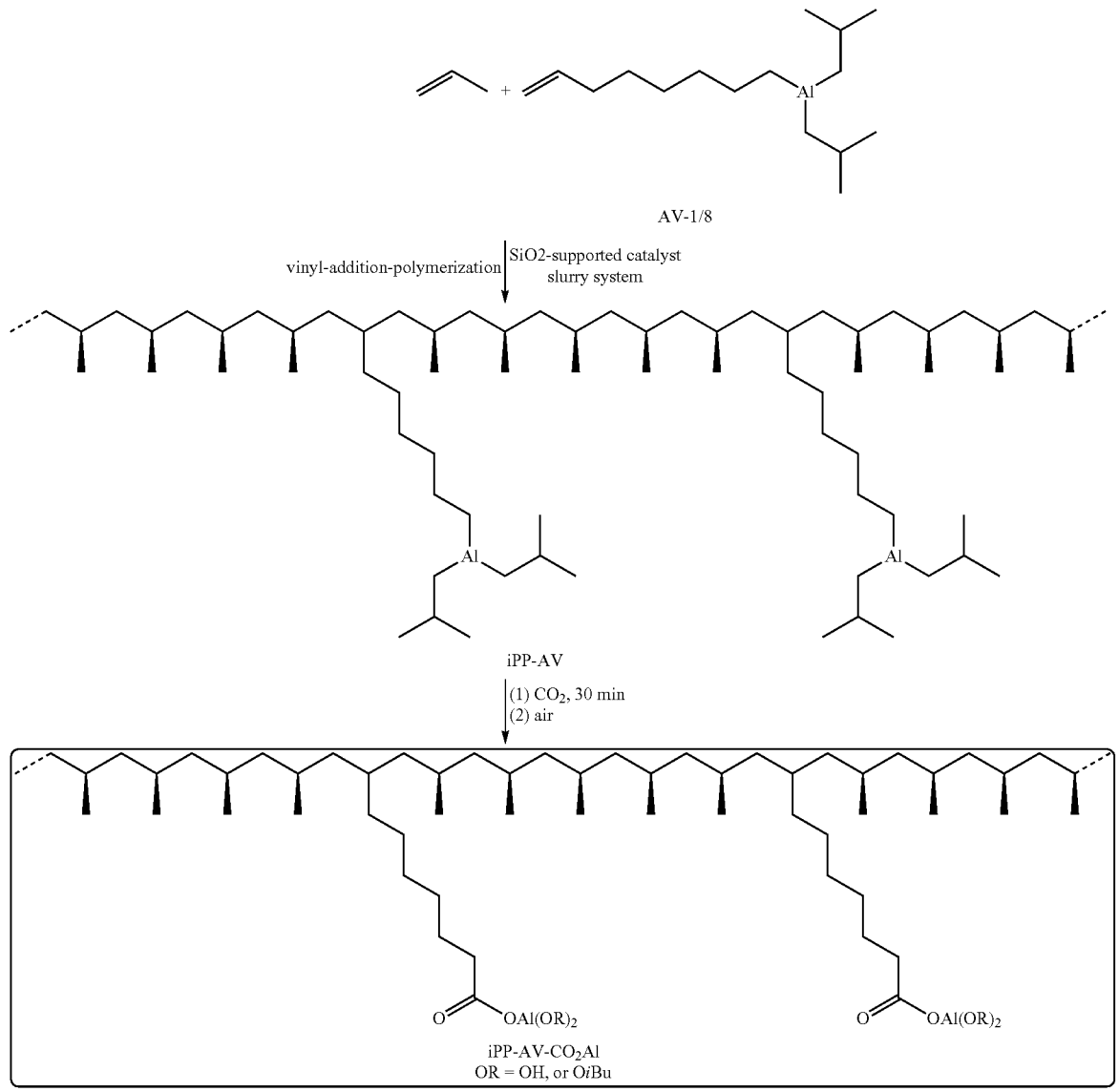

Test Methods

Due to strong ion cluster formation, the ionomers are typically not soluble in any solvent. The moments of molecular weight of the metal alkenyl containing copolymer are determined by acidification of the ionomers to make them soluble in trichlorobenzene TCB. Thereafter, Gel Permeation Chromatography (GPC) is performed on the acidified copolymers to measure the moments of molecular weight. For purposes of this invention and the claims thereto, the moments of molecular weight of the acidified polymers shall be considered the moments of molecular weight of the polymer prior to be acidified.

Gel Permeation Chromatography

Unless otherwise indicated, the distribution and the moments of molecular weight (Mw, Mn, Mz, Mw/Mn, etc.), the comonomer content, and the branching index (g') are determined by using a high temperature Gel Permeation Chromatography (Polymer Char GPC-IR) equipped with a multiple-channel band-filter based Infrared detector IR5 with a multiple-channel band filter based infrared detector ensemble IR5 with band region covering from about 2,700 cm$^{-1}$ to about 3,000 cm$^{-1}$ (representing saturated C—H stretching vibration), an 18-angle light scattering detector and a viscometer. Three Agilent PLgel 10-µm Mixed-B LS columns are used to provide polymer separation. Reagent grade 1,2,4-trichlorobenzene (TCB) (from Sigma-Aldrich) comprising ~300 ppm antioxidant BHT can be used as the mobile phase at a nominal flow rate of ~1.0 mL/min and a nominal injection volume of ~200 µL. The whole system including transfer lines, columns, and detectors can be contained in an oven maintained at ~145° C. A given amount of sample can be weighed and sealed in a standard vial with ~10 µL flow marker (heptane) added thereto. After loading the vial in the auto-sampler, the oligomer or polymer may automatically be dissolved in the instrument with ~8 mL added TCB solvent at ~160° C. with continuous shaking. The sample solution concentration can be from ~0.2 to ~2.0 mg/ml, with lower concentrations used for higher molecular weight samples. The concentration, c, at each point in the chromatogram can be calculated from the baseline-subtracted IR5 broadband signal, I, using the equation: c=αI, where α is the mass constant determined with polyethylene or polypropylene standards. The mass recovery can be calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{\alpha+1} + \frac{\alpha_{PS}+1}{\alpha+1}\log M_{PS}$$

where the variables with subscript "PS" stand for polystyrene while those without a subscript are for the test samples. In this method, $\alpha_{PS}$=0.67 and $K_{PS}$=0.000175, α and K for other materials are as calculated by GPC ONE™ 2019f software (Polymer Characterization, S.A., Valencia, Spain). Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to CH$_2$ and CH$_3$ channel calibrated with a series of PE and PP homo/copolymer standards whose nominal value are predetermined by NMR or FTIR. In particular, this provides the methyls per 1,000 total carbons (CH$_3$/1000TC) as a function of molecular weight. The short-chain branch (SCB) content per 1000TC (SCB/1000TC) is then computed as a function of molecular weight by applying a chain-end correction to the CH$_3$/1000TC function, assuming each chain to be linear and terminated by a methyl group at each end. The weight % comonomer is then obtained from the following expression in which f is 0.3, 0.4, 0.6, 0.8, and so on for C$_3$, C$_4$, C$_6$, C$_8$, and so on co-monomers, respectively:

w2=f*SCB/1000TC.

The bulk composition of the polymer from the GPC-IR and GPC-4D analyses is obtained by considering the entire signals of the CH$_3$ and CH$_2$ channels between the integration limits of the concentration chromatogram. First, the following ratio is obtained $$\text{Bulk } IR \text{ ratio} = \frac{\text{Area of CH}_3 \text{ signal within intergration limits}}{\text{Area of CH}_2 \text{ signal within intergration limits}}.$$

Then the same calibration of the CH$_3$ and CH$_2$ signal ratio, as mentioned previously in obtaining the CH3/1000TC as a function of molecular weight, is applied to obtain the bulk CH3/1000TC. A bulk methyl chain ends per 1000TC (bulk CH3end/1000TC) is obtained by weight-averaging the chain-end correction over the molecular-weight range. Then w2b=f*bulk CH3/1000TC bulk SCB/1000TC=bulk CH3/1000TC−bulk CH3end/1000TC and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the IR5 analysis, $A_2$ is the second virial coefficient, P(θ) is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, (dn/dc) is the refractive index increment for the system, n=1.500 for TCB at 145° C., and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the equation [η]=$\eta_S$/c, where c is concentration and is determined from the IR5 broadband channel output. The viscosity MW at each point is calculated as M=$K_{PS}M^{\alpha_{PS}+1}$/[η], where $\alpha_{ps}$ is 0.67 and $K_{ps}$ is 0.000175.

The branching index (g'$_{vis}$) is calculated using the output of the GPC-IR5-LS-VIS method as follows. The average intrinsic viscosity, of the sample is calculated by:

$$[\eta]_{avg} = \frac{\sum c_i [\eta]_i}{\sum c_i [\eta]_i}$$

where the summations are over the chromatographic slices, i, between the integration limits. The branching index g'$_{vis}$ is defined as $$g'_{vis} = \frac{[\eta]_{avg}}{KM_v^\alpha},$$

where $M_v$ is the viscosity-average molecular weight based on molecular weights determined by LS analysis and the K and α are for the reference linear polymers are calculated by GPC ONE™ 2019f software (Polymer Characterization, S.A., Valencia, Spain). Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

Differential Scanning Calorimetry (DSC)

Crystallization temperature ($T_c$) and melting temperature (or melting point, $T_m$) are measured using Differential Scanning Calorimetry (DSC) on a commercially available instrument (e.g., TA Instruments 2920 DSC or TA Instruments 2900 DSC). Typically, 6 to 10 mg of molded polymer or plasticized polymer are sealed in an aluminum pan and loaded into the instrument at room temperature. Melting data (first heat) is acquired by heating the sample to at least 30° C. above its melting temperature, typically 200° C. for polypropylene, at a heating rate of 10° C./min. The sample is held for at least 5 minutes at this temperature to destroy its thermal history. Crystallization data are acquired by cooling the sample from the melt to at least 50° C. below the crystallization temperature at a cooling rate of 10° C./min. The sample is held at this temperature for at least 5 minutes, and finally heated at 10° C./min to acquire additional melting data (second heat). The endothermic melting transition (first and second heat) and exothermic crystallization transition are analyzed according to standard procedures. The melting temperatures reported are the peak melting temperatures from the second heat unless otherwise specified. For Tg determination herein, temperature ramps from −150° C. to 150° C. with a 10° C./min heating rate were carried out using a DSC2500™ (TA Instruments™).

For polymers displaying multiple peaks, the melting temperature is defined to be the peak melting temperature from the melting trace associated with the largest endothermic calorimetric response (as opposed to the peak occurring at the highest temperature). Likewise, the crystallization temperature is defined to be the peak crystallization temperature from the crystallization trace associated with the largest exothermic calorimetric response (as opposed to the peak occurring at the highest temperature).

Areas under the DSC curve are used to determine the heat of transition (heat of fusion, $H_f$, upon melting), which can be used to calculate the degree of crystallinity (also called the percent crystallinity). The percent crystallinity (X %) is calculated using the formula: [area under the curve (in J/g)/H° (in J/g)]*100, where H° is the ideal heat of fusion for a perfect crystal of the homopolymer of the major monomer component. These values for H° are to be obtained from the *Polymer Handbook, Fourth Edition*, published by John Wiley and Sons, New York 1999, except that a value of 290 J/g is used for H° (polyethylene), a value of 140 J/g is used for H° (polybutene), and a value of 207 J/g is used for H° (polypropylene).

¹H NMR

Proton NMR spectra are collected using a suitable instrument, e.g., a 500 MHz Varian pulsed Fourier transform NMR spectrometer equipped with a variable temperature proton detection probe operating at 120° C. Typical measurement of the NMR spectrum include dissolving of the polymer sample in 1,1,2,2-tetrachloroethane-d2 ("TCE-d2") and transferring into a 5 mm glass NMR tube. Typical acquisition parameters are sweep width of 10 KHz, pulse width of 30 degrees, acquisition time of 2 seconds, acquisition delay of 5 seconds and number of scans was 120. Chemical shifts are determined relative to the TCE-d2 signal which was set to 5.98 ppm.

Dynamic Mechanical Thermal Analysis

Dynamic mechanical thermal analysis ("DMTA") was performed using a solid analyzer instrument RSA-G2 (TA Instruments). The samples were prepared as small rectangular samples, the whole sample approximately 19.0 mm long by 5 mm wide by 0.5 mm thick. The polymer samples were molded at approximately 150° C. on either a Carver Lab Press or Wabash Press. The polymer samples are then loaded into the open oven of the instrument between tool clamps on both ends. Small strips of dimensions 50 mm×2 mm×0.5 mm are cut from the plaques and loaded in the RSA-G2 using the fibers tool. The temperature is controlled with a forced convection oven. Dynamic temperature ramps are conducted at a heating rate of 2° C./min using a frequency of 1 Hz and strain of 0.1%. The elastic and viscous moduli (E' and E") are measured as a function of temperature.

Fourier-Transform Infrared Spectroscopy

Functionalization of the iPP ionomer with AV was confirmed using FTIR spectroscopy, where the C—O stretch at 1,590 cm$^{-1}$ can be seen in the iPP-AV-CO$_2$—Al polymer spectrum. Absorbance of the C—O stretch at 1,590 cm$^{-1}$ is proportional to the molar fraction of aluminum acetate functional groups in the iPP-AV-CO$_2$—Al polymer and can be estimated from FTIR measurements. The Aluminum acetate quantification is based on a standard prepared from mixing approximately 0.5 mg of Aluminum acetate Al(OH)$_2$(OAc) with 557.7 mg of potassium bromide (~0.09 wt % Aluminum acetate) and compressing into a pellet using a hydraulic Carver Press. Assuming the Aluminum acetate is >87% pure and the molecular weight is 120.04 g/mol, the concentration of Aluminum acetate was estimated to be ~0.0185 M in the KBr pellet (1.3 cm diameter×0.1472 cm thick KBr disc). Assuming the peak height of the C—O stretching peak at 1,595 cm$^{-1}$ for the Aluminum acetate in KBr is roughly equivalent to the C—O stretching peak at 1,590 cm$^{-1}$ in the iPP ionomer, a concentration of potassium acetate groups in the polymer can be estimated. Aluminum acetate absorptivity in the KBr was estimated from the spectrum by first measuring the corrected peak height of the C—O stretch at 1,595 cm$^{-1}$ using a 2-point linear baseline with anchor points at 1,901.5 and 1,528.3 cm$^{-1}$, which equates to ~0.529 absorbance units. Molar absorptivity was calculated using Beer's law given below:

$$A = \varepsilon b c$$

where A is the absorbance (unit less), $\varepsilon$ is molar absorptivity (M$^{-1}$cm$^{-1}$), b is the path length (cm), and c is the molar concentration (M). Applying Beer's law, it was possible to calculate the molar absorptivity c using the path length of the KBr disc (0.1472 cm) and the concentration of Aluminum acetate (0.0185 M), which equates to a $\varepsilon$=194.3 M$^{-1}$cm$^{-1}$. Assuming the molar absorptivity of the aluminum acetate functional group prepared in KBr is roughly equivalent to the molar absorptivity in the iPP ionomer, an approximate molar concentration of aluminum acetate in the iPP ionomer can be calculated. Absorbance of the aluminum acetate groups in the iPP ionomer was calculated using a linear 2 point baseline correction with anchor points at 1,778.0 and 1,525.4 cm$^{-1}$, which evaluated to ~0.368 absorbance units. A molar concentration of Aluminum acetate functional groups in the iPP ionomer was estimated using the previously determined molar absorptivity of Aluminum acetate ($\varepsilon$=194.3 M$^{-1}$cm$^{-1}$), path length of the iPP ionomer plaque (0.01143 cm), and the iPP ionomer peak absorbance at 1,590 cm$^{-1}$ (~0.368), which yielded a 0.166 M Aluminum acetate concentration based on volume in the iPP polymer. Assuming the density of the iPP ionomer is ~0.88 g/cm³ (880 g/L)

based on DSC results and the polypropylene monomer molecular weight is 42.08 g/mol, it is possible to calculate a molar ratio of aluminum acetate to polypropylene monomer.

Tensile Properties

Tensile Properties (ultimate tensile strength, elongation at break, tensile yield, elongation at yield,) were determined according to ISO 37, 2005 ASTM D 638 (30 mm grip separation, 50.8 mm/min, temperature=70° F.)

Polymerizations

Example A (control). A 2 L autoclave reactor was charged with bis(diisobutylaluminum) oxide (DIBALO, 1 mL of 20 wt % hexane solution; obtained from Nouryon). To the reactor was injected 50 mg of silica-supported Catalyst A (5 wt % oil suspension) using propylene (400 mL) at ambient temperatures. Hydrogen (50 psig) was introduced to the reactor. The reactor was then brought to 70° C., and the reaction was allowed to stir at 650 rpm for 30 minutes at 70° C. The reaction was cooled to 40° C. and the pressure was released from vent valves. Polymer obtained was stabilized by addition of around 1,000 ppm Irganox™ 1076 and dried under vacuum at 70° C. for 12 hours. Yield: 30.21 g.

Example B. A 2 L autoclave reactor was charged with AV-1/8 (2 mL), toluene (1 mL), and bis(diisobutylaluminum) oxide (DIBALO, 1 mL of 20 wt % hexane solution; obtained from Nouryon). To the reactor was injected 50 mg of silica-supported Catalyst A (5 wt % oil suspension) using propylene (400 mL) at ambient temperatures. Hydrogen (50 psig) was introduced to the reactor. The reactor was then brought to 70° C., and the reaction was allowed to stir at 650 rpm for 30 minutes at 70° C. The polymerization was terminated by introduction of 50 psig $CO_2$ at 70° C., and the reaction was allowed to stir at 70° C. for an additional 30 minutes. The reaction was cooled to 40° C. and the pressure was released from vent valves. Polymers were stabilized by addition of around 1,000 ppm Irganox 1076 and dried under vacuum at 70° C. for 12 hours. Yield: 27.94 g.

Example C (control). A 2 L autoclave reactor was charged with tri-isobutylaluminum (TiBAL, 0.4 mL of 1M hexane solution) and 1,000 mL propylene. To the reactor was injected 50 mg of silica-supported Catalyst B (5 wt % oil suspension) using propylene (200 mL) at ambient temperatures. The reaction mixture was stirred at 650 rpm at ambient temperatures for 5 minutes. The reactor was then brought to 70° C., and the reaction was allowed to stir at 650 rpm for 30 minutes at 70° C. The reaction was cooled to 40° C. and the pressure was released from vent valves. Polymer was stabilized by addition of around 1,000 ppm Irganox™ 1076 and dried under vacuum at 70° C. for 12 hours. Yield: 119.5 g.

Example D (control). A 2 L autoclave reactor was charged with tri-isobutylaluminum (TiBAL, 0.4 mL of 1M hexane solution) and 1,000 mL propylene. To the reactor was injected 100 mg of silica-supported Catalyst B (5 wt % oil suspension) using propylene (200 mL) at ambient temperatures. The reaction mixture was stirred at 650 rpm at ambient temperatures for 5 minutes. The reactor was then brought to 70° C., and the reaction was allowed to stir at 650 rpm for 60 minutes at 70° C. The reaction was cooled to 40° C. and the pressure was released from vent valves. Polymer was stabilized by addition of around 1,000 ppm Irganox™ 1076 and dried under vacuum at 70° C. for 12 hours. Yield: 530 g.

Example E. A 2 L autoclave reactor was charged with AV-1/8 (1 mL), toluene (2 mL), and tri-isobutylaluminum (TiBAL, 0.4 mL of 1M hexane solution) and 1,000 mL propylene. To the reactor was injected 50 mg of silica-supported Catalyst B (5 wt % oil suspension) using propylene (200 mL) at ambient temperatures. The reaction mixture was stirred at 650 rpm at ambient temperatures for 5 minutes. The reactor was then brought to 70° C., and the reaction was allowed to stir at 650 rpm for 30 minutes at 70° C. The polymerization was terminated by introduction of 50 psig $CO_2$ at 70° C., and the reaction was allowed to stir at 70° C. for an additional 30 minutes. The reaction was cooled to 40° C. and the pressure was released from vent valves. Polymer was stabilized by addition of around 1,000 ppm Irganox™ 1076 and dried under vacuum at 70° C. for 12 hours. Yield: 60 g.

Example F. A 2 L autoclave reactor was charged with AV-1/8 (2 mL), toluene (2 mL), and tri-isobutylaluminum (TiBAL, 0.4 mL of 1M hexane solution) and 1,000 mL propylene. To the reactor was injected 50 mg of silica-supported Catalyst B (5 wt % oil suspension) using propylene (200 mL) at ambient temperatures. The reaction mixture was stirred at 650 rpm at ambient temperatures for 5 minutes. The reactor was then brought to 70° C., and the reaction was allowed to stir at 650 rpm for 30 minutes at 70° C. The polymerization was terminated by introduction of 50 psig $CO_2$ at 70° C., and the reaction was allowed to stir at 70° C. for an additional 30 minutes. The reaction was cooled to 40° C. and the pressure was released from vent valves. Polymer was stabilized by addition of around 1,000 ppm Irganox™ 1076 and dried under vacuum at 70° C. for 12 hours. Yield: 69.02 g.

Example G. A 2 L autoclave reactor was charged with AV-1/8 (3 mL), toluene (2 mL), and tri-isobutylaluminum (TiBAL, 0.4 mL of 1M hexane solution) and 1,000 mL propylene. To the reactor was injected 50 mg of silica-supported Catalyst B (5 wt % oil suspension) using propylene (200 mL) at ambient temperatures. The reaction mixture was stirred at 650 rpm at ambient temperatures for 5 minutes. The reactor was then brought to 70° C., and the reaction was allowed to stir at 650 rpm for 30 minutes at 70° C. The polymerization was terminated by introduction of 50 psig $CO_2$ at 70° C., and the reaction was allowed to stir at 70° C. for an additional 30 minutes. The reaction was cooled to 40° C. and the pressure was released from vent valves. Polymer was stabilized by addition of around 1,000 ppm Irganox™ 1076 and dried under vacuum at 70° C. for 12 hours. Yield: 55 g.

Example H. A 2 L autoclave reactor was charged with AV-1/8 (1 mL), toluene (2 mL), and tri-isobutylaluminum (TiBAL, 0.4 mL of 1M hexane solution) and 1,000 mL propylene. To the reactor was injected 100 mg of silica-supported Catalyst B (5 wt % oil suspension) using propylene (200 mL) at ambient temperatures. The reaction mixture was stirred at 650 rpm at ambient temperatures for 5 minutes. The reactor was then brought to 70° C., and the reaction was allowed to stir at 650 rpm for 60 minutes at 70° C. The polymerization was terminated by introduction of 50 psig $CO_2$ at 70° C., and the reaction was allowed to stir at 70° C. for an additional 30 minutes. The reaction was cooled to 40° C. and the pressure was released from vent valves. Polymer was stabilized by addition of around 1,000 ppm Irganox™ 1076 and dried under vacuum at 70° C. for 12 hours. Yield: 229.7 g.

Example I. A 2 L autoclave reactor was charged with AV-1/8 (2 mL), toluene (2 mL), and tri-isobutylaluminum (TiBAL, 0.4 mL of 1M hexane solution) and 1,000 mL propylene. To the reactor was injected 100 mg of silica-supported Catalyst B (5 wt % oil suspension) using propylene (200 mL) at ambient temperatures. The reaction mixture was stirred at 650 rpm at ambient temperatures for 5 minutes. The reactor was then brought to 70° C., and the reaction was allowed to stir at 650 rpm for 60 minutes at 70° C. The polymerization was terminated by introduction of 50 psig $CO_2$ at 70° C., and the reaction was allowed to stir at 70° C. for an additional 30 minutes. The reaction was cooled to 40° C. and the pressure was released from vent valves. Polymer was stabilized by addition of around 1,000 ppm Irganox™ 1076 and dried under vacuum at 70° C. for 12 hours. Yield: 173.98 g.

TABLE 1

Molecular weight and composition of iPP controls and iPP ionomers.

| Example | Sample | $M_w$ (g/mol) | PDI (Mw/Mn) | AVmole/mole |
|---|---|---|---|---|
| A | iPP | 415 | 3.32 | 0 |
| B | iPP-AV-COOAl | 382 | 3.56 | 0.0081 |
| C | iPP | 464 | 3.10 | 0 |
| D | iPP | 435 | 2.40 | 0 |
| E | iPP-AV-COOAl | 443 | 2.87 | 0.0004 |
| F | iPP-AV-COOAl | 483 | 2.87 | 0.0015 |
| G | iPP-AV-COOAl | 528 | 3.09 | 0.0028 |
| H | iPP-AV-COOAl | 418 | 2.70 | 0.0008 |
| I | | | 3.95 | 0.0009 |

Thermal Properties:

Differential scanning calorimetry (DSC) was used to measure the melting and crystallization temperatures (Tc and Tm, respectively) of the samples. Tm was measured as the peak temperature during the second heating cycle, and Tc was measured as the onset of the peak during the cooling cycle. The enthalpy of melting ($\Delta H_f$) was computed as the integrated area of the melting peak. The degree of crystallinity was determined $Xc=(\Delta H_f/\Delta H_f^0)\times100$, where $\Delta H_f^0=207$ J/g is the heat of fusion of a perfect (defect-free) i-PP crystal (of infinite lamellar thickness and molar mass). The glass transition temperature (Tg) was measured by dynamic mechanical thermal analysis (DMTA). The values of the thermal transition parameters are given in Table 2.

TABLE 2

Thermal properties of non-ionomer iPP control and iPP ionomer.

| Example | Tg, ° C. | Tc, ° C. | Tm, ° C. | $\Delta H_f$, J/g | Xc, % |
|---|---|---|---|---|---|
| A | −4.2 | 107 | 138 | 80.4 | 38.8 |
| B | −10.3 | 106 | 136 | 65.6 | 31.7 |
| C | −0.3 | 119 | 159 | 122 | 58.8 |
| D | 1.6 | 117 | 161 | 105 | 50.7 |
| E | 1.9 | 123 | 158 | 98.7 | 47.6 |
| F | 1.2 | 125 | 158 | 108 | 52.1 |
| G | −0.1 | 124 | 157 | 102 | 49.2 |
| H | −0.7 | 121 | 158 | 101 | 48.7 |
| I | −0.9 | 121 | 158 | 108 | 52.1 |

Tensile Response.

Tensile test at room temperature were performed using a RSA-G2 Solid analyzer instrument (TA Instruments). Small dumbbell-shaped specimens with dimensions 3 mm×0.5 mm×0.1 mm were molded at 200° C., using a hot press. Table 3 lists the tensile properties for non-ionomer iPP control and iPP ionomer. In general, compared to the iPP control, the ionomer shows ~35% higher Young modulus (E) and ~8% higher ultimate tensile strength. Both samples have comparable elongation at break values. The onset of strain-hardening occurs at lower strains (~350%) for the ionomer iPP than for the iPP control (~500%).

TABLE 3

Tensile properties of non-ionomer iPP control and iPP ionomer.

| Sample | E, GPa | TS (Ultimate), MPa | Elongation at Break, % | TS (Yield), MPa | Elongation at Yield, % |
|---|---|---|---|---|---|
| i | 0.26 | 37.9 | 724 | 29.1 | 19.3 |
| ii | 0.35 | 41.0 | 716 | 27.2 | 21.5 |

Figure 1B:
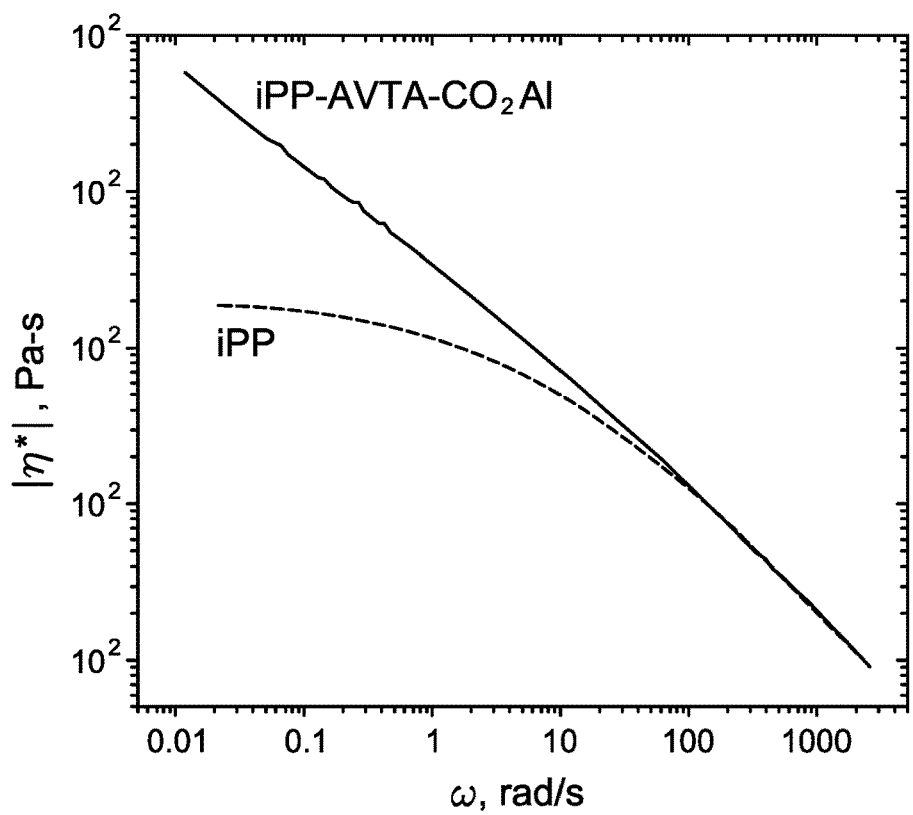

Flow Properties:

The rheological properties of the control iPPs and the iPP ionomers were characterized via small-amplitude oscillatory shear measured using an ARES-G2 rheometer (TA Instruments) with 8 mm parallel plates geometry and a shear strain of 1%. FIGS. 1A and 1B show master curves of the dynamic moduli (G' and G") and the complex viscosity constructed by time-temperature superposition (tTs) of individual measurements performed at temperatures ranging from 150° C. to 250° C. Rheological parameters extracted are reported in Table 4. The relaxation time, measured as $2\pi/\omega^*$ (where $\omega^*$ is the angular frequency at the moduli crossover G'=G") is less than 1 s for the control iPP. For the iPP ionomer, no relaxation time could be measured since no crossover moduli was detected. Therefore, the relaxation time is longer than 620 s. The complex viscosity, computed as $|\eta^*|=\sqrt{G'^2+G''^2}$, shows the typical low frequency plateau that characterizes the so-called zero-shear viscosity, whereas the iPP ionomer shows a strong viscosity upturn at low frequencies, which reflect a high melt strength characteristic. The melt strength is characterized as the viscosity measured at 0.01 rad/s ($|\eta^*|_{0.01\ rad/s}$) in Table 4. Regardless the more than one order of magnitude difference in low frequency viscosity between the two samples, they have essentially the same viscosity at high frequencies ($|\eta^*|_{100\ rad/s}$=0.2 kPa-s). Based on the Cox-Merz rule, the frequency dependence of viscosity is the same as the shear-rate dependence of viscosity. Therefore, the viscosity related to high shear-rate processing operations (such as extrusion and injection molding) are comparable for both samples. In other words, both polymer would show similar processability for shear flow operations. Another important parameter that is related to melt processability is the shear-thinning index (STI), defined be the ratio between $|\eta^*|_{0.01\ rad/s}$ and $|\eta^*|_{100\ rad/s}$=0.2. As can be seeing in table 4, STI is 30 times higher in the iPP ionmer than in the control iPP.

Table 4

Rheological properties of non-ionomer iPP control and iPP ionomer.

| Example | τs | $|\eta^*|_{0.01rad/s}$ kPa-s | $|\eta^*|_{100rad/s}$ kPa-s | STI (Shear thinning index) |
|---|---|---|---|---|
| A | 0.6 | 20.8 | 0.2 | 104 |
| B | >620 | 668 | 0.2 | 3340 |

Figure 2A:
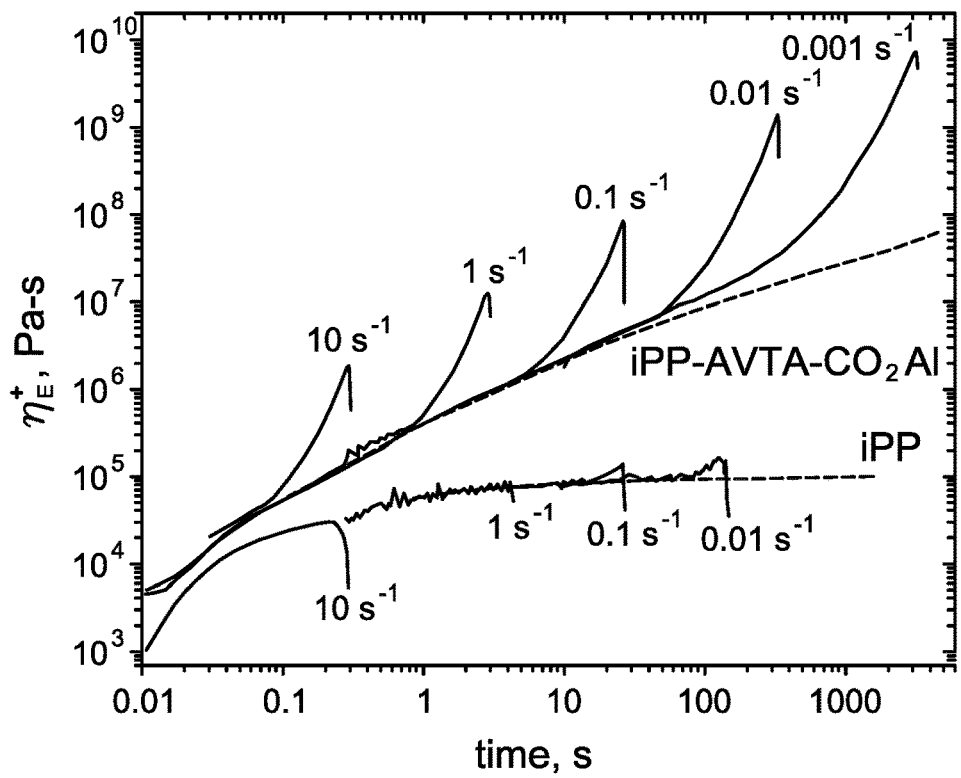
FIGS. 2A and 2B are a set of graphs of Transient extensional viscosity of iPP and iPP ionomer measured at the indicated extension rates at 190° C. Dashed lines are the linear viscoelastic envelopes, determined by transient start-up shear measurements at a shear rate of 0.0001 s$^{-1}$.
Figure 2B:
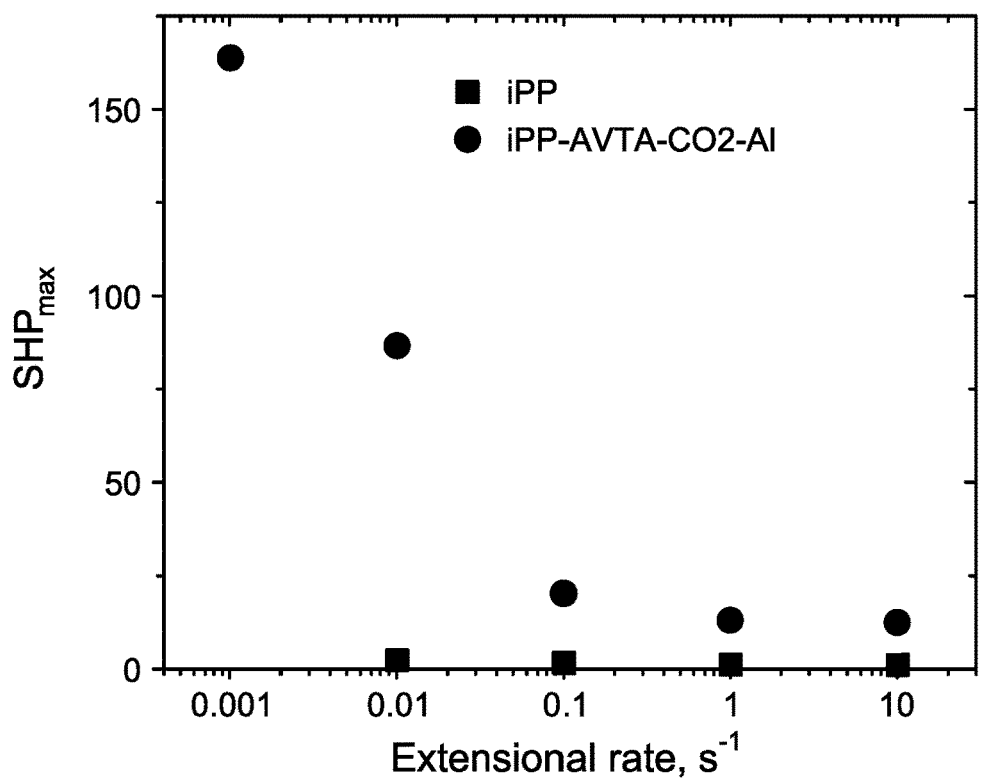
Figure 3:
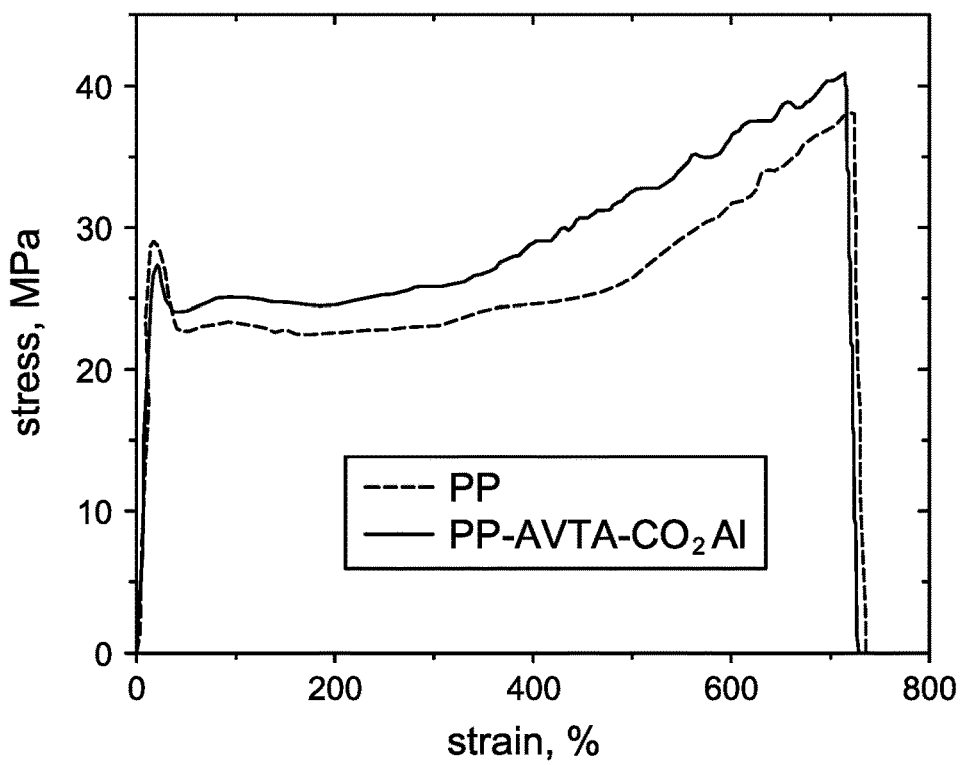
FIG. 3 shows stress-strain curves of the non-ionomer iPP control and an iPP ionomer.

FIG. 2A (left) shows the transient extensional viscosity ($\eta_E^+$) of iPP and iPP ionomer measured at different extension rates. The dashed lines are the linear viscoelastic envelope (LVE) viscosity ($\eta_{LVE}$) measured by start-up shear at a shear rate of 0.0001 $s^{-1}$. The difference in the long time viscosity reflects the higher melt strenth in the ionomer iPP, compared to the iPP control, as discussed above. Upward deviations from the LVE define the strain hardening ratio as SHR=$\eta_{LVE}/\eta_E^+$. As expected, SHR is negligible for linear iPP, whereas remarkably large values are observed for the iPP ionomer. The maximum SHR values, before sample breakage, are plotted as a funtion of extensional rate in FIG. 6 (right). High strain-hardening and melt strength are desirable mel properties for processing operations involving extensional flows, such as thermoforming, blown film and foaming Therefore, the unique combination of high melt strength, high SH and strong shear-thinning, makes the iPP ionomer a very good candidate for applications where HMS PP is required.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

All documents described herein are incorporated by reference herein, including any priority documents and or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A process to produce an ionomer comprising:
   1) contacting, in a reactor, one or more $C_2$-$C_{60}$ α-olefin monomers, an optional diene, and a metal alkenyl represented by the formula: $Q(R')_{z-v}(R)_v$
   where Q is a group 1, 2, 12 or 13 metal,
   R is a hydrocarbenyl group containing 4 to 20 carbon atoms having an allyl chain end,
   R' is a hydrocarbyl group containing 1 to 30 carbon atoms, z is 1, 2, or 3, and
   v is 1, 2 or 3, where z-v is 0, 1 or 2,
   with a catalyst system comprising an activator, a catalyst compound, and a support;
   2) forming a copolymer comprising one or more $C_2$-$C_{60}$ α-olefin monomers and about 0.01 wt % to about 20 wt %, based on a weight of the copolymer, of metal alkenyl, wherein the copolymer optionally has a melting point of 100° C. or more and or an Mw of 100,000 g/mol;
   3) quenching a polymerization reaction with one or more electrophilic groups thereby functionalizing the copolymer; and
   4) introducing a metal cation and obtaining ionomer comprising an ionic group.

2. The process of claim 1, wherein Q is Al.

3. The process of claim 1, wherein R is butenyl, pentenyl, heptenyl, or octenyl and R' is methyl, ethyl, propyl, isobutyl, butyl, octyl, or n-octyl.

4. The process of claim 1, wherein the metal alkenyl is one or more of isobutyl-di(oct-7-en-1-yl)-aluminum, isobutyl-di(dec-9-en-1-yl)-aluminum, isobutyl-di(non-8-en-1-yl)-aluminum, isobutyl-di(hept-6-en-1-yl)-aluminum, dimethyl (oct-7-en-1-yl)aluminum, diethyl(oct-7-en-1-yl)aluminum, dibutyl(oct-7-en-1-yl)aluminum, diisobutyl(oct-7-en-1-yl) aluminum, diisobutyl(non-8-en-1-yl) aluminum, diisobutyl (dec-9-en-1-yl)aluminum, diisobutyl(dodec-10-en-1-yl)aluminum, diisobutyl(hept-6-en-1-yl)aluminum, diethyl(hept-6-en-1-yl)aluminum, dimethyl(hept-6-en-1-yl)aluminum, di-n-octyl(7-octen-1-yl)aluminum, n-octyl(di-7-octen-1-yl) aluminum, or diisobutyl(6-hepten-1-yl)aluminum.

5. The process of claim 1, where the $C_2$-$C_{60}$ α-olefins are one or more of ethylene, propylene, butene, pentene, hexene, heptene, octene, nonene, decene, undecene, dodecene or isomers thereof.

6. The process of claim 1, where the diene comprises one or more of butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, cyclopentadiene, vinylnorbornene, norbornadiene, 5-ethylidene-2-norbornene, 5-vinyl-2-norbornene, divinylbenzene, dicyclopentadiene, or combination(s) thereof.

7. The process of claim 1, where copolymer comprises:
   1) 50 wt % to about 99.99 wt % of a first α-olefin monomer,
   2) up to about 50 wt % of an optional second α-olefin comonomer different from the first α-olefin monomer,
   3) up to about 20 wt % of an optional diene, and
   4) 0.01 wt % to about 20 wt % of a metal alkenyl, based on a weight of the copolymer.

8. The process of claim 1, where copolymer has an Mw/Mn of from about 2 to about 4 Mw of about 50,000 g/mol or more and an Mn of about 21,000 g/mol or more.

9. The process of claim 1, wherein reaction conditions comprise a temperature of about 50° C. to about 100° C. and a time of about 5 minutes to about 30 minutes.

10. The process of claim 1, wherein quenching the polymerization reaction comprises introducing a quench agent comprising the one or more electrophilic groups at a pressure of about 50 psi to about 150 psi, at a temperature of about 50° C. to about 100° C., and for a time of about 5 minutes to about 30 minutes.

11. The process of claim 1, wherein the catalyst compound comprises a metallocene represented by the formula:

$$Cp^A Cp^B M'X'_n, \quad \text{(MCN-I)}$$

$$Cp^A(T)Cp^B M'X'_n, \text{ or} \quad \text{(MCN-II)}$$

$$T_y Cp_m MG_n X_q \quad \text{(MCN-III)}$$

wherein each $Cp^A$ and $Cp^B$ is independently selected from cyclopentadienyl ligands or ligands isolobal to cyclopentadienyl, one or both $Cp^A$ and $Cp^B$ may contain heteroatoms, and one or both $Cp^A$ and $Cp^B$ may be substituted by one or more R" groups;

M' is selected from Groups 3 through 12 atoms or lanthanide Group atoms;

X' is an anionic leaving group; n is 0 or an integer from 1 to 4;

each R" is independently selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, ether, or thioether;

(T) is a bridging group selected from divalent alkyl, divalent substituted alkyl, divalent heteroalkyl, divalent alkenyl, divalent substituted alkenyl, divalent heteroalkenyl, divalent alkynyl, divalent substituted alkynyl, divalent heteroalkynyl, divalent alkoxy, divalent aryloxy, divalent alkylthio, divalent arylthio, divalent aryl, divalent substituted aryl, divalent heteroaryl, divalent aralkyl, divalent aralkylene, divalent alkaryl, divalent alkarylene, divalent haloalkyl, divalent haloalkenyl, divalent haloalkynyl, divalent heteroalkyl, divalent heterocycle, divalent heteroaryl, a divalent heteroatom-containing group, divalent hydrocarbyl, divalent substituted hydrocarbyl, divalent heterohydrocarbyl, divalent silyl, divalent boryl, divalent phosphino, divalent phosphine, divalent amino, divalent amine, divalent ether, or divalent thioether;

Cp is independently a substituted or unsubstituted cyclopentadienyl ligand or substituted or unsubstituted ligand isolobal to cyclopentadienyl;

M is a Group 4 transition metal;

G is a heteroatom group represented by the formula $JR^*_z$ where J is N, P, O or S, and R* is a linear, branched, or cyclic $C_1$-$C_{20}$ hydrocarbyl; z is 1 or 2;

T is a bridging group; y is 0 or 1; X is a leaving group; m=1, n=1, 2 or 3, q=0, 1, 2 or 3, and the sum of m+n+q is equal to the coordination number of the Group 4 transition metal.

12. The process of claim 1, wherein the catalyst compound is represented by Formula (A):

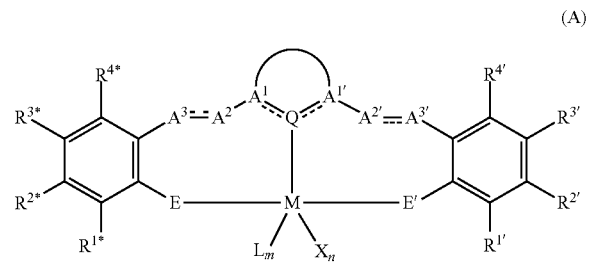

(A)

wherein:
M is a group 3, 4, 5, or 6 transition metal or a Lanthanide;
E and E' are each independently O, S, or $NR^9$, where $R^9$ is independently hydrogen, $C_1$-$C_{40}$ hydrocarbyl, $C_1$-$C_{40}$ substituted hydrocarbyl, or a heteroatom-containing group;
Q is group 14, 15, or 16 atom that forms a dative bond to metal M;
$A^1QA^{1'}$ are part of a heterocyclic Lewis base containing 4 to 40 non-hydrogen atoms that links $A^2$ to $A^{2'}$ via a 3-atom bridge with Q being the central atom of the 3-atom bridge;

$A^3 \mathrel{=\!=\!=} A^2$ is a divalent group containing 2 to 40 non-hydrogen atoms that links $A^1$ to the E-bonded aryl group via a 2-atom bridge;
$A^{2'} \mathrel{=\!=\!=} A^{3'}$ is a divalent group containing 2 to 40 non-hydrogen atoms that links $A^{1'}$ to the E'-bonded aryl group via a 2-atom bridge;
each L is independently a Lewis base;
each X is independently an anionic ligand;
n is 1, 2 or 3;
m is 0, 1, or 2;
n+m is not greater than 4;
each of $R^{1*}$, $R^{2*}$, $R^{3*}$, $R^{4*}$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^{1*}$ and $R^{2*}$, $R^{2*}$ and $R^{3*}$, $R^{3*}$ and $R^{4*}$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;
any two L groups may be joined together to form a bidentate Lewis base;
an X group may be joined to an L group to form a monoanionic bidentate group; and
any two X groups may be joined together to form a dianionic ligand group.

13. The process of claim 1, wherein the ionomer has a maximum elastic range of from about 400% elongation to about 500% elongation.

14. The process of claim 1, wherein the ionomer has an elongation at breakage of about 500% or greater.

15. The process of claim 1, wherein the ionomer has a tensile set, at 200% deformation, of from about 40% to about 50%.

16. The process of claim 1, wherein the ionomer has a tensile strength, at 25° C., of from about 0.1 MPa to about 10 MPa.

17. The process of claim 1, wherein the ionomer has a Young's modulus, at 40° C. of from about 0.5 MPa to about 10 MPa, the ionomer has a glass transition temperature of from about −100° C. to about −10° C., the ionomer has a complex viscosity as measured by oscillatory shear at an angular frequency of 0.1 rad/s of about 500,000 Pa-s to about 800,000 Pa-s, the copolymer comprising a propylene copolymer that has a complex viscosity as measured by oscillatory shear at an angular frequency of 100 rad/s of about 100 to 500 Pa-s, the ionomer has a shear thinning index of about 1,000 to 5,000, and the ionomer has a strain hardening ratio of about 5 to about 15 when measured at Hencky strain rate of 10 sec$^{-1}$, of about 10 to about 20 when measured at Hencky strain rate of 1.0 sec$^{-1}$, of about 15 to about 30 when measured at Hencky strain rate of 0.1 sec$^{-1}$, of about 30 to about 100 when measured at Hencky strain rate of 0.01 sec$^{-1}$, and/or of about 100 to about 200 when measured at Hencky strain rate of 0.001 sec$^{-1}$.

* * * * *